(12) United States Patent
Misawa et al.

(10) Patent No.: US 7,724,300 B2
(45) Date of Patent: May 25, 2010

(54) DIGITAL CAMERA WITH A NUMBER OF PHOTOGRAPHING SYSTEMS

(75) Inventors: Atsushi Misawa, Saitama-ken (JP); Michitaka Nakazawa, Saitama-ken (JP); Akihiro Uchida, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 417 days.

(21) Appl. No.: 11/599,516

(22) Filed: Nov. 15, 2006

(65) Prior Publication Data

US 2007/0064141 A1 Mar. 22, 2007

Related U.S. Application Data

(62) Division of application No. 10/370,629, filed on Feb. 24, 2003.

(30) Foreign Application Priority Data

| Feb. 22, 2002 | (JP) | ............................. 2002-046517 |
| Mar. 11, 2002 | (JP) | ............................. 2002-065758 |
| Mar. 15, 2002 | (JP) | ............................. 2002-071778 |
| Sep. 30, 2002 | (JP) | ............................. 2002-287947 |
| Oct. 18, 2002 | (JP) | ............................. 2002-304878 |
| Oct. 31, 2002 | (JP) | ............................. 2002-317347 |
| Nov. 20, 2002 | (JP) | ............................. 2002-336235 |

(51) Int. Cl.
*H04N 5/232* (2006.01)
*H04N 5/222* (2006.01)

(52) U.S. Cl. ................................. 348/345; 348/333.05

(58) Field of Classification Search ................. 348/345, 348/333.05
See application file for complete search history.

(56) References Cited

U.S. PATENT DOCUMENTS

| 4,903,134 | A | * | 2/1990 | Murashima et al. | ......... 348/347 |
| 5,436,660 | A | * | 7/1995 | Sakamoto | ................. 348/229.1 |
| 5,712,733 | A | * | 1/1998 | Mukaiya | ..................... 359/687 |
| 5,905,525 | A | | 5/1999 | Ishibashi et al. | |
| 6,636,254 | B1 | * | 10/2003 | Onishi et al. | ................... 348/65 |
| 6,977,676 | B1 | * | 12/2005 | Sato et al. | ............... 348/211.11 |

(Continued)

FOREIGN PATENT DOCUMENTS

JP 59050671 A 3/1984

(Continued)

*Primary Examiner*—Sinh Tran
*Assistant Examiner*—Hung H Lam
(74) *Attorney, Agent, or Firm*—Sughrue Mion, PLLC

(57) ABSTRACT

A digital camera comprises two photographing systems which are independent of and substantially identical to each other, and each of which includes a photographing optical system and an image pickup device. The photographing optical system is configured to include a photographing lens, a focusing lens and an aperture stop. The focusing lens of one of the photographing systems is driven stepwise from a first predetermined position at which it is to be located when a focusing position lies at an infinite distance, toward a second predetermined position at which it is to be located when the focusing position lies at the closest distance, while the focusing lens of the other photographing system is driven stepwise from the second predetermined position toward the first predetermined position every step width. The contrasts of images formed by the respective photographing systems are evaluated while the two focusing lenses are being moved, and a position corresponding to the maximum value of the contrasts is determined as the focusing position.

8 Claims, 36 Drawing Sheets

U.S. PATENT DOCUMENTS

2002/0057341 A1* 5/2002 Tanaka ........................ 348/143
2002/0152557 A1* 10/2002 Elberbaum ..................... 8/405

FOREIGN PATENT DOCUMENTS

| | | | |
|---|---|---|---|
| JP | 01-238283 | A | 9/1989 |
| JP | 03011884 | A | 1/1991 |
| JP | 05-145818 | A | 6/1993 |
| JP | 05048028 | B | 7/1993 |
| JP | 06098232 | A | 4/1994 |
| JP | 07-135590 | A | 5/1995 |
| JP | 9-187039 | | 7/1997 |
| JP | 9-215012 | | 8/1997 |
| JP | 09214813 | A | 8/1997 |
| JP | 09243906 | A | 9/1997 |
| JP | 10-164429 | | 6/1998 |
| JP | 10-262175 | | 9/1998 |
| JP | 11-122536 | | 4/1999 |
| JP | 11142725 | A | 5/1999 |
| JP | 2000330009 | A | 11/2000 |
| JP | 2000330184 | A | 11/2000 |
| JP | 2001066494 | A | 3/2001 |
| JP | 2001-268409 | A | 9/2001 |
| JP | 2002010123 | A | 1/2002 |
| JP | 2002-152646 | A | 5/2002 |

* cited by examiner

FIG.12
IMAGE FORMED BY
TELE-MODE IMAGE PICKUP DEVICE
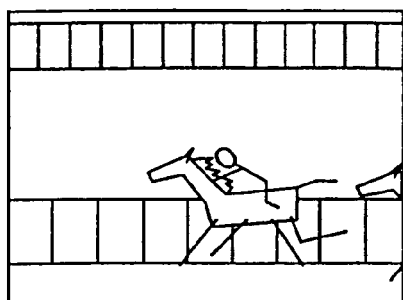
IMAGE FORMED BY
WIDE-MODE IMAGE PICKUP DEVICE
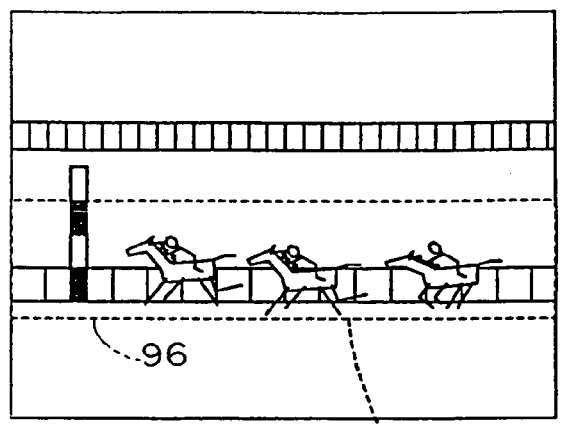
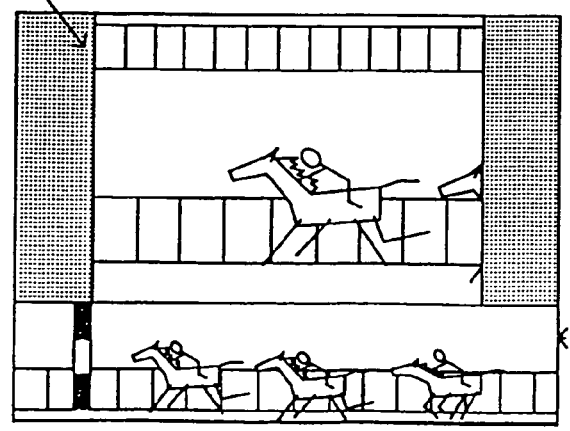

| 1 | 1 | 1 | 1 | 1 | 1 | 1 | 1 |
|---|---|---|---|---|---|---|---|
| 1 | 3 | 3 | 3 | 3 | 3 | 3 | 1 |
| 1 | 3 | 6 | 6 | 6 | 6 | 3 | 1 |
| 1 | 3 | 6 | 7 | 7 | 6 | 3 | 1 |
| 1 | 3 | 6 | 7 | 7 | 6 | 3 | 1 |
| 1 | 3 | 6 | 6 | 6 | 6 | 3 | 1 |
| 1 | 3 | 3 | 3 | 3 | 3 | 3 | 1 |
| 1 | 1 | 1 | 1 | 1 | 1 | 1 | 1 |

AF SEARCHES

SUCCESSFUL FOCUSING

UNSUCCESSFUL FOCUSING

FIG.39

| FOCUSING POSITION OF FOCUSING LENS OF FIRST PHOTOGRAPHING SYSTEM | FOCUSING POSITION OF FOCUSING LENS OF SECOND PHOTOGRAPHING SYSTEM |
|---|---|
| A1 | B1 |
| A2 | B2 |
| ⋮ | ⋮ |
| Ai | Bi |

DIGITAL CAMERA WITH A NUMBER OF PHOTOGRAPHING SYSTEMS

This is a divisional of application Ser. No. 10/370,629 filed Feb. 24, 2003. The entire disclosure of the prior application, application Ser. No. 10/370,629 is hereby incorporated by reference.

BACKGROUND OF THE INVENTION

1. Field of the Invention

The present invention relates to a digital camera, and more particularly to a digital camera including a display device which displays an image formed by an image pickup device such as CCD.

The invention relates to a digital camera having a plurality of photographing systems, and more particularly to a digital camera having a plurality of photographing systems which are independently constructed including a plurality of solid-state image pickup devices such as CCDs, and which have automatic focusing functions, respectively.

2. Description of the Related Art

In recent years, a large number of digital cameras have been distributed as imaging apparatuses each having a CCD image pickup device or the like which is capable of easy photographing. In its photographing operation, the digital camera reads charges corresponding to the quantity of light (through photoelectric conversion) every pixel by the CCD image pickup device or the like, and converts the charges into image data, whereupon it records a photographed image as the image data on a recording medium such as magnetic recording medium.

In the course from the formation of an image to the recording, the digital conversion process of the formed image, an image creation process for displaying the formed image and a recording process for recording the photographed image are respectively executed as principal processes every photographing frame.

Besides, the digital camera of this type has become capable of photographing a dynamic image, owing to the use of the CCD image pickup device or the like. It has been proposed to photograph a dynamic image, for example, in such a way that a plurality of lens units are arrayed in the direction of an optic axis, and that the respective lens units are driven to zoom in accordance with photographing optical systems changed over and selected, so as to form optical images on the CCD (refer to JP-A No. 10-262175).

Further, imaging apparatuses etc. each including a plurality of CCD image pickup devices have been proposed. By way of example, in a technique disclosed in JP-A No. 11-122536, it has been proposed to dispose a plurality of CCDs for black-and-white use and for color use or ones of different device sizes, and a control unit for driving the CCDs, to divide an optical signal from an optical lens and receive divided signals by the respective CCDs, and to execute a signal process by the control unit. In this technique, the CCDs for photographing are changed over in accordance with the situation of surroundings, whereby an image corresponding to the circumstances can be obtained.

The digital camera stated above includes a zoom lever, and has the zoom function of enlarging or reducing the image of a subject on the basis of the operation of the zoom lever. There has also been proposed a camera including two photographing systems, and two display units which correspond to the respective photographing systems and which display images obtained by the respective photographing systems.

With the prior-art digital camera, however, during telescopic photographing, only a subject to be photographed can be confirmed by an optical finder or a display device of liquid crystal or the like functioning as the optical finder, and the situation of surroundings cannot be confirmed. This poses, for example, the problem that the proceeding of a game is not noticed in sports photographing, so the photographing of a scoring scene or any accident is missed.

Besides, an autofocusing function in the prior art poses a problem in case of using a lens of short focal depth, such as zoom lens, and depending upon the reference position and focal position of the lens on the occasion of autofocusing. More specifically, as shown in FIG. 18 by way of example, when contrast at each lens position is calculated as the lens is moved in the direction of arrow A in FIG. 18 (as the lens is moved from the side of the longest focal distance), a distance which the lens is moved till the detection of the maximum value of the contrast becomes longer than in case of moving the lens in the opposite direction to the direction of the arrow A, so that a longer time is expended in searching for the focal position.

Besides, in the case of using a lens of short focal depth, such as zoom lens, it is common that a stepping motor for driving the focusing lens is driven at intervals of several steps, thereby to specify a rough focal position range (as rough search), whereupon the stepping motor is finely driven, thereby to search the specified rough focal position range for a focus. Even on this occasion, as in the above, there is the problem that, since a focus search range is extensive in the rough search, a distance which the lens is moved becomes long, so a long time is expended in searching for a focal position.

Besides, even when the digital camera has the autofocusing function, a user cannot know which range the image of a subject is automatically focused on the CCD in, if the image of the subject has been focused, and so forth.

Further, it is considered to furnish a camera with two photographing systems, and two display units which display images obtained by the respective imaging systems, in correspondence with these respective imaging systems, and to dispose zoom levers in correspondence with the respective imaging systems in case of widening or narrowing an image angle.

Besides, an autofocusing function in the prior art performs autofocusing in such a way that, as shown in FIG. 35 by way of example, the position of a lens focusing in a case where a photographing distance to a subject is the closest distance previously determined is set as an initial position, whereupon a lens position at which a contrast value becomes the maximum value is found as a focusing position as the lens is driven stepwise every predetermined distance L from the initial position to the position of the lens focusing in a case where the photographing distance to the subject is an infinite distance. Accordingly, there is the problem that, when the focusing position lies on an infinite distance side as shown in FIG. 35, a long time is expended on the detection of the focusing position. With a contrary setting at which the position of the lens focusing in a case where the photographing distance to the subject is the infinite distance is set as an initial position, a long time is expended on the detection of the focusing position when the focusing position lies on a closest distance side.

SUMMARY OF THE INVENTION

The present invention has been made in order to solve the above problems, and has for its first object to provide a digital camera which can photograph while grasping the situation of surroundings.

The invention has been made in order to solve the above problems, and has for its second object to provide a digital camera having a plurality of photographing systems as can shorten a search time for a focal position.

The invention has been made in view of the above facts, and has for its third object to provide a digital camera which is capable of recognizing a focus adjustment state.

The invention has been made in view of the above facts, and has for its fourth object to provide a digital camera which can have a simple apparatus construction even when it includes two photographing systems and is permitted to change the size of the image of a subject.

The invention has been made in order to solve the above problems, and has for its fifth object to provide a digital camera which can shorten a detection time for a focusing position.

In order to accomplish the first object, the first aspect of a digital camera according to a first invention comprises a first photographing system and a second photographing system which respectively photograph a subject; a changeover switch which changeovers a photographing system for photographing the subject, to one of said first photographing system and said second photographing system; and a display control unit which displays an image formed by one photographing system determined by said changeover switch, and which performs a display control so as to display information other than the formed image.

That is, the first photographing system and the second photographing system respectively photograph the subject.

The changeover switch changeovers the photographing system for photographing the subject, to either the first photographing system or the second photographing system. The display control unit displays the image formed by one photographing system determined by the changeover switch, and it performs the display control so as to display the information other than the formed image.

Here, in the second aspect, a photographing state of said second photographing system differs from a photographing state of said first photographing system; and said display control unit performs the display control so as to display image information which is the information other than said formed image, and which represents an image formed by the other photographing system not being said photographing system determined by said changeover switch.

More specifically, in accordance with this aspect, photographing systems which include a main photographing system and a sub photographing system are included as the first photographing system and the second photographing system, and the main photographing system and the sub photographing system photograph the subject in the photographing states different from each other (for example, photographing states of different image angles). For example, the subject can be photographed in the different photographing states in such a way that the subject is photographed by employing a plurality of CCD image pickup devices of different sizes. Incidentally, each of the photographing systems may consist of a single photographing system, or it may well consist of the main photographing system and the sub photographing system.

The changeover switch changeovers the photographing system for photographing the subject, to either the main photographing system or the sub photographing system. Besides, the display control unit displays the image formed by one photographing system determined by the changeover switch, and it performs the display control so as to display the image information which represents the image formed by the other photographing system. The display control may be performed so as to display the image formed by the other photographing system, as the image information, or it may well be performed so as to display the information of, e. g., a region corresponding to the formed image. Besides, the display control may well be performed so as to display information other than the formed image, e. g., the operation menu of the digital camera, as the image information.

Thus, as the image formed by one photographing system is displayed, the image information indicative of the image formed by the other photographing system can also be displayed, so that the image information indicative of the image which is formed by the other photographing system and which is other than the image formed by one photographing system can also be confirmed in photographing. Accordingly, the subject can be photographed as the situation of surroundings is grasped.

Besides, in the third aspect, the digital camera further comprises a recording unit which records the image formed by said one photographing system determined by said changeover switch. In accordance with this aspect, the recording unit is further comprised in the second aspect, and the recording unit records the image formed by one photographing system determined by the changeover switch. Thus, only the image formed by one photographing system is recorded without recording the image formed by the other photographing system, so that the recording capacity of the recording unit can be suppressed.

Moreover, in a case where the image formed by one photographing system is recorded by the recording unit, a user can record it while confirming the image information indicative of the image formed by the other photographing system as displayed by the display control of the display control unit. Therefore, when the user wants to record the image formed by the other photographing system, in this case, he/she can record it easily by altering one photographing system to the other photographing system through the changeover of the changeover switch, and he/she is prevented from missing a shutter chance.

In accordance with the fourth aspect, in the second aspect or the third aspect, the first and the second photographing system are respectively constructed of photographing systems whose image angles are different from each other. This can be incarnated by employing, for example, CCD image pickup devices whose sizes are different, or lens systems of different image angles for the respective CCD image pickup devices.

By applying the photographing systems of different image angles in this manner, the user is permitted to photograph the subject by, for example, a wide-angle photographing system while confirming the image formed by a telescopic photographing system.

By the way, in any of the second through fourth aspects, aspects as stated below can be performed.

As the fifth aspect, the display control unit displays the respective images formed by the main photographing system and the sub photographing system, on a single display screen.

In accordance with the fifth aspect, the display control unit in any of the second through fourth aspects can display the respective images formed by the main photographing system and the sub photographing system, on the single display screen. By way of example, in a case where a telescopic photographing system and a wide-angle photographing system are included, the image formed by the wide-angle photographing system can be displayed at the central part of the image formed by the telescopic photographing system, or the image formed by the other photographing system can be displayed as being small at part of the image formed by one photographing system.

In the sixth aspect, in any of the second through fourth aspects, the display control unit has a plurality of display screens, and image information items which indicate the image formed by one photographing system and the image formed by the other photographing system are respectively displayed on the separate display screens.

That is, in accordance with the sixth aspect, the display control unit in any of the second through fourth aspects can display the respective images formed by the plurality of photographing systems, on the separate display screens. By way of example, the display screens can be disposed in the number of the photographing systems so as to display the respective images. On this occasion, by disposing the display screens of different sizes, the display control may well be performed so as to display the image formed by the photographing system determined by the changeover switch, on the larger display screen. Besides, all the plurality of display screens may well be equalized in size.

As the seventh aspect, in each of the above aspects, the main photographing system and the sub photographing system are constructed of a single optical system which forms an image of a subject, a splitting unit which splits the subject image formed by the optical system, into a plurality of images, and a plurality of image pickup devices which pick up the subject images split by the splitting unit.

In accordance with the seventh aspect, in each of the above aspects, the plurality of photographing systems (main photographing system and sub photographing system) are constructed of the single optical system, the splitting unit and the plurality of image pickup devices, and the subject image entering the optical system is split by the splitting unit into the plurality of images, which are formed on the plurality of image pickup devices. Thus, the subject images can be photographed by the plurality of photographing systems. It is possible, for example, to split light entered from one lens, into two light beams by the splitting unit such as semitransparent mirror, and to form the images of the light beams on the two image pickup devices such as CCDs.

As the eighth aspect, in each of the above aspects, each of the main photographing system and the sub photographing system is constructed of an optical system which focuses a subject, and an image pickup device which forms a subject image focused by the optical system.

In accordance with the eighth aspect, in each of the above aspects, each of the plurality of photographing systems (main photographing system and sub photographing system) is permitted to construct one photographing system out of the optical system and the image pickup device. That is, the photographing systems can be rendered independent of each other, and various photographing modes such as telescopic, wide-angle and zooming modes are possible by disposing the plurality of independent photographing systems in this manner.

As the ninth aspect, in the first aspect, the first photographing system and the second photographing system include image pickup devices which picks up an image of a subject, an optical system which focuses subject on the image pickup devices, and a focus adjustment unit which adjusts a focus for the subject, and the display control unit performs the display control so as to display a focus adjustment state which indicates a state of the focus adjustment based on the focus adjustment unit of the photographing system determined by the changeover switch, as information other than the formed image.

In order to accomplish the above object, a digital camera in the first aspect of a second invention comprises a first photographing system and a second photographing system which respectively photograph a subject; a changeover switch which changeovers a photographing system for photographing the subject, to one of said first photographing system or said second photographing system; and a utilization unit which utilizes focus adjustment information at the time when a focus is adjusted when photographing the subject with one photographing system determined by said changeover switch, for a use other than the focus adjustment.

As the second aspect, in the first aspect, said first photographing system and said second photographing system include image pickup devices which picks up the image of the subject, an optical system which forms the image of the subject on said image pickup devices, and a focus adjustment unit which adjusts a focus for the subject; and said utilization unit displays the photographed image obtained by one photographing system determined by said changeover switch, and displays a focus adjustment state which expresses a state of the focus adjustment based on said focus adjustment unit of said one photographing system determined by said changeover switch, on the basis of the focus adjustment information at the time when the focus is adjusted when photographing the subject by said one photographing system.

More specifically, in this aspect, at least one photographing system is comprised. The photographing system includes the image pickup devices which picks up the image of the subject, the optical system which forms the image of the subject on the image pickup devices, and the focus adjustment unit which adjusts the focus for the subject.

Here, in a prior-art digital camera, a focus for a subject is adjusted, but a range in which the focusing is to be established, if the focusing has been established, etc. are not known.

Therefore, the utilization unit in this aspect displays the image obtained by the imaging of the photographing system, and the focus adjustment state expressing the state of the focus adjustment based on the focus adjustment unit.

Here, the focus adjustment state may well be set as at least one of a focusing range which is that range of the subject in which the focus is being adjusted, and the adjusted result of the focus.

In this manner, the image obtained by the imaging of the photographing system and the focus adjustment state expressing the state of the focus adjustment based on the focus adjustment unit are displayed, so that the focus adjustment state can be recognized.

Here, the invention comprises at least one photographing system, and it may well comprise the first photographing system which photographs the subject, and the second photographing system the photographing state of which is different from that of the first photographing system.

In the third aspect, when said photographing systems have been changedover by said changeover switch, said utilization unit displays an adjusted result of the focus in correspondence with the image obtained by the photographing of the photographing system determined by said changeover switch, and it displays a focusing range being that range of the subject in which the focus is being adjusted, in correspondence with, at least, the image obtained by the imaging of the changed over photographing system.

In this manner, the utilization unit displays the adjusted result of the focus in correspondence with the image obtained by the photographing of the photographing system determined by the changeover switch, and it displays the focusing range being that range of the subject in which the focus is being adjusted, in correspondence with, at least, the image obtained by the imaging of the changed over photographing system, so that the focus adjustment state can be recognized more.

Incidentally, it is also allowed to employ such a construction that the plurality of photographing systems include a first photographing system, and a second photographing system the photographing state of which is different from that of the first photographing system, and that a utilization unit displays an image formed by one photographing system determined by a changeover switch, while it performs a display control so as to display image information indicative of an image formed by the other photographing system.

In the fourth aspect, said second photographing system has a focal depth set shorter than that of said first photographing system; and a focus adjustment control unit is further comprised for controlling the respective focus adjustment units of said first photographing system and said second photographing system so that, when said second photographing system has been determined by said changeover switch, the focus adjustment unit of said first photographing system may be controlled so as to perform the focus adjustment based on the first focus adjustment unit, whereupon the focus adjustment based on the focus adjustment unit of said second photographing system is performed on the basis of a focus adjustment result based on said first focus adjustment unit.

When the second photographing system has been determined by the changeover switch, that is, when the subject is to be photographed by the second photographing system, note must be taken of the fact that the second optical system is set shorter in the focal depth than the first optical system. On account of this fact, in case of adjusting the focus by the second focus adjustment unit, a focal distance range in which the focus adjustment is performed by the second focus adjustment unit of the second photographing system is broader than in the first photographing system, so that a longer time is expended on a search for the focus in the focus adjustment.

Therefore, the focus adjustment control unit controls the respective focus adjustment units of the first photographing system and the second photographing system so that, after the focus adjustment unit of the first photographing system is controlled so as to perform the focus adjustment based on the first focus adjustment unit, the focus adjustment based on the focus adjustment unit of the second photographing system may be performed on the basis of the focus adjustment result based on the first focus adjustment unit.

More specifically, when the subject is to be photographed by the second photographing system, the first focus adjustment unit is controlled by the focus adjustment control unit so as to perform the focus adjustment, and a rough focal distance is specified by the focus adjustment based on the first focus adjustment unit. Thereafter, the second focus adjustment unit is controlled so as to perform the focal adjustment based on this unit, in order to search, for example, the range of the specified rough focal distance for a focal position on the basis of the result of the focus adjustment based on the first focus adjustment unit. That is, after the rough focal position is specified by the first photographing system of narrower focal distance range (longer focal depth), the focus adjustment based on the second photographing system is performed on the basis of the specified rough focal position. Therefore, as compared with a case where a focal distance is specified by only the second photographing system of wider focal distance range (shorter focal depth), the search for the focal position can be made in the narrower range, and hence, a time period required for the focus search can be rendered shorter.

Incidentally, the second optical system can employ a zoom lens. Since the focal depth of the zoom lens is short, a long time is expended on the focus adjustment. In this regard, the time period for the focus adjustment based on the second photographing system can be shortened in such a way that the rough focal position is specified by the first photographing system which is longer in the focal depth than the zoom lens.

Besides, the first optical system can employ a monofocal lens. Since the monofocal lens has a long focal depth, a focal search can be made in a short time in specifying the rough focal position, by employing the monofocal lens for the first optical system.

In the fifth aspect, said first photographing system includes a first image pickup device which picks up an image of a subject, a first monofocal optical system which forms the image of the subject on said first image pickup device, and a first focus adjustment unit which adjusts a focus for the subject, while said second photographing system includes a second image pickup device which picks up an image of a subject, a second variable-focus optical system whose focus is variable and which forms an image of the subject on said second image pickup device, and a second focus adjustment unit which adjusts the focus for the subject; said digital camera further comprises a single image-angle alteration unit by which an alteration of an image angle is instructed; and in a case where said first photographing system has been determined by said changeover switch and where the alteration of the image angle has been instructed by said image-angle alteration unit, said utilization unit submits image data obtained by said first photographing system, to image processing so as to correspond to an image whose image angle is altered in correspondence with the instruction of said image-angle alteration unit, while in a case where said second photographing system has been determined by said changeover switch and where the alteration of the image angle has been instructed by said image-angle alteration unit, said utilization unit utilizes the focus adjustment information by adjusting said second variable-focus optical system through said second focus adjustment unit so as to alter the image angle in correspondence with the instruction of said image-angle alteration unit.

That is, the digital camera according to the invention comprises the first photographing system and the second photographing system. The first photographing system includes the first image pickup device which picks up the image of the subject, the first monofocal optical system which forms, the image of the subject on the first image pickup device, and the first focus adjustment unit which adjusts the focus for the subject.

The second photographing system includes the second image pickup device which picks up the image of the subject, the second variable-focus optical system whose focus is variable and which forms the image of the subject on the second image pickup device, and the second focus adjustment unit which adjusts the focus for the subject.

The changeover switch changeovers the photographing system for photographing the subject, to the first photographing system or the second photographing system. The image-angle alteration unit serves to instruct the alteration of the image angle, and the invention comprises the single image-angle alteration unit.

In the case where the first photographing system has been determined by the changeover switch and where the alteration of the image angle has been instructed by the image-angle alteration unit, the utilization unit submits the image data obtained by the first photographing system, to the image processing so as to alter the image angle in correspondence with the instruction of the image-angle alteration unit.

Besides, in the case where the second photographing system has been determined by the changeover switch and where the alteration of the image angle has been instructed by the image-angle alteration unit, the utilization unit adjusts the second variable-focus optical system through the second focus adjustment unit so as to alter the image angle in correspondence with the instruction of the image-angle alteration unit.

In this manner, the alterations of the image angles of the first and second photographing systems can be instructed by the single image-angle alteration unit, so that the apparatus can be rendered simple in construction.

Meanwhile, in the case where the second photographing system has been determined by the changeover switch and where the alteration of the image angle has been instructed by the image-angle alteration unit, the utilization unit adjusts the second variable-focus optical system. In this regard, in a case where the second variable-focus optical system has been instructed to alter the image angle in excess of an adjustable range, by the image-angle alteration unit through the second focus adjustment unit, the image angle cannot be altered by the adjustment of the second variable-focus optical system.

In the sixth aspect, therefore, in a case where said second variable-focus optical system has been instructed to alter the image angle in excess of an adjustable range by said image-angle alteration unit through said second focus adjustment unit said utilization unit submits image data obtained by said second photographing system to image processing so as to correspond to an image whose image angle is altered in correspondence with the instruction of said image-angle alteration unit.

In the seventh aspect, a display device which displays images is further comprised, and said image-angle control unit controls said display device so as to display the images which are respectively obtained by said first photographing system and said second photographing system, regardless of a changeover state based on said changeover switch.

In the eighth aspect, a display device which displays images is further comprised, and said image-angle control unit controls said display device so as to display only the image obtained by said first photographing system, in a case where said first photographing system has been determined by said changeover switch, and to display the images respectively obtained by said first photographing system and said second photographing system, in a case where said second photographing system has been determined by said changeover switch.

In the ninth aspect, said optical system of said second photographing system has a focal depth set shorter than that of said optical system of said first photographing system; and in a case where said second photographing system has been determined by said changeover switch, the image-angle control unit controls the respective focus adjustment units of said first photographing system and said second photographing system so that, after said focus adjustment unit of said first photographing unit is controlled so as to perform the focus adjustment based on said first focus adjustment unit, the focus adjustment based on said focus adjustment unit of said second photographing system may be performed on the basis of a result of the focus adjustment based on said first focus adjustment unit.

More specifically, when the subject is to be photographed by the second photographing system, the first focus adjustment unit is controlled by the control unit so as to perform the focus adjustment based on the first focus adjustment unit, and a rough focal distance is specified. Thereafter, the second focus adjustment unit is controlled so as to perform the focal adjustment based on this unit, in order to search, for example, the range of the specified rough focal distance for a focal position on the basis of the result of the focus adjustment based on the first focus adjustment unit. That is, after the rough focal position is specified by the first photographing system of narrower focal distance range (longer focal depth), the focus adjustment based on the second photographing system is performed on the basis of the specified rough focal position. Therefore, as compared with a case where a focal distance is specified by only the second photographing system of wider focal distance range (shorter focal depth), the search for the focal position can be made in the narrower range, and hence, a time period required for the focus search can be rendered shorter.

Incidentally, a zoom lens can be employed as the second variable-focus optical system. Since the focal depth of the zoom lens is short, a long time is expended on the focus adjustment. In this regard, the time period for the focus adjustment based on the second photographing system can be shortened in such a way that the rough focal position is specified by the first photographing system which is longer in the focal depth than the zoom lens.

Besides, a monofocal lens can be employed as the first monofocal optical system. Since the monofocal lens has a long focal depth, a focal search can be made in a short time in specifying the rough focal position, by employing the monofocal lens for the first optical system.

In order to accomplish the above object, a digital camera in the first aspect of a third invention comprises a first photographing system and a second photographing system which respectively pick up an image of a subject; and a focus adjustment control unit which performs a focus adjustment when photographing the subject by at least one of said first photographing system and said second photographing system, by utilizing both said first photographing system and said second photographing system.

In the second aspect, said first photographing system includes a first image pickup device which picks up an image of a subject, a first optical system which forms the image of the subject on said first image pickup device, and a first focus adjustment unit which adjusts a focus for the subject, while said second photographing system includes a second image pickup device which picks up an image of a subject, a second optical system which forms the image of the subject on said second image pickup device and which has a focal depth set shorter than that of said first optical system, and a second focus adjustment unit which adjusts the focus for the subject; and when the subject is to be photographed by said second photographing system, said focus adjustment control unit controls said first focus adjustment unit so as to perform the focus adjustment based on said first focus adjustment unit and thereafter controls said second focus adjustment unit so as to perform the focus adjustment based on said second focus adjustment unit, on the basis of a result of the focus adjustment based on said first focus adjustment unit.

The first imaging system consists of the first image pickup device, the first optical system and the first focus adjustment unit, and the subject image is formed on the first image pickup device by the first optical system. On this occasion, the focal position is adjusted by the first focus adjustment unit.

Besides, the second imaging system similarly consists of the second image pickup device, the second optical system and the second focus adjustment unit, and the subject image is formed on the second image pickup device by the second optical system. On this occasion, the focal position is adjusted by the second focus adjustment unit.

Here, in a case where the subject is to be photographed by the second photographing system, note must be taken of the fact that the second optical system is set shorter in the focal depth than the first optical system. On account of this fact, in case of adjusting the focus by the second focus adjustment unit, a focal distance range in which the focus adjustment is performed by the second focus adjustment unit of the second photographing system is broader than in the first photographing system, so that a longer time is expended on a search for the focus in the focus adjustment.

Therefore, when the subject is to be photographed by the second photographing system, the first focus adjustment unit is controlled by the focus adjustment control unit so as to perform the focus adjustment based on the first focus adjustment unit, and a rough focal distance is specified. Thereafter, the second focus adjustment unit is controlled so as to perform the focal adjustment based on the second focus adjustment unit, in order to search, for example, the range of the specified rough focal distance for the focal position on the basis of the result of the focus adjustment based on the first focus adjustment unit. That is, after the rough focal position is specified by the first photographing system of narrower focal distance range (longer focal depth), the focus adjustment based on the second photographing system is performed on the basis of the specified rough focal position. Therefore, as compared with a case where a focal distance is specified by only the second photographing system of wider focal distance range (shorter focal depth), the search for the focal position can be made in the narrower range, and hence, a time period required for the focus search can be rendered shorter.

In the third aspect, said second optical system includes a zoom lens. Accordingly, the rough focal position is specified by the first photographing system the focal depth of which is longer than that of the zoom lens, whereby a time period for the focus adjustment based on the second photographing system can be shortened.

Besides, said first optical system can employ a monofocal lens. Since the monofocal lens has a long focal depth, the focus can be searched for in a short time in specifying the rough focal position, by employing the monofocal lens for the first optical system.

Further, the fourth aspect further comprises a changeover switch which changeovers a photographing system for photographing the subject, to one of said first photographing system or said second photographing system, and a display device which displays images; and said focus adjustment control unit controls said display device so as to display the image formed by one photographing system determined by said changeover switch, and to display image information indicative of the image formed by the other photographing system.

Thus, while the image formed by either of the first photographing system and the second photographing system is being displayed, also the image information indicative of the image formed by the other photographing system can be displayed. It is therefore possible to confirm during photographing, also the image information indicative of the image which is other than the image formed by one photographing system and which is formed by the other photographing system. Accordingly, the photographing can be performed as the situation of surroundings is grasped.

Incidentally, the fifth aspect further comprises a recording unit which records the image photographed by said one photographing system determined by said changeover switch. Besides, in the sixth aspect, said first photographing system and said second photographing system are photographing systems whose image angles are different from each other.

By the way, in the seventh aspect, a focal distance is specified within a predetermined range on the basis of the result of the first focus adjustment, and the focus adjustment based on the second focus adjustment unit is controlled so as to proceed only within the predetermined range.

Besides, in the eighth aspect, each of the first focus adjustment unit and the second focus adjustment unit includes a drive unit which drives a focusing lens included in the corresponding optical system, and a focus control unit which calculates a contrast value from image data representing the subject image obtained from the corresponding image pickup device and which controls the drive unit on the basis of the contrast value.

In the ninth aspect, said first photographing system includes a first image pickup device which picks up a subject, and a first lens which forms the image of the subject on said first image pickup device; said second photographing system includes a second image pickup device which is substantially identical to said first image pickup device, and a second lens which is substantially identical to said first lens; and said focus adjustment control unit drives said first lens so as to move from a first predetermined position side at which said first lens is to be located in a case where a focusing position is one end of a predetermined photographing distance range, toward a second predetermined position side at which said first lens is to be located in a case where the focusing position is the other end of the photographing distance range, while it drives said second lens so as to move from the second predetermined position side toward the first predetermined position side, and it performs the focus adjustment on the basis of the image of the subject obtained by said first image pickup device and the image of the subject obtained by said second image pickup device.

In accordance with the ninth aspect, the two photographing systems which are substantially identical in construction (performance) are comprised. Each of the photographing systems includes the image pickup device, and the lens for forming the image of the subject on the image pickup device.

The focus adjustment control unit performs the focus adjustment on the basis of the image of the subject obtained by the first image pickup device and the image of the subject obtained by the second image pickup device.

The focus adjustment control unit executes the focus adjustment while moving the first lens and the second lens. More specifically, the first lens is driven so as to move from the first predetermined position side at which the first lens is to be located in the case where the focusing position is one end of the predetermined photographing distance range, toward the second predetermined position side at which the first lens is to be located in the case where the focusing position is the other end of the photographing distance range. Besides, simultaneously therewith, the second lens is driven so as to move from the second predetermined position side toward the first predetermined position side. Here, the photographing distance range can be set as, for example, a range from the infinite distance to the closest distance. In this case, one end of the photographing distance range is the position of the infinite distance, and the other end is the position of the closest distance.

In this manner, the focus adjustment is executed while the two lenses are being moved in directions opposite to each other, so that a time period for the focus adjustment can be sharply shortened.

In the tenth aspect, said first photographing system includes a first image pickup device which picks up a subject, and a first lens which forms the image of the subject on said first image pickup device; said second photographing system includes a second image pickup device which picks up a subject, and a second lens which forms the image of the subject on said second image pickup device, at least one of said second image pickup device and said second lens being different from the corresponding one of said first photographing system; and said focus adjustment control unit drives said first lens so as to move from a first predetermined position side at which said first lens is to be located in a case where a focusing position is one end of a predetermined photographing distance range, toward a second predetermined position side at which said first lens is to be located in a case where the focusing position is the other end of the photographing distance range, while it drives said second lens so as to move from the second predetermined position side toward the first predetermined position side, and it performs the focus adjustment on the basis of the image of the subject obtained by said first image pickup device and the image of the subject obtained by said second image pickup device.

In accordance with this aspect, the two photographing systems which are different in construction (performance) are comprised. Each of the photographing systems includes the image pickup device, and the lens for forming the image of the subject on the image pickup device. The respective photographing systems are different in, at least, either of the image pickup devices and the lenses. Such a difference includes, for example, the case of construction where the image pickup devices are different in size or the number of pixels and where the lenses are identical, or the case of construction where the image pickup devices are identical and where the image angles of the lenses are different.

The focus adjustment control unit performs the focus adjustment on the basis of the image of the subject obtained by the first image pickup device and the image of the subject obtained by the second image pickup device.

The focus adjustment control unit executes the focus adjustment while moving the first lens and the second lens. More specifically, the first lens is driven so as to move from the first predetermined position side at which the first lens is to be located in the case where the focusing position is one end of the predetermined photographing distance range, toward the second predetermined position side at which the first lens is to be located in the case where the focusing position is the other end of the photographing distance range. Besides, simultaneously therewith, the second lens is driven so as to move from the second predetermined position side toward the first predetermined position side. Here, the photographing distance range can be set as, for example, a range from the infinite distance to the closest distance. In this case, one end of the photographing distance range is the position of the infinite distance, and the other end is the position of the closest distance.

In this manner, the focus adjustment is executed while the two lenses are being moved in directions opposite to each other, so that a time period for the focus adjustment can be sharply shortened.

Here, even in a case, for example, where the numbers of pixels of the first image pickup device and the second image pickup device are different, no problem is posed on condition that the sizes thereof are equal. The reason therefor is that the subject to be imaged by the first image pickup device and the subject to be imaged by the second image pickup device are substantially identical, so the focusing positions of the first and second lenses become substantially identical.

On the other hand, in a case where the sizes of the first image pickup device and the second image pickup device are different, a problem might be posed because the subject to be imaged by the first image pickup device and the subject to be imaged by the second image pickup device are different.

In the eleventh aspect, said first image pickup device has a size different from that of said second image pickup device; and said focus adjustment control unit performs the focus adjustment on the basis of an image of a predetermined focus adjustment area in the image of the subject formed by said first image pickup device, and an image of a focus adjustment area having the same image angle as that of the first-mentioned focus adjustment area, in the image of the subject formed by said second image pickup device.

That is, the image angles of the focus adjustment areas are rendered identical in the two photographing systems. Thus, even in the case where the sizes of the image pickup devices are different, the images which are utilized for the focus adjustment become substantially identical, and hence, the peak positions of AF evaluation values can be rendered identical.

In the twelfth aspect, said focus adjustment control unit may well set an initial position of said first lens at the first predetermined position and an initial position of said second lens at the second predetermined position. Thus, in a case where the focusing position exists on one side of the photographing distance range, a time period for the focal adjustment can be sharply shortened.

In the thirteenth aspect, said focus adjustment control unit can calculate as a first evaluation value, contrast of the image of the subject formed by said first image pickup device, and as a second evaluation value, contrast of the image of the subject formed by said second image pickup device, and it can move said first lens and said second lens to a position at which at least one of the first evaluation value and the second evaluation value is maximized. Thus, the focus adjustment can be accurately performed on the basis of the contrasts of the formed images.

Alternatively, the focus adjustment unit may well be operated so as to find those positions of the first lens and the second lens at which the first evaluation value and the second evaluation value become substantially equal, to set a predetermined range which includes the middle position between the found positions of the first and second lenses, and to move the first lens to one end of the predetermined range and the second lens to the other end thereof.

The contrast of each formed image is considered to become the maximum at the focusing position and to decrease more at the same rate as the position of the corresponding lens comes nearer to an infinite distance side or a closest distance side with respect to the focusing position, and the focusing position is considered to exist at or near the middle position between those positions of the first and second lenses at which the first and second evaluation values become substantially equal. Accordingly, the predetermined range including the middle position is set as a range in which the focusing position exists, and the first lens is moved to one end of the predetermined range, while the second lens is moved to the other end of the predetermined range, whereupon the focus adjustment is consecutively executed. Thus, a time period for detecting the focusing position can be shortened still further.

It is also allowed to employ a construction comprising a photographing system which includes a first image pickup device for imaging a subject, a second image pickup device being substantially identical to said first image pickup device, a branch unit for branching light entered from the subject, to said first image pickup device and said second image pickup device, and a lens for forming the images of the subject on said first image pickup device and said second image pickup device; and a focus adjustment unit which drives said first image pickup device so as to move from a first predetermined position side where said first image pickup device is to be located when a focusing position is one end of a predetermined photographing distance range, toward a second predetermined position side where said first image pickup device is to be located when the focusing position is the other end of the photographing distance range, and also drives said second image pickup device so as to move from the second predetermined position side toward the first predetermined position side, and which performs a focus adjustment on the basis of the image of the subject obtained by said first image pickup device and the image of the subject obtained by said second image pickup device. Thus, the focus adjustment can be executed on the basis of the identical images, so that a more accurate focus adjustment can be effected.

Besides, it is allowed to employ a construction comprising a photographing system which includes a first image pickup device for imaging a subject, a second image pickup device being different from said first image pickup device, a branch unit for branching light entered from the subject, to said first image pickup device and said second image pickup device, and a lens for forming the images of the subject on said first image pickup device and said second image pickup device; and a focus adjustment unit which drives said first image pickup device so as to move from a first predetermined position side where said first image pickup device is to be located when a focusing position is one end of a predetermined photographing distance range, toward a second predetermined position side where said first image pickup device is to be located when the focusing position is the other end of the photographing distance range, and also drives said second image pickup device so as to move from the second predetermined position side toward the first predetermined position side, and which performs a focus adjustment on the basis of the image of the subject obtained by said first image pickup device and the image of the subject obtained by said second image pickup device.

The first image pickup device and the second image pickup device are different in, at least, one of size and the number of pixels by way of example, and the focus adjustment can be implemented as described before. A more accurate focus adjustment can be effected by sharing the lens in this manner.

A digital camera according to a fourth invention comprises at least one photographing system which includes an image pickup device which picks up an image of a subject, an optical system which forms an image of the subject on said image pickup device, and a focus adjustment unit for adjusting a focus for the subject; and a display unit which displays the picked up an image of said photographing system, and further displays a focus adjustment state indicated by said focus adjustment unit.

BRIEF DESCRIPTION OF THE DRAWINGS

FIG. 12 is a diagram showing another method of displaying images formed by a plurality of photographing systems in the digital camera according to the embodiment of the invention;

FIG. 38A is a graph showing the relationship between the lens position and contrast value of the focusing lens of a photographing system of wide-angle mode, while FIG. 39 is a table showing the corresponding relationship between the focusing positions of the focusing lens of the first photographing system and those of the focusing lens of the second photographing system, according to the seventh embodiment of the invention.

DESCRIPTION OF THE PREFERRED EMBODIMENTS

First Embodiment

Now, an example of the first embodiment of the present invention will be described in detail with reference to the drawings.

Figure 1A:
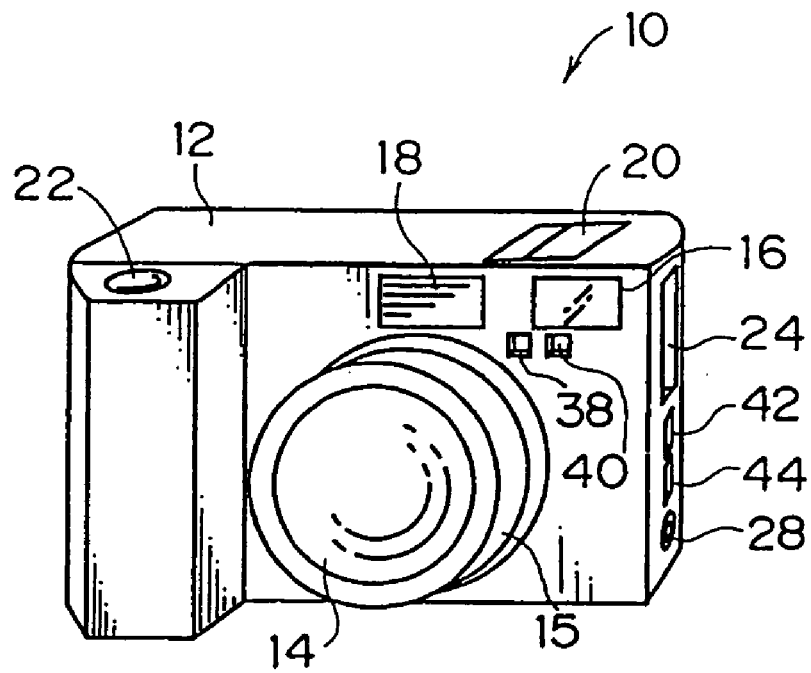
FIGS. 1A and 1B are perspective views each showing the external appearance of a digital camera according to the first embodiment of the present invention.
Figure 1B:
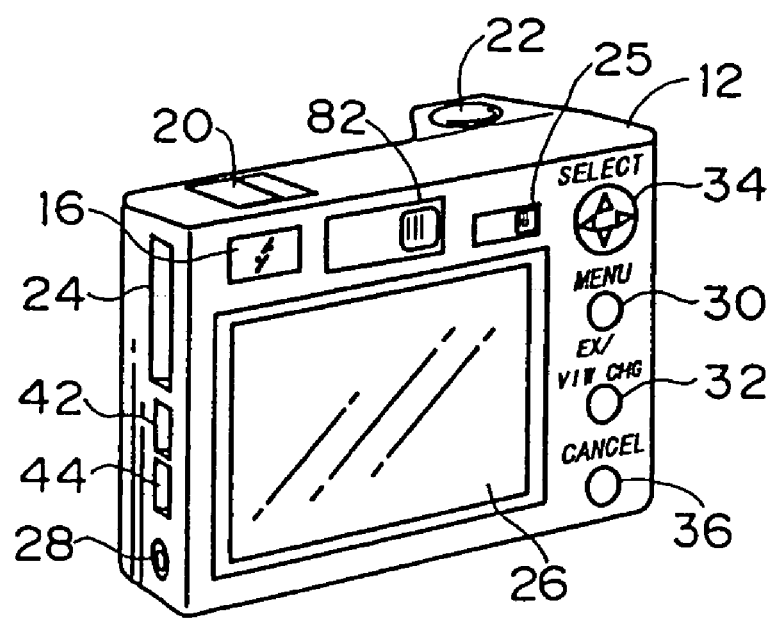

As shown in FIGS. 1A and 1B, a digital camera 10 has a substantially box-like body 12, and it is in such a shape that a protrusion (grip portion) for facilitating the grip of the body 12 is formed on a left side as viewed from the front. A body tube 15 in which a lens 14 is fitted is disposed on the front central part of the body 12. A strobe 18 for emitting auxiliary light in cases of photographing at a low illuminance, etc., and an optical finder 16 for a user to confirm a photographing range, etc. by the eye are mounted on the parts of the body 12 above the lens 14.

Besides, at positions near the strobe 18, there are respectively provided a strobe light receiving window 38 for guiding strobe light to a strobe light receiving sensor, which detects the quantity of light of the strobe light reflected to retrocede from a subject at the strobe light emission, and an AE light receiving window 40 for guiding light to a built-in AE sensor.

On the upper surface of the body 12, a power source switch 20 and a release switch 22 are respectively disposed on a right side as viewed from the front and on the left side (at a position corresponding to the grip portion). The right side surface of the body 12 as viewed from the front is provided with a slot 24 into which a memory card (not shown) can be loaded.

Besides, on the right side surface of the digital camera 10, there are disposed a USB (Universal Serial Bus) terminal 42 to which a USB cable is connected, the USB cable serving to externally transfer image data that are stored in a built-in memory included in the digital camera 10 or the memory card loaded in the slot 24, and a portable telephone terminal 44 which is used when the digital camera 10 is connected with a portable telephone in externally transmitting the image data stored in the built-in memory or the memory card, through the portable telephone.

Further, an AC adapter connection port 28 to which an AC adapter for obtaining a supply voltage from an AC power source is connected is provided under the portable telephone terminal 44, whereby the AC power source can be connected to the digital camera 10.

Besides, as shown in FIG. 1B, a color display 26 which includes a transmissive type liquid crystal (which may well be a semi-transmissive type one) is disposed on the rear surface of the body 12. The display 26 is constructed having a backlighting unit made of a fluorescent lamp, an LED or the like. Incidentally, the display 26 also has the function of the optical finder 16.

Disposed on the right side of the rear surface of the body 12 are a select (SELECT) switch 34, a menu (MENU) switch 30, an execute/view change (EX/VIEW CHG) switch 32 and a cancel (CANCEL) switch 36. Incidentally, the select switch 34 is a switch for selecting any of modes on a menu screen or the like displayed by depressing the menu switch 30, and the selected mode is executed by the execute/view change switch 32. Besides, the cancel switch 36 is a switch for canceling any of the various modes.

Further, a photographing mode changeover switch 82 for changing over photographing modes, and a tele/wide changeover switch 25 are disposed on the rear surface of the body 12. The static image photographing mode for photographing a static image, and the dynamic image photographing mode for photographing a dynamic image are changed over by manipulating the photographing mode changeover switch 82, while a tele-mode (telescopic mode) and a wide-mode (wide-angle mode) are changed over by manipulating the tele/wide changeover switch 25. Incidentally, the tele/wide changeover switch 25 corresponds to changeover means in the invention.

Figure 2:
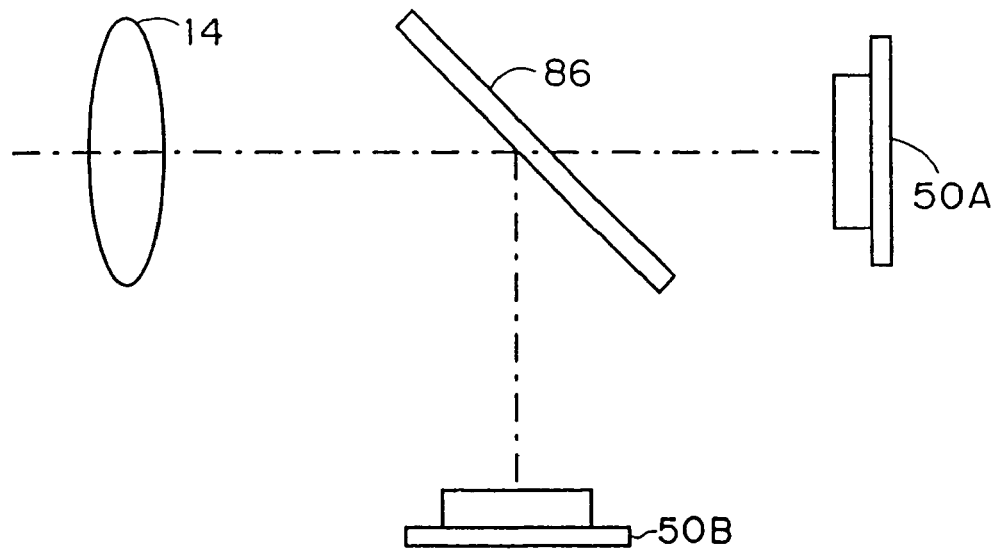
FIG. 2 is a diagram showing the photographing systems of the digital camera according to the embodiment of the invention.

Meanwhile, the photographing systems of the digital camera 10 according to this embodiment include two image pickup devices 50A, 50B of different sizes as shown in FIG. 2 A subject image entered from a lens 14 is split by a semi-transparent mirror 86 being split means, and the split images are respectively formed on the two image pickup devices 50A, 50B. Incidentally, the larger image pickup device 50A is used for the wide-mode, and the smaller image pickup device 50B for the tele-mode.

By the way, the two image pickup devices 50A, 50B, the lens 14 and the semitransparent mirror 86 correspond to photographing systems including a main photographing system and a sub photographing system in the invention.

Figure 3:
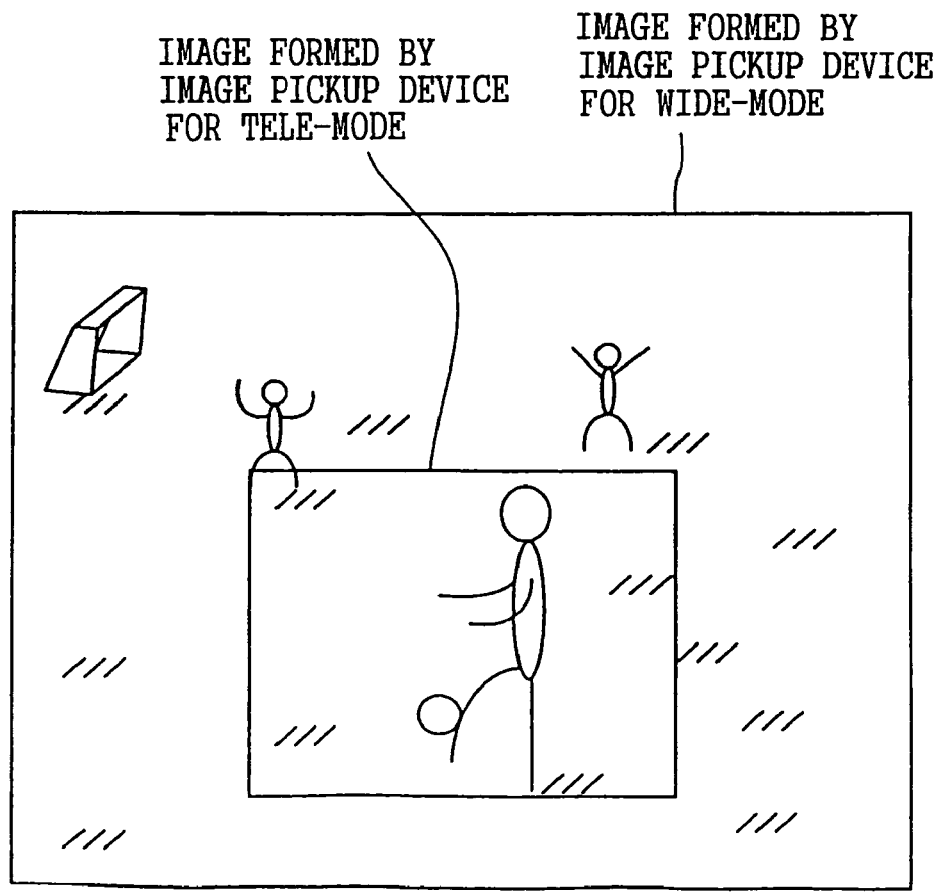
FIG. 3 is a diagram showing a display example of images formed by the plurality of photographing systems of the digital camera according to the embodiment of the invention.

Besides, as shown in FIG. 3 byway of example, the subject images formed by the respective image pickup devices 50A, 50B are composited and displayed on the screen of the display 26 so as to be respectively confirmable. Incidentally, FIG. 3 shows an example in which the image formed by the smaller image pickup device 50B is displayed at the central part of the image formed by the larger image pickup device 50A. In this case, both the images may well be composited so that the image formed by the smaller image pickup device 50B may correspond onto the image formed by the larger image pickup device 50A. Also, a frame or the like may well be displayed as image information at that position on the image formed by the larger image pickup device 50A which corresponds to the image formed by the smaller image pickup device 50B.

Figure 4:
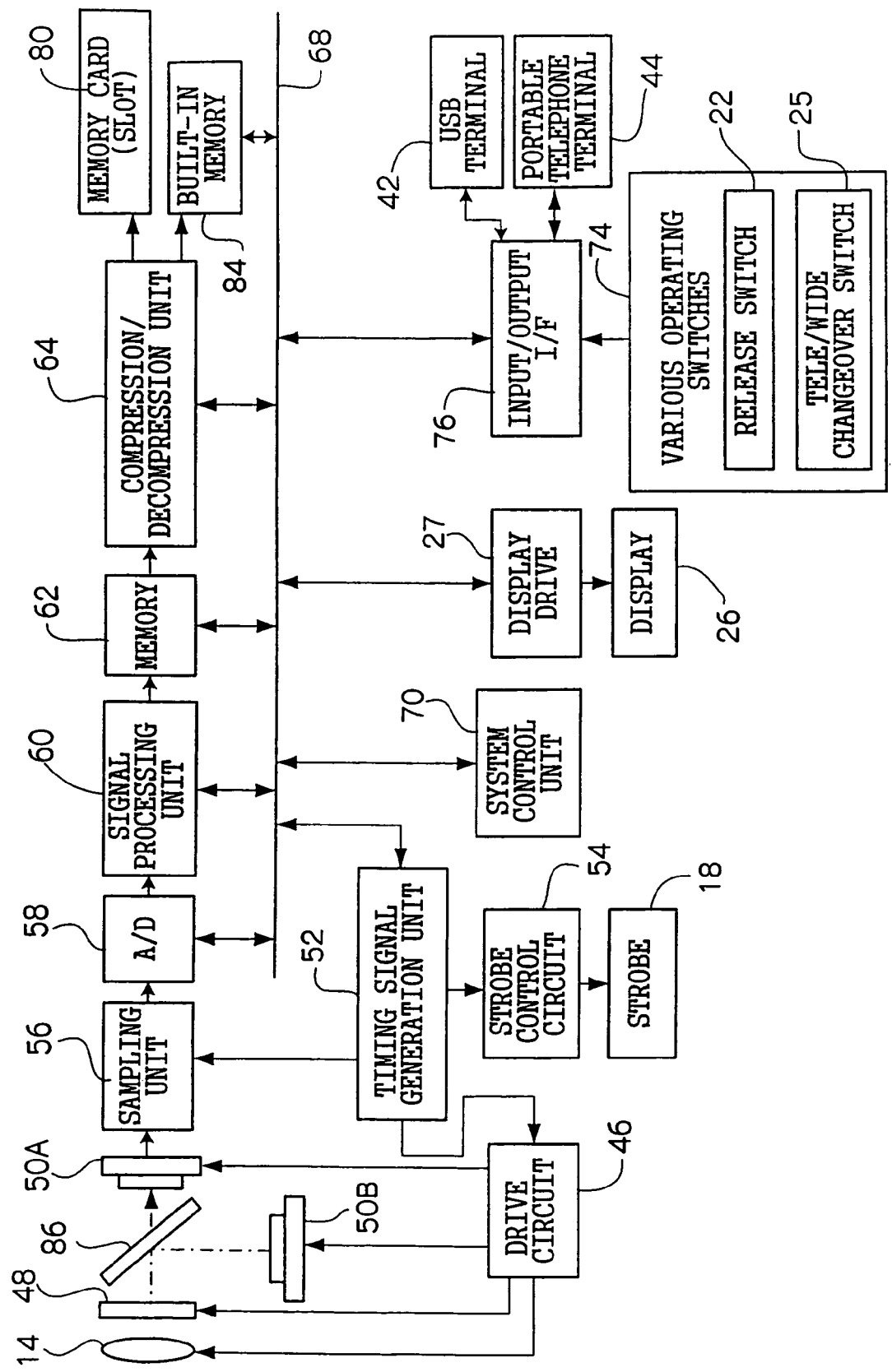
FIG. 4 is a block diagram showing the construction of the electric system of the digital camera according to the embodiment of the invention.

Shown in FIG. 4 is the construction of the electric system of the digital camera 10.

The two image pickup devices 50A, 50B each including an area CCD sensor or the like are arranged at positions which correspond to the focal positions of the lens 14 inside the body 12. As stated above, light reflected from a subject and entering the lens 14 is split in two by the semitransparent mirror 86, and the split light beams are respectively focused on the photosensitive faces of the image pickup devices 50A, 50B.

Each of the image pickup devices 50A, 50B outputs as image signals, analog signals which represent the quantities of light respectively received by a large number of photoelectric conversion cells that are arrayed in the shape of a matrix on the photosensitive face. Each of the image pickup devices 50A, 50B is driven at timings synchronized with timing signals which are generated by a timing signal generation unit 52 connected to a drive circuit 46, thereby to output the image signals.

An aperture stop 48 is arranged between the lens 14 and the image pickup devices 50A, 50B. The aperture stop 48 may be constructed of a single aperture stop whose aperture is continuously alterable, or it may well be constructed of a plurality of aperture stops which have different apertures and which are changed over.

A strobe control circuit 54 which controls the light emission of the strobe 18, is further connected to the timing signal generation unit 52. In a case where a low illuminance has been detected or where an instruction for the light emission has been given by the user, the strobe 18 is controlled to emit light at a timing synchronized with a timing signal generated by the timing signal generation unit 52.

A sampling unit 56, an A/D converter 58, a signal processing unit 60, a memory 62 and a compression/decompression unit 64 are successively connected to the signal output end of the image pickup device 50. They are respectively connected to a system bus 68, and they are collectively controlled by a system control unit 70 connected to the system bus 68.

The sampling unit 56 samples the image signals outputted from the image pickup device 50, at timings synchronized with timing signals generated by the timing signal generation unit 52, and it amplifies the sampled signals and then outputs them to the A/D converter 58. The sampling unit 56 is constructed including a CDS (Correlated Double Sampling) unit, not shown. When an image pickup device of, for example, CCD type is employed, the CDS unit basically includes a clamp circuit which clamps various noise ascribable to the image pickup device, by a timing signal from the timing signal generation unit 52, and a sample-and-hold circuit which holds an analog voltage signal by a timing signal. The CDS unit removes a noise component, and sends the image signal as an analog output signal to the A/D converter 58. The image signal outputted from the sampling unit 56 is converted by the A/D converter 58 into digital image data, which is inputted to the signal processing unit 60. In the signal processing unit 60, the inputted image data is submitted to various processes such as color correction, γ correction and Y/C conversion. The image data outputted from the signal processing unit 60 is temporarily stored in the memory 62 such as RAM. After being compressed by the compression/decompression unit 64, the image data is stored in the built-in memory 84 or the memory card 80 loaded in the slot 24. Incidentally, the built-in memory 84 or the memory card 80 corresponds to record means in the invention.

Although not shown here in FIG. 4, a sampling unit, an A/D converter and a signal processing unit are connected to the signal output end of the image pickup device 50B, similarly to the output end of the image pickup device 50A. Signal processing as stated above is executed by the signal processing unit, and likewise to the above, image data is temporarily stored in the memory 62, compressed by the compression/decompression unit 64 and is thereafter stored in the built-in memory 84 or the memory card 80 loaded in the slot 24.

Figure 5:
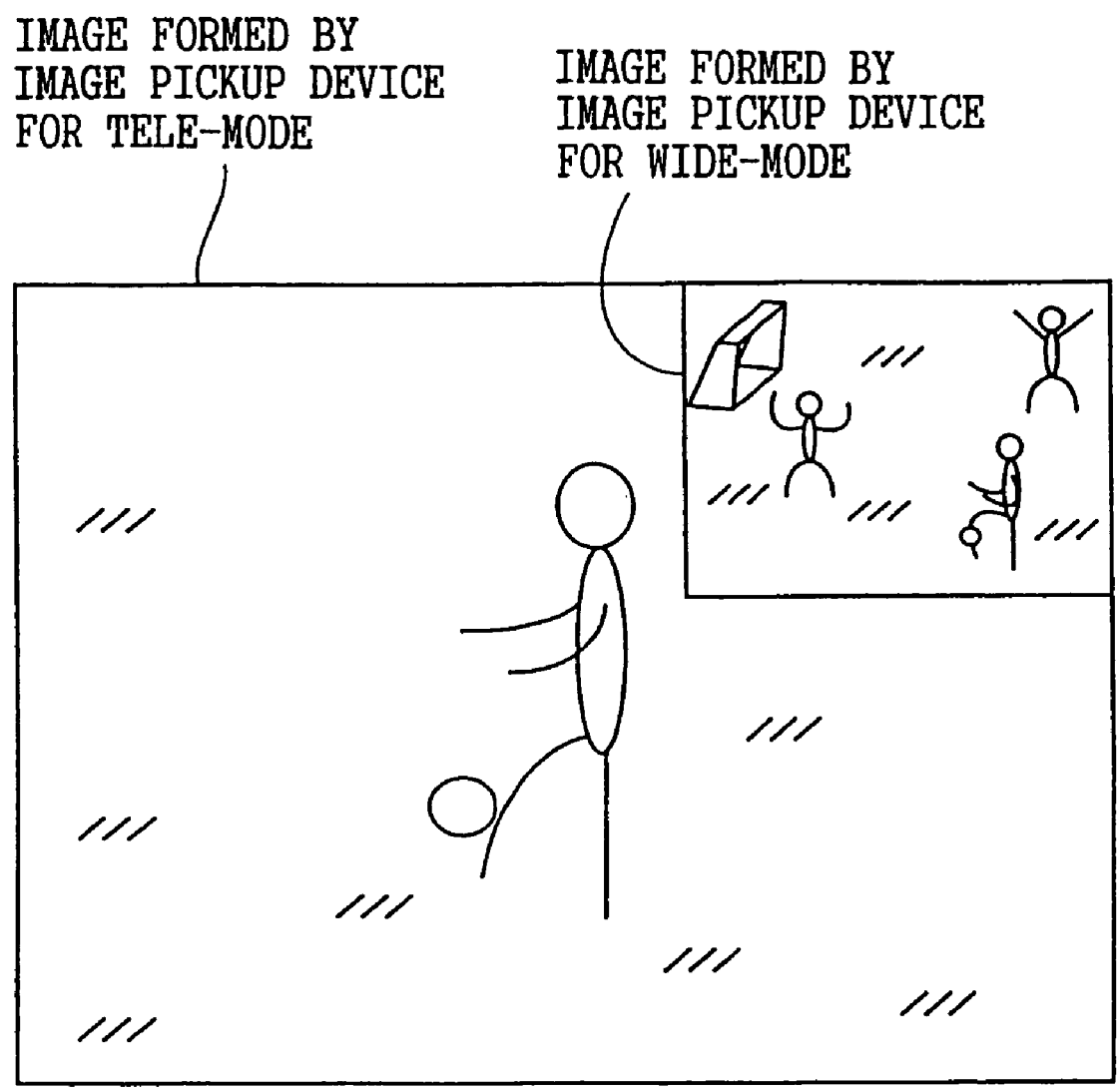
FIG. 5 is a diagram showing another display example of images formed by the plurality of photographing systems.

Besides, a display driver 27 for driving the display 26 is also connected to the system bus 68. Thus, the display 26 is permitted to display an image based on the image data obtained by imaging, and it is submitted to a display control by the display driver 27 so as to display various display aspects. By way of example, it is allowed to employ the aspect as shown in FIG. 3 in which the image formed by the wide-mode image pickup device 50A is displayed on the whole area, while the image formed by the tele-mode image pickup device 50B is displayed substantially at the central part (in this case, the respective images formed may be composited, or the frame or the like may well be displayed on the position of the wide-mode image corresponding to the telescopic-mode image). It is also allowed to employ an aspect as shown in FIG. 5 in which an image formed by one image pickup device is displayed on the whole area, while an image formed by the other image pickup device is displayed to be small at a corner. Incidentally, FIG. 5 shows an example in which the image formed by the tele-mode image pickup device 50B is displayed on the whole area, while the image formed by the wide-mode image pickup device 50A is displayed to be small at the corner.

By the way, the display driver 27 and the display 26 correspond to display control means in the invention.

Further connected to the system bus 68 is an input/output interface (I/F) 76 to which the USB terminal 42, the portable telephone terminal 44 and various operating switches (such as the menu switch 30, execute/view change switch 32, select switch 34, cancel switch 36 and photographing mode changeover switch 82) 74 including the release switch 22 and the tele/wide changeover switch 25 are connected. Thus, controls complying with the manipulations of the various operating switches 74 are performed.

More specifically, in a case where the user has given the instruction of storing image data in the built-in memory 84 or the memory card 80 loaded in the slot 24, through the manipulation of the release switch 22 by way of example, the system control unit 70 reads out the image data temporarily stored in the memory 62 and transfers it to the compression/decompression unit 64. Thus, the image data is compressed by the compression/decompression unit 64 and is thereafter stored in the built-in memory 84 or the memory card 80. By the way, in accordance with the mode of photographing, the image data is sometimes stored in the built-in memory 84 or the memory card 80 without being compressed.

Besides, in a case where the user has given the instruction of reproducing (displaying) an image which is represented by image data stored in the built-in memory 84 or the memory card 80 loaded in the slot 24, the image data is read out from the built-in memory 84 or the memory card 80 loaded in the slot 24, and the read-out image data is expanded by the compression/decompression unit 64 and is thereafter temporarily stored in the memory 62. Subsequently, the image is displayed (reproduced) on the display 26 by using the image data temporarily stored in the memory 62.

Incidentally, images formed by the image pickup devices 50A, 50B are selectively recorded in the built-in memory 84 or the memory card 80 in compliance with the manipulations of the tele/wide changeover switch 25, respectively.

Figure 6:
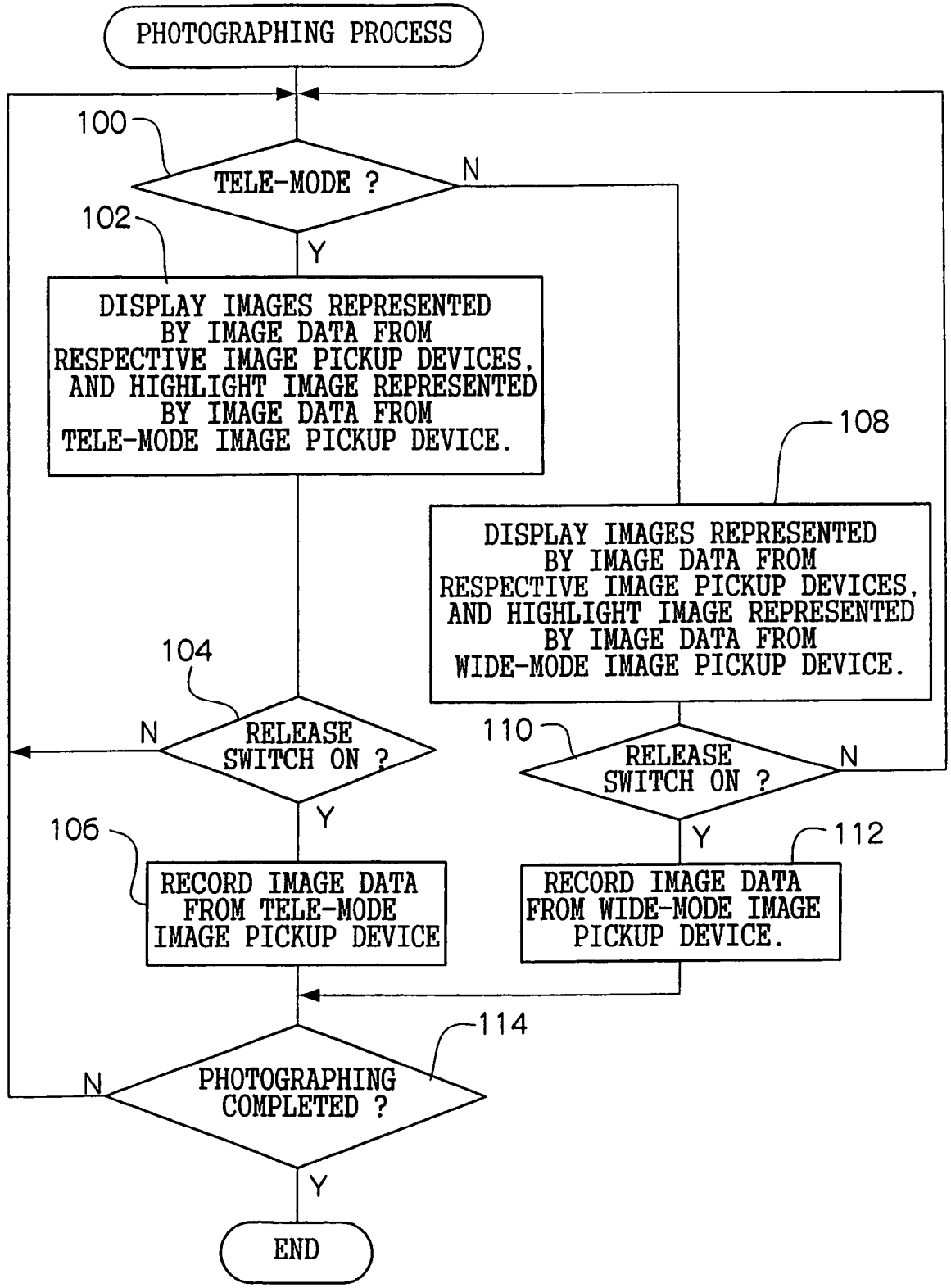
FIG. 6 is a flow chart showing the process of a photographing operation in the digital camera according to the embodiment of the invention.

Next, as the operation of the digital camera 10 constructed as stated above, a process in the case of photographing a static image will be described with reference to the flow chart of FIG. 6. Incidentally, the static image photographing is started by changing over the photographing mode changeover switch 82 to a static image photographing mode.

At a step 100, whether or not a photographing mode is the tele-mode is decided. The decision is given by deciding whether or not the tele/wide changeover switch 25 is thrown on its telescopic photographing side.

In a case where the decision of the step 100 has been affirmed, the routine shifts to a step 102, at which images represented by image data from the two image pickup devices 50A, 50B are respectively displayed on the display 26, while the image represented by the image data from the tele-mode image pickup device 50B is highlighted. By way of example, referring to FIG. 3, owing to the drive of the display 26 by the display driver 27, the image represented by the image data from the wide-mode image pickup device SOA is displayed, while the image represented by the image data from the tele-mode image pickup device 50B is displayed substantially at the central part of the wide-mode image. Here in the display, the frame part of the image represented by the image data from the tele-mode image pickup device 50B is emphasized, or the image represented by the image data from the wide-mode image pickup device 50A is shaded. Alternatively, as shown in FIG. 5, the image represented by the image data from the tele-mode image pickup device 50B is displayed on the whole screen of the display 26, while the image represented by the image data from the wide-mode image pickup device 50A is displayed to be small at a corner. By the way, in the case as shown in FIG. 3 where the image formed by the tele-mode image pickup device 50B is displayed substantially at the central part of the image formed by the wide-mode image pickup device 50A, only image information such as a frame may well be displayed on that position of the image formed by the wide-mode image pickup device 50A which corresponds to the image formed by the tele-mode image pickup device 50B, without displaying the image itself formed by the tele-mode image pickup device 50B.

According to the display in FIG. 3 or FIG. 5, both the image to be recorded (the image formed by one image pickup device) and the image not to be recorded (the image formed by the other image pickup device) are displayed, so that the image to be recorded can be confirmed, while the image not to be recorded can be subsidiarily confirmed.

At a step 104, whether or not the release switch 22 has been turned ON is decided. In a case where the decision has been negated, the routine returns to the step 100, and the above processing is repeated.

In a case where the decision of the step 104 has been affirmed, the routine shifts to a step 106, at which the image data from the tele-mode image pickup device 50B is recorded. That is, the image data from the tele-mode image pickup device 50B is temporarily stored in the memory 62. Subsequently, the system control unit 70 reads out the image data temporarily stored in the memory 62 and transfers it to the compression/decompression unit 64. Thus, the image data is compressed by the compression/decompression unit 64 and is thereafter stored in the built-in memory 84 or the memory card 80.

On the other hand, in a case where the decision of the step 100 has been negated, that is, where the tele/wide changeover switch 25 is thrown on its wide-mode side, the routine shifts to a step 108.

At the step 108, images represented by image data from the two image pickup devices 50A, 50B are respectively displayed on the display 26, while the image represented by the image data from the wide-mode image pickup device 50A is highlighted. By way of example, referring to FIG. 3, owing to the drive of the display 26 by the display driver 27, the image represented by the image data from the wide-mode image pickup device 50A is displayed, while the image represented by the image data from the tele-mode image pickup device 50B is displayed substantially at the central part of the wide-mode image. Here in the display, the frame part of the image represented by the image data from the wide-mode image pickup device 50A is emphasized, or a frame corresponding to the image represented by the image data from the tele-mode image pickup device 50B is made difficult to see (by a frame of dotted line, fine line or the like). Alternatively, contrariwise to the illustration of FIG. 5, the image represented by the image data from the wide-mode image pickup device 50A is displayed on the whole screen of the display 26, while the image represented by the image data from the tele-mode image pickup device 50B is displayed to be small at a corner. By the way, in the case as shown in FIG. 3 where the image formed by the tele-mode image pickup device 50B is displayed substantially at the central part of the image formed by the wide-mode image pickup device 50A, only image information such as a frame may well be displayed on that position of the image formed by the wide-mode image pickup device 50A which corresponds to the image formed by the tele-mode image pickup device 50B, as an inconspicuous display (of, for example, a dotted line or a fine line), without displaying the image itself formed by the tele-mode image pickup device 50B.

According to the display in FIG. 3 or contrary to FIG. 5, both the image to be recorded (the image formed by one image pickup device) and the image not to be recorded (the image formed by the other image pickup device) are displayed, so that the image to be recorded can be confirmed, while the image not to be recorded can be subsidiarily confirmed.

At a step 110, whether or not the release switch 22 has been turned ON is decided. In a case where the decision has been negated, the routine returns to the step 100, and the above processing is repeated.

In a case where the decision of the step 110 has been affirmed, the routine shifts to a step 112, at which the image data from the wide-mode image pickup device 50A is recorded. That is, the image data from the wide-mode image pickup device 50A is temporarily stored in the memory 62. Subsequently, the system control unit 70 reads out the image data temporarily stored in the memory 62 and transfers it to the compression/decompression unit 64. Thus, the image data is compressed by the compression/decompression unit 64 and is thereafter stored in the built-in memory 84 or the memory card 80.

Subsequently, when the image data has been recorded at the step 106 or the step 112, the routine shifts to a step 114, at which whether or not photographing has ended is decided. The decision is given by deciding, for example, whether or not the power source switch 20 has been turned OFF, or whether or not the instruction of a reproduction mode has been given by manipulating the various switches 74. When the decision has been negated, the routine returns to the step 100, and the above processing is repeated, and when the decision of the step 114 has been affirmed, the photographing process is ended.

In this manner, with the digital camera 10 according to this embodiment, the image represented by the image data from the tele-mode image pickup device 50B and the image represented by the image data from the wide-mode image pickup device 50A are simultaneously displayed on the display 26. The image can therefore be photographed as the situation of surroundings is grasped, in such a way that the photographing is performed after manipulating the tele/wide changeover switch 26 in accordance with the circumstances. More specifically, the tele/wide changeover switch 25 is thrown onto the side of the main or desired image pickup device, and the image formed by the main image pickup device is recorded. Since, on this occasion, the image formed by the other image pickup device than the main image pickup device is also displayed on the display 26, the photographing is permitted as the situation of the surroundings is grasped. Accordingly, a shutter chance can be prevented from being missed.

Incidentally, although the photographing process in the static image photographing mode has been described with reference to FIG. 6, the image represented by the image data from the tele-mode image pickup device 50B and the image represented by the image data from the wide-mode image pickup device 50A are simultaneously displayed on the display 26, similarly in the photographing of a dynamic image.

Figure 7:
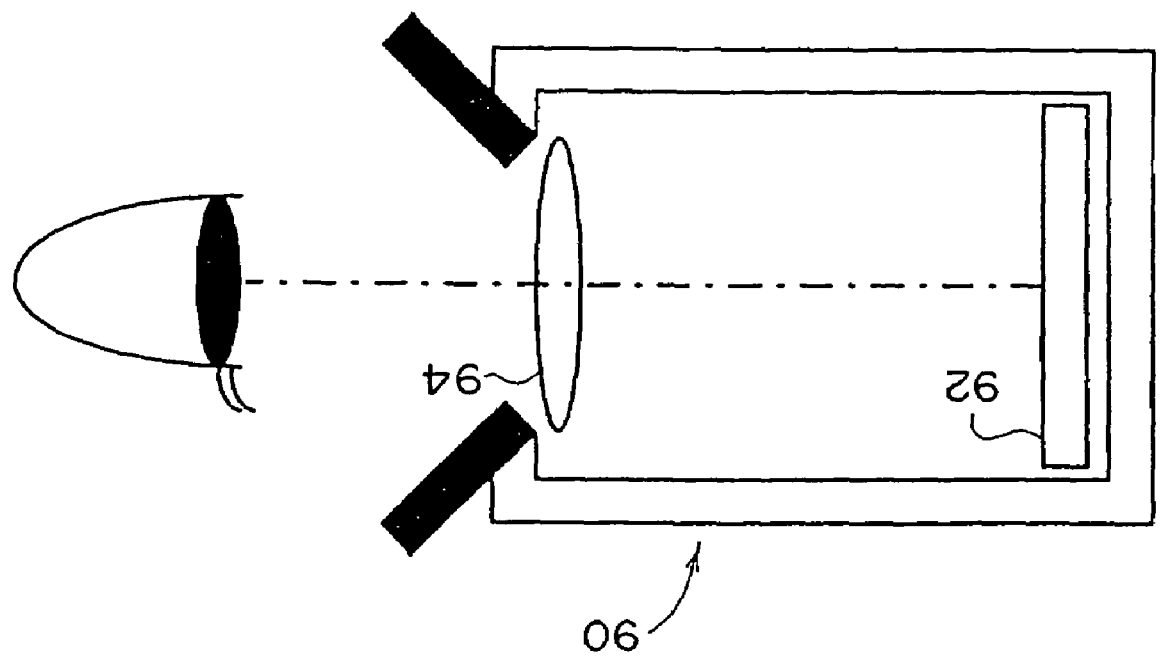
FIG. 7 is a diagram showing another example of a display unit which displays images formed.

Besides, although in the above embodiment, the images formed by the two image pickup devices 50A, 50B are displayed in the photographing operation, images as displayed on the display 26 may well be displayed by an electronic finer 90 which includes a display device 92 of liquid crystal or the like, a lens 94, etc. as shown in FIG. 7.

Figure 8:
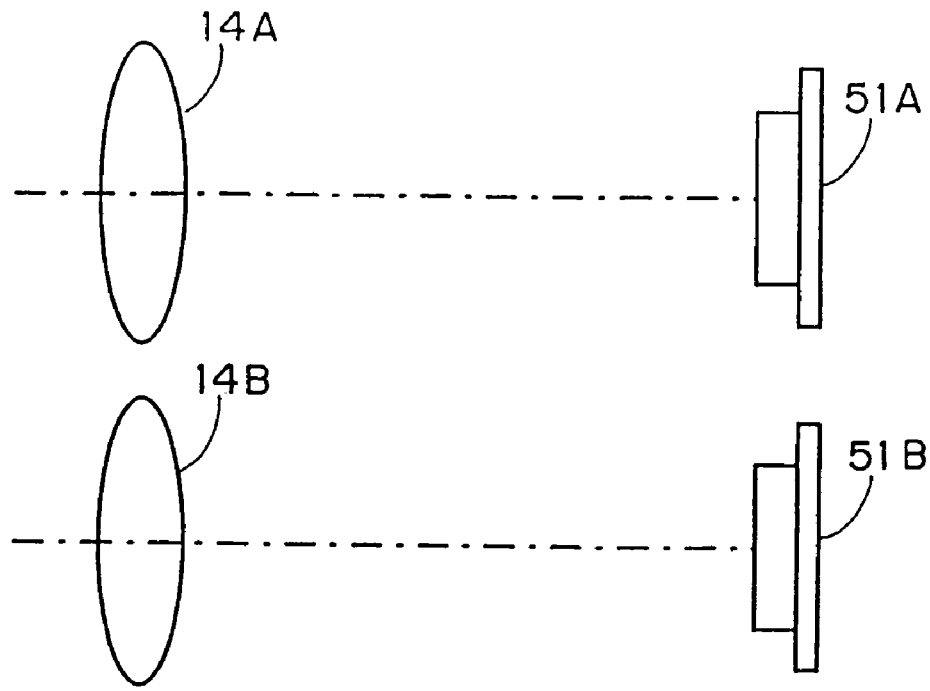
FIG. 8 is a diagram showing another construction of the photographing systems of the digital camera according to the embodiment of the invention.

Next, there will be described a digital camera in a first modification to the digital camera 10 according to the above embodiment. In the foregoing embodiment, the two photographing systems are so constructed that the light entered by the single optical system (lens 14) is split by the semitransparent mirror 86, and that the subject images are formed on the two image pickup devices 50A, 50B whose sizes are different from each other. In the first modification, as shown in FIG. 8, two photographing systems are constructed independently of each other in such a way that a wide-angle lens and a telescopic lens are respectively included as a wide-mode lens 14A and a telescopic lens 14B, and that two image pickup devices 51A, 51B are disposed in correspondence with the respective lenses. Incidentally, the two image pickup devices 51A, 51B may have either equal sizes or different sizes. Besides, the tele-mode lens 14B may well be a zoom lens (variable focal-distance lens).

Even when the two photographing systems are constructed quite independently of each other in this manner, the same advantage as in the foregoing embodiment can be attained.

Figure 9:
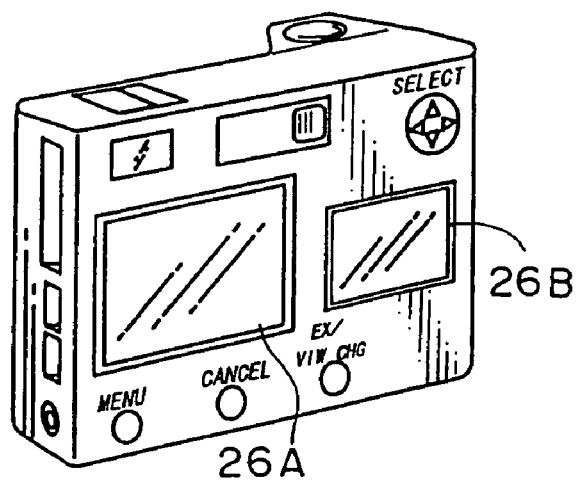
FIG. 9 is a view showing an example of a digital camera which includes two display screens for displaying images formed.
Figure 10:
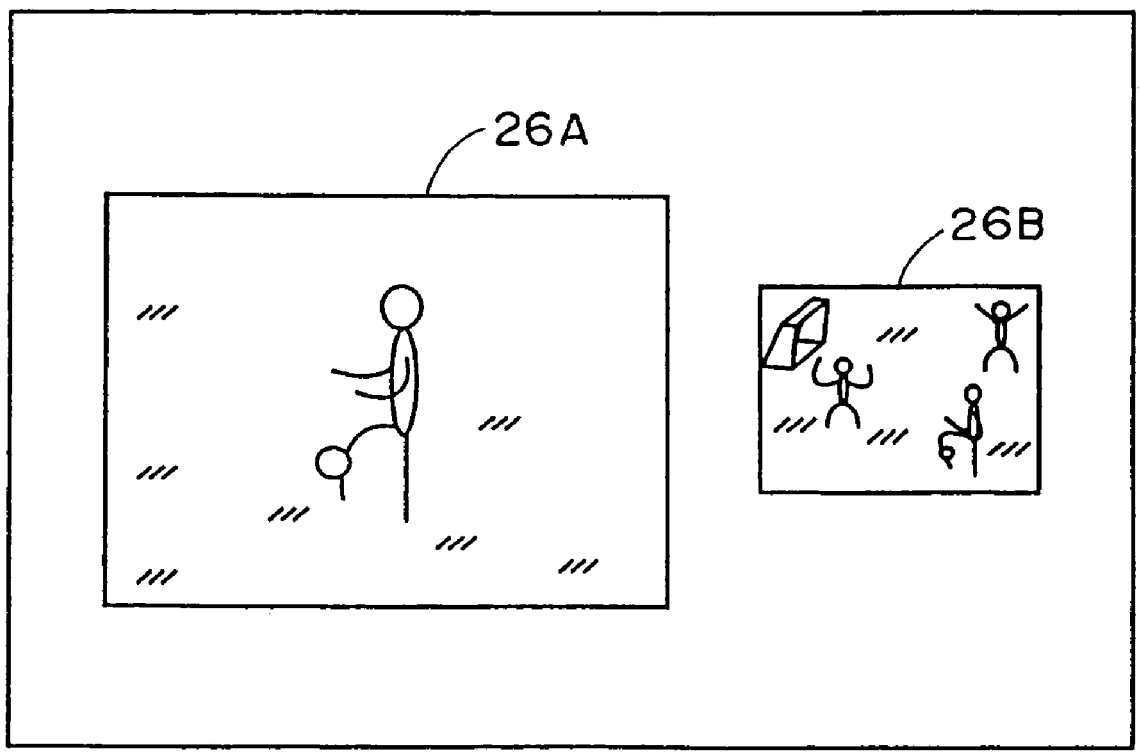
FIG. 10 is a diagram showing a display example in the digital camera which includes the two display screens for displaying the images formed.

Further, there will be described a digital camera in a second modification to the digital camera 10 according to the above embodiment. Since the images formed by the two image pickup devices 50A, 50B are displayed on the single display 26 in the foregoing embodiment, the composition of the images to be displayed is required, and one image cannot be seen at a part where the two images lie one over the other. In the second modification, therefore, two displays 26A, 26B of larger and smaller sizes are included so as to respectively display the individual images, as shown in FIGS. 9 and 10. In this manner, the images formed by the two image pickup devices are respectively displayed on the two displays 26A, 26B, whereby processes such as the composition of the images to be displayed can be omitted, and both the whole images can be seen.

Figure 11:
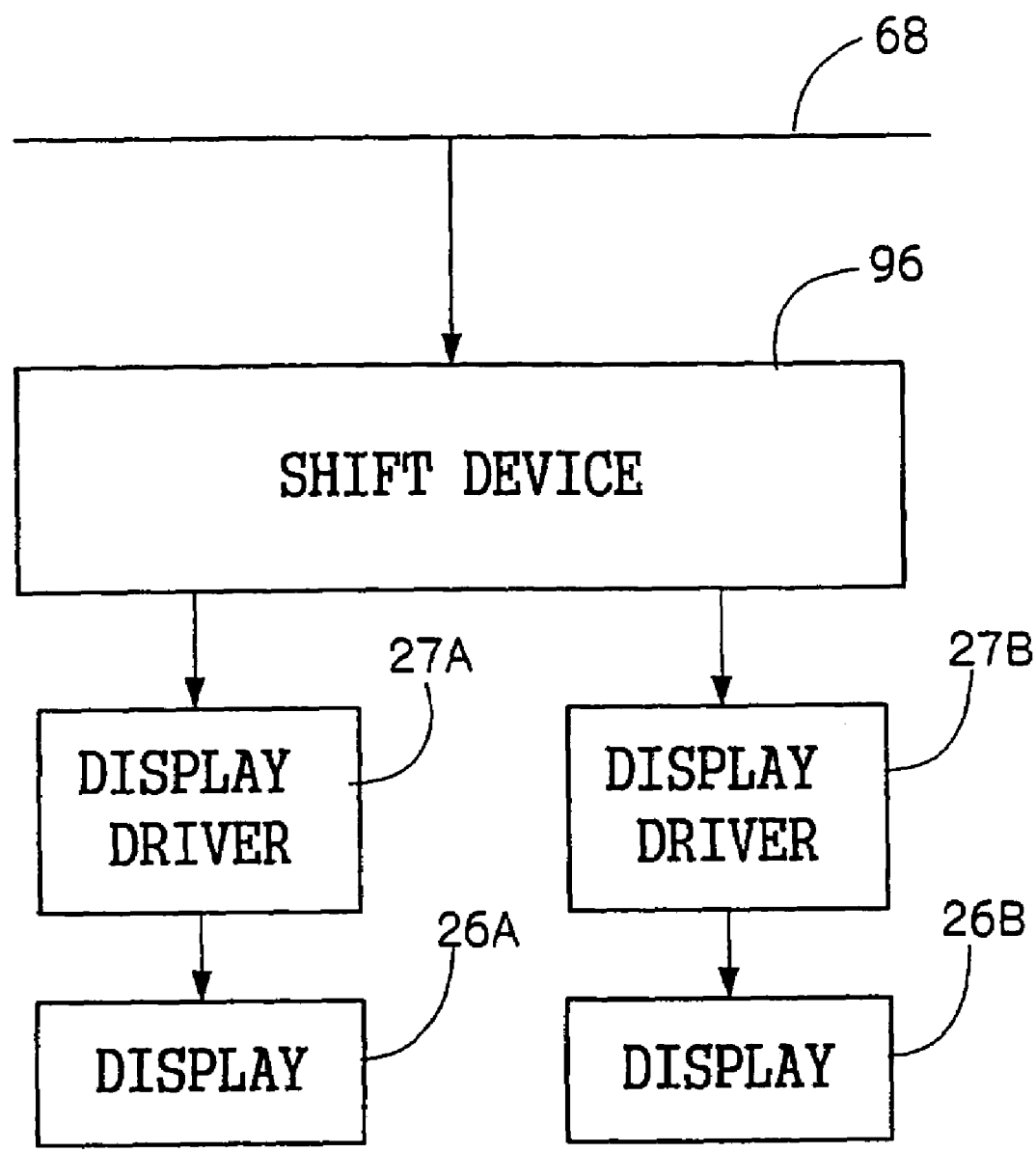
FIG. 11 is a block diagram showing part of an example of the construction of an electric system in the case where a plurality of displays are included.

On this occasion, the images to be displayed on the larger and smaller displays 26A, 26B may well be changed over in accordance with the tele/wide changeover switch 25, that is, with the image to-be-recorded. More specifically, the display driver 27 and the display 26 in FIG. 4 are replaced with a contrivance as shown in FIG. 11, in which a plurality of (in FIG. 11, two) displays 26A, 26B are disposed, while display drivers 27A, 27B are disposed in correspondence with the respective displays, and the images (the image formed by the tele-mode image pickup device 50B and the image formed by the wide-mode image pickup device 50A) to be displayed are changed over by a shift device 96 connected to the system bus 68. By way of example, in a case where the image formed by the tele-mode image pickup device 50B is to be recorded (where the tele-mode has been selected through the tele/wide changeover switch 25), a changeover control is performed by the shift device 96 so that, as shown in FIG. 10, the image formed by the tele-mode image pickup device 50B may be displayed on the larger display 26A, while the image formed by the wide-mode image pickup device 50A may be displayed on the smaller display 26B. Besides, in a case where the image formed by the wide-mode image pickup device 50A is to be recorded (where the wide-mode has been selected through the tele/wide changeover switch 25), a changeover control is performed by the shift device 96 so that, contrariwise to the above, the image formed by the wide-mode image pickup device 50A may be displayed on the larger display 26A, while the image formed by the tele-mode image pickup device 50B may be displayed on the smaller display 26B. Incidentally, the remaining construction is the same as in the foregoing embodiment and shall therefore be omitted from description.

The two displays 26A, 26B of larger and smaller sizes are included in this manner, whereby as in the foregoing embodiment, the image to be recorded can be confirmed, while the image formed by the imaging system which is not to be used can be subsidiarily confirmed.

By the way, in the case where the plurality of displays are included in this manner, information different from the image formed, such as a menu display, may well be presented on, for example, the smaller display 26B.

Besides, a digital camera which includes the two independent photographing systems and the two displays 26A, 26B may well be constructed by combining the first modification and the second modification.

Next, there will be described a digital camera in a third modification to the digital camera 10 according to the above embodiment. In the foregoing embodiment, the image formed by the tele-mode image pickup device 50B and the image formed by the wide-mode image pickup device 50A are entirely displayed on the single display 26, respectively. In the digital camera of the third modification, the image formed by the tele-mode image pickup device 50B is displayed, while only a predetermined region is displayed as to the image formed by the wide-mode image pickup device 50A. By way of example, as shown in FIG. 12, the image formed by the tele-mode image pickup device 50B is displayed on the upper side of the display 26, while only the predetermined region 96 of the image formed by the wide-mode image pickup device 50A is extracted and displayed on the lower side of the display 26. Incidentally, such changeover of the display can be implemented by, for example, manipulating the menu switch 30, select switch 34, execute/view change switch 32 and cancel switch 36 of the various operating switches 74, and a display control can be performed by the display driver 27.

In a case, for example, where a horse race is to be photographed as shown in FIG. 12, only the predetermined belt-like region 96 may be displayed on the display 26 as to the image formed by the wide-mode image pickup device 50A. Therefore, only the predetermined region 96 is designated, and the instruction of displaying the predetermined region 96 on the lower side of the screen of the display 26 is given, by manipulating the various operating switches 74, whereby substantially the whole image formed by the wide-mode image pickup device 50A can be grasped. Moreover, necessary information can be effectively displayed in a small display area by displaying only the predetermined region 96 of the image formed by the wide-mode image pickup device 50A, in this manner.

Incidentally, although the two photographing systems are included in the above embodiment, they are not restrictive, but three or four photographing systems, for example, may well be included so as to simultaneously display formed images on the display 26. On this occasion, the display 26 may well be provided with display screens in a number corresponding to that of the photographing systems.

Second Embodiment

Next, an example of the second embodiment of the invention will be described in detail.

Figure 13:
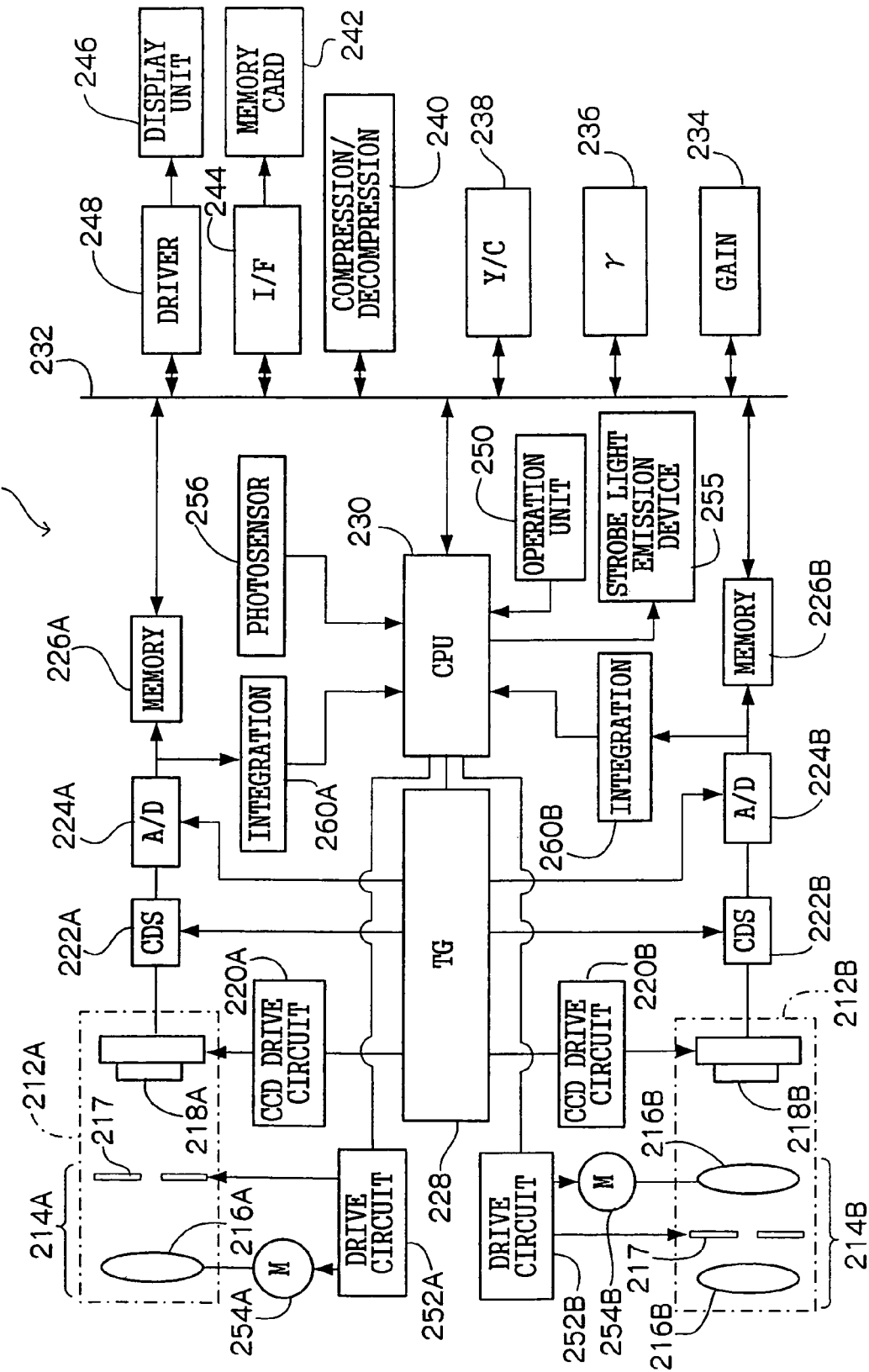
FIG. 13 is a block diagram showing the schematic construction of a digital camera according to the second embodiment of the invention.

Shown in FIG. 13 is a block diagram of a digital camera according to the embodiment of the invention. The digital camera 210 has two photographing systems (a first photographing system 212A and a second photographing system 212B) independent of each other, and the respective photographing systems form subject images on the photosensitive faces of CCDs 218A, 218B through photographing optical systems 214A, 214B.

Incidentally, the CCD 218A corresponds to a first image pickup device in the invention, the CCD 218B to a second image pickup device in the invention, the photographing optical system 214A to a first optical system in the invention, and the photographing optical system 214B to a second optical system in the invention.

Two imaging systems are respectively constructed of the first photographing system 212A which is used in ordinary-mode photographing, and the second photographing system 212B which is used in telescopic-mode photographing.

The respective photographing optical systems 214A, 214B are constructed including photographing lenses 216A, 216B and aperture stops 217. The photographing lens 216A is made of a monofocal lens, while the photographing lens 216B is made of a zoom lens (variable focal-distance lens).

The subject images formed on the photosensitive faces of the CCDs 218A, 218B through the respective photographing optical systems 214A, 214B are converted into signal charges in quantities corresponding to the quantities of entered lights, by the respective sensors. The signal charges thus accumulated are read out by CCD drive pulses impressed from CCD drive circuits 220A, 220B, and are sequentially outputted from the CCDs 218A, 218B as voltage signals (analog image signals) corresponding to these signal charges.

Each of the CCDs 218A, 218B is provided with a shutter drain through a shutter gate, and the shutter gate is driven by shutter gate pulses, whereby the accumulated signal charges can be swept out to the shutter drain. That is, the CCD 218 has a so-called "electronic shutter function" in which the accumulation time of the charges accumulated in the sensor (a shutter speed) is controlled by the shutter gate pulses.

In CDS circuits 222A, 222B, the signals read out from the respective CCDs 218A, 218B are submitted to correlated double sampling (CDS) processes, and they are submitted to color separation processes into individual color signals R, G and B, the signal levels of which are adjusted (as white balance pre-processes).

The image signals having undergone these predetermined analog signal processes are applied to A/D converters 224A, 224B and are converted by the A/D converters 224A, 224B into digital signals R, G and B, which are stored in memories 226A, 226B. Incidentally, the memories 226A, 226B may be constructed either as a single memory or as individual memories for the respective photographing systems.

A timing signal generation circuit (TG) 228 applies appropriate timing signals to the CCD drive circuits 220A, 220B, the CDS circuits 222A, 222B and the A/D converters 224A, 224B in compliance with commands from a CPU 230, and the respective circuits are synchronously driven by the timing signals applied from the timing signal generation circuit 228.

The CPU 230 is a control unit (control means) which collectively controls the various circuits of the digital camera 210. It is connected through a bus 232 with a gain adjustment circuit 234, a gamma correction circuit 236, a brightness/color difference signal process circuit (termed "Y/C process circuit") 238, a compression/decompression circuit 240, a card interface 244 for a memory card 242, a displaying driver 248 for driving a display unit 246, and so forth.

The CPU 230 performs the control of a corresponding circuit block on the basis of an input signal from an operation unit 250. It also performs the controls of the zooming operation of the photographing lens 216B and the autofocusing (AF) operations of the photographing lenses 216A, 216B, the control of an automatic exposure adjustment (AE), etc.

Included in the operation unit 250 are a release button for giving the instruction of starting the recording of an image, camera mode selection means, zooming operation means, and various other input means. These input means are in any of various aspects such as switch buttons, a dial and a slide type knob, or in an aspect in which a setting menu or selection items are displayed on a touch panel or the screen of a liquid-crystal monitor display unit so as to select a desired item by a cursor. By way of example, an ordinary mode based on the first photographing system or a telescopic mode based on the second photographing system can be selected through the manipulation of the operation unit 250. The operation unit 250 may be disposed on the camera body, or it can also be constructed as a remote-control transmitter separately from the camera body.

The CPU 230 executes various calculations such as focus evaluation calculations and AE calculations, on the basis of the image signals outputted from the CCDs 218A, 218B, and it controls drive circuits 252A, 252B for the photographing lenses 216A, 216B and the aperture stops 217 on the basis of the calculations. More specifically, motors 254A, 254B are driven, thereby to move the focusing lenses to focusing positions and to set the aperture stops 217 at appropriate aperture values. The motors 254A, 254B are stepping motors, and the focusing lens positions are controlled by controlling the numbers of steps of these motors. Incidentally, the motors 254A, 254B are not restricted to the stepping motors, but they can also be, for example, DC motors.

Adopted for the AF control is a contrast AF scheme in which the focusing lens is moved so as to maximize the high frequency component of a G signal. More specifically, the focusing lenses are respectively moved by driving the motors 254A, 254B through the drive circuits 252A, 252B, until the focusing lenses are located at positions of maximum contrast values. In the AE control, a subject brightness (photographing EV) is found on the basis of an integral value obtained by integrating the R, G and B signals of one frame, and an aperture value and a shutter speed are determined on the basis of the photographing EV. Subsequently, the aperture stops 217 are driven through the drive circuits 252A, 252B, and the accumulation time periods of the charges in the CCDs 218A, 218B are controlled by electronic shutters so as to afford the determined shutter speeds. Accordingly, the optimum exposure adjustments are performed, and the photographing lenses 216A, 216B are automatically focused, merely by directing these lenses of the digital camera 210 toward a subject.

In a photographing recording operation, at the "half depression" of the release button, the above AF operation is performed, and an accurate photographing EV is found by repeating photometric operations a plurality of times, so as to finally determine an aperture value and a shutter speed for photographing on the basis of the photographing EV. Besides, at the "full depression" of the release button, the aperture stop 217 is driven so as to become the aperture value finally determined, and the charge accumulation time is controlled by the electronic shutter so as to afford the determined shutter speed. Incidentally, apart from the method based on the image signals obtained from the CCDs 218A, 218B, the AE controls may well be performed using well-known photometric sensors or the likes.

Besides, the digital camera 210 has a strobe light emission device 255, and a photosensor 256 for dimming. In compliance with the manipulation of a strobe mode setting button included in the operation unit 250, the strobe light emission device 255 is set at a "low-brightness automatic light emission mode" in which the strobe light emission device 255 automatically emits light at a low brightness, a "forcible light emission mode" in which the strobe light emission device 255 emits light irrespective of a subject brightness, or a "light emission prohibition mode" in which the strobe light emission device 255 is prohibited from emitting light.

In accordance with the strobe mode selected by a user, the CPU 230 controls the charging of the main capacitor of the strobe light emission device 255 and a discharging (light emission) timing for a light emitting lamp (for example, xenon lamp), and it controls the stop of light emission on the basis of a measured result from the photosensor 256. The photosensor 256 receives reflected light from the subject illuminated by the light emission of the strobe, and converts the received light into an electric signal corresponding to the quantity thereof. Such signals of the photosensor 256 are integrated by an integration circuit not shown, and the light emission of the strobe light emission device 255 is stopped when the integrated quantity of the received lights has reached a predetermined appropriate quantity of received light.

The data outputted from the A/D converters 224A, 224B are stored in the memories 226A, 226B and applied to integration circuits 260A, 260B, respectively. Each of the integration circuits 260A, 260B divides a photographing frame into a plurality of blocks (for example, 64 blocks of 8×8) and executes the integrating calculation of G signals accepted for the respective blocks. Incidentally, the integrating calculation of brightness signals (Y signals) may well be executed by generating the brightness signals from the data R, G and B. Besides, an AF calculation circuit or an AE calculation circuit can serve also as each of the integration circuits 260A, 260B. The information of an integral value (a calculated result) obtained by each of the integration circuits 260A, 260B is inputted to the CPU 260.

The CPU 230 calculates the evaluation value E of the photographing frame on the basis of the information accepted from each of the integration circuits 260A, 260B, and determines a gain value (amplification factor) in the gain adjustment circuit 234 by the use of the calculated evaluation value E. Thereafter, the CPU 230 controls a gain magnitude in the gain adjustment circuit 234 in accordance with the determined gain value.

The image data R, G and B stored in each of the memories 226A, 226B are sent to the gain adjustment circuit 234, and are submitted to an amplification process here. The resulting image data are submitted to a gamma correction process in the gamma correction circuit 236 and are thereafter sent to the Y/C process circuit 238, in which the RGB data are converted into a brightness signal (Y signal) and color difference signals (Cr and Cb signals).

The brightness/color difference signals (abbreviated to "Y/C signals") generated in the Y/C process circuit 238 are written back into the memories 226A, 226B. The Y/C signals stored in the memories 226A, 226B are supplied to the displaying driver 248 and are converted into a signal of predetermined system (for example, a color composite video signal of the NTSC system), which is outputted to the display unit 246. A liquid crystal display or any other display device capable of color display is employed as the display unit 246. Incidentally, the display unit 246 may be of either a type adapted to input the Y/C signals or a type inputting the RGB signals, and a driver corresponding to the display device is applied.

Image data are periodically rewritten by the image signals outputted from the CCDs 218A, 218B, and video signals generated from the image data are supplied to the display unit 246, whereby images grasped by the CCDs 218A, 218B are displayed on the display unit 246 as dynamic images (live images) in real time, or as substantially continuous images though not in real time.

The display unit 246 can be utilized as an electronic view finder, and the photographer can confirm photographing image angles by the display images of the display unit 246 or an electronic view finder not shown. The acceptance of image data to be recorded is started in response to a predetermined manipulation instructive of the recording (instructive of starting the photographing), such as the manipulation of depressing the release button.

When the photographer has inputted the instruction of the photographing recording from the operation unit 250, the CPU 230 sends a command to the compression/decompression circuit 240 as may be needed, whereby the compression/decompression circuit 240 compresses the Y/C data in the memory 226A or 226B in accordance with the JPEG or any other predetermined format. The compressed image data is recorded on the memory card 242 through the card interface 244.

In a case where a mode (non-compression mode) for recording non-compressed image data is selected, the compression process by the compression/decompression circuit 240 is not executed, and the image data left non-compressed is recorded on the memory card 242.

The digital camera 210 according to this embodiment employs the memory card 242 as means for saving the image data. Concretely, a recording medium, for example, SMART MEDIA™ is applied. The aspect of the recording medium is not restricted to the above, but it may well be any of various aspects such as a PC card, MICRODRIVE™, a multimedia card (MMC), a magnetic disk, an optical disk, a magnetooptical disk and a memory stick. Further, signal processing means and an interface which correspond to the medium to be used are applied.

Besides, in a reproduction mode, image data read out from the memory card 242 is submitted to an decompression process by the compression/decompression circuit 240, and the expanded data is outputted to the display unit 246 through the driver 248.

Next, there will be described the AF control in the digital camera 210 according to this embodiment.

As stated above, the contrast AF scheme is adopted for the AF control. When the release button is in the state of "half depression", the motors 254A, 254B are respectively driven through the drive circuits 252A, 252B, thereby to move the focusing lenses until they are located at the positions of maximum contrasts.

Figures 14, 15:
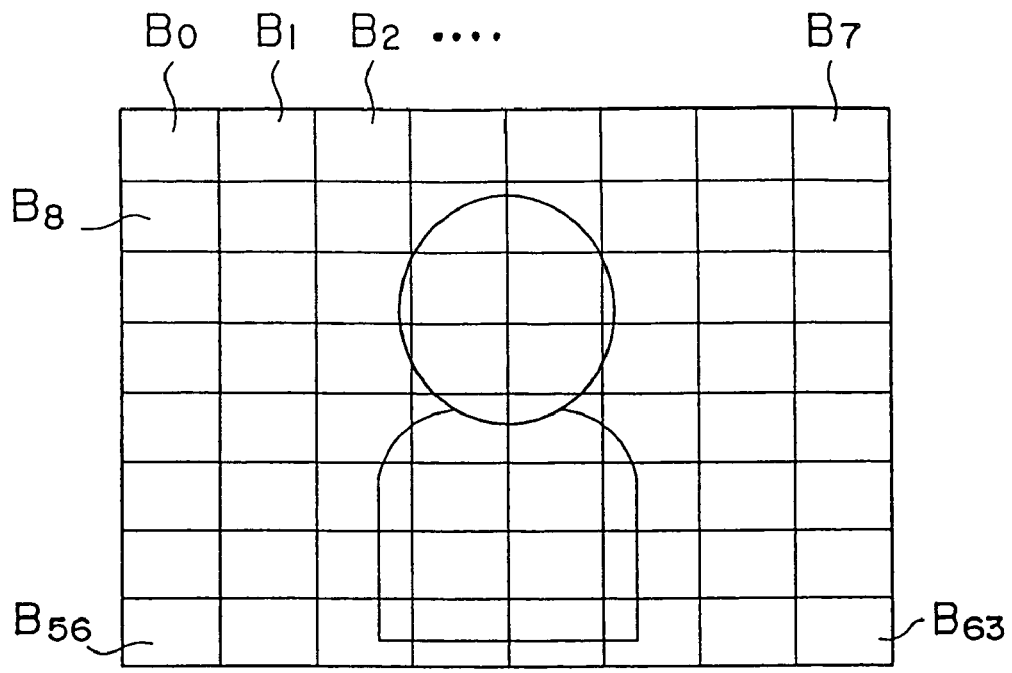
FIG. 14 is an image diagram showing an example of the dividing aspect of a photographing frame in an integration circuit as is utilized for image corrections and an AF control.
FIG. 15 is an image diagram showing an example of weighting factors Wi which are allotted to the respective blocks of the photographing frame.

In calculating a contrast value Ct, a photographing frame is divided into 8×8 blocks in each of the integration circuits 260A, 260B, and the integral value Si of a G (green) signal in an image signal is calculated every block Bi (i=0, 1, 2 ..., 63) on the basis of information from each of the integration circuits 260A, 260B by the CPU 230. Here, as shown in FIGS. 14 and 15, a weighting factor Wi (i=0, 1, 2 ..., 63) is determined for each block, and it is set to be a relatively large value at the central part of the frame and to be a smaller value at the more distant part of the frame from the center thereof. Since a principal subject is often arranged near the center of the frame, an evaluation which sufficiently reflects the state of the subject at the central part of the frame becomes possible by setting the distribution of the weighting factors as indicated in FIG. 15.

When the integral values Si of the respective blocks have been calculated, an evaluation value E is calculated in conformity with the following equation (1) by using the weighting factors Wi:

$$E = \frac{\sum_{i=0}^{63} Si \times Wi}{\sum_{i=0}^{63} Wi} \quad (1)$$

That is, the evaluation value E is obtained in such a way that the multiplication values (Si×Wi) each being taken between the integral value Si and the weighting factor Wi every block Bi are added up for all the blocks i=0-63, and that the resulting sum is divided by the summation of the weighting factors Wi (by calculating a weighted average).

Besides, the average value and maximum value of the brightness of each image formed is calculated. The value of the tendency of the contrast (hereinbelow, termed "contrast value Ct") of the formed image corresponds to the fluctuation rate of the brightness of the formed image. In this embodiment, the ratio between the average value of the brightness of the formed image and the maximum value of the brightness contained in the formed image as given by the following equation (2) is adopted as the contrast value:

$$Ct = Cave/Cmax \quad (2)$$

where Cmax indicates the maximum value of the brightness contained in the formed image, and Cave indicates the average value of the brightness of the formed image.

Incidentally, the average value of the brightness may well be replaced with the minimum value of the brightness, an average level obtained by a predetermined function, or a preset value expressive of a brightness of low level. In this embodiment, the contrast value Ct is calculated using the integral values Si of the G (green) signal in the image signal for the blocks i=0-63. In this case, the maximum value and average value of the brightness should preferably be obtained as to the blocks at the central part of the formed image for such a reason that the principal image (the image of the principal subject) is often distributed at and near the central part of the formed image.

Incidentally, the CDS circuit 222A, A/D 224A, memory 226A, integration circuit 260A, timing signal generation circuit 228, CCD drive circuit 220A, drive circuit 252A and motor 254A correspond to first focus adjustment means in the invention, while the CDS circuit 222B, A/D 224B, memory 226B, integration circuit 260B, timing signal generation circuit 228, CCD drive circuit 220B, drive circuit 252B and motor 254B correspond to second focus adjustment means in the invention.

Next, the AF control which is performed using the contrast value Ct calculated as stated above will be described with reference to the flow chart of FIG. 16.

At a step 300, whether or not the release button has been half-depressed is decided. In a case where the decision has been negated, the routine directly returns and stands by till the affirmation of the decision. When the decision has been affirmed, the routine shifts to a step 302.

At the step 302, whether or not a current photographing mode is the telescopic mode is decided. The decision is given by deciding whether or not the telescopic mode has been selected by the operation unit 250. In a case where the decision has been affirmed, the routine shifts to a step 304.

At the step 304, an AF rough search based on the first photographing system is made. More specifically, the motor 254A of the first photographing system 212A is driven stepwise to move the focusing lens, so as to calculate the contrast values Ct at the respective positions of the focusing lens.

A focal distance which affords the maximum contrast value is specified on the basis of the calculated contrast values Ct of the respective positions of the focusing lens in the first photographing system 212A, and a predetermined range including the focal distance is specified. Incidentally, the predetermined range is a range which is searched by a subsequent fine search, and the magnitude of the predetermined range is set in accordance with the zoom lens magnification of the second photographing system 212B.

Next, at a step 306, the motor 254B of the second photographing system is driven stepwise to move the focusing lens thereof up to the search start position of the predetermined range specified by the AF rough search.

Subsequently, at a step 308, the AF fine search based on the second photographing system is made. More specifically, the motor 254B of the second photographing system is driven stepwise to move the focusing lens from the focusing lens position reached at the step 306, so as to calculate the contrast values Ct at the respective positions of the focusing lens as in the AF rough search. Besides, the focusing lens position at which the maximum value of the calculated contrast values Ct is afforded is set at a focal position, and the focusing lens of the second photographing system is moved to the focal position, whereby a focus adjustment is done. Incidentally, the AF fine search is made only in the focal distance range determined by the first photographing system 212A.

More specifically, with the digital camera 210 according to this embodiment, in case of photographing by the second photographing system 212B the focal depth of which is set shorter than that of the first photographing system 212A, the AF rough search based on the first photographing system 212A is made, thereby to determine the rough focal position range, and the determined focal position range is submitted to the AF fine search on the basis of the second photographing system 212B the focal depth of which is set shorter than that of the first photographing system 212A, thereby to determine the focal position. In general, in the AF control of a zoom lens or the like whose focal depth is set short, an AF rough search is made by driving a motor at intervals of several steps, and an AF fine search is thereafter made. In the AF rough search here, the movement magnitude of the focusing lens enlarges in correspondence with the short focal depth, and a long time is required. In contrast, according to this embodiment, as described above, the AF rough search is made by the first photographing system 212A longer in the focal depth (employing the monofocal lens) than the second photographing system 212B whose focal depth is set short. Therefore, the movement magnitude of the focusing lens which is moved during the AF rough search can be decreased as compared with that in the above case. It is accordingly possible to shorten a search time for the focal position in the case of the photographing by the second photographing system 212B of the shorter focal depth.

On the other hand, in a case where the decision of the step 302 has been negated, that is, where the ordinary mode is selected by the operation unit 250, the routine shifts to a step 310, at which an AF search based on the first photographing system is made. More specifically, the AF control based on the first photographing system 212A is performed in such a way that the motor 254A of the first photographing system is driven stepwise to move the focusing lens, that the contrast values Ct at the respective positions of the focusing lens are calculated, that a focal distance which affords the maximum contrast value is specified on the basis of the calculated contrast values Ct at the respective positions of the focusing lens in the first photographing system, and that the specified position of the focusing lens is set as a focal position, to which the focusing lens is moved.

In this manner, according to this embodiment, the AF control in the case of the photographing by the second photographing system 212B the focal depth of which is set shorter than that of the first photographing system 212A is performed by making the AF rough search with the first photographing system 212A, and then making the AF fine search with the second photographing system 212B on the basis of the AF rough search. That is, as stated above, the focal distance range to be submitted to the AF search by the second photographing system 212B is determined by employing the first photographing system 212A in which the movement distance of the focusing lens is short, and only the focal distance range is submitted to the AF search by the second photographing system 212B. Thus, the time period of the AF fine search based on the second photographing system 212B can be shortened, and the speed of the AF control (the search for the focal position) can be heightened.

Figure 17:
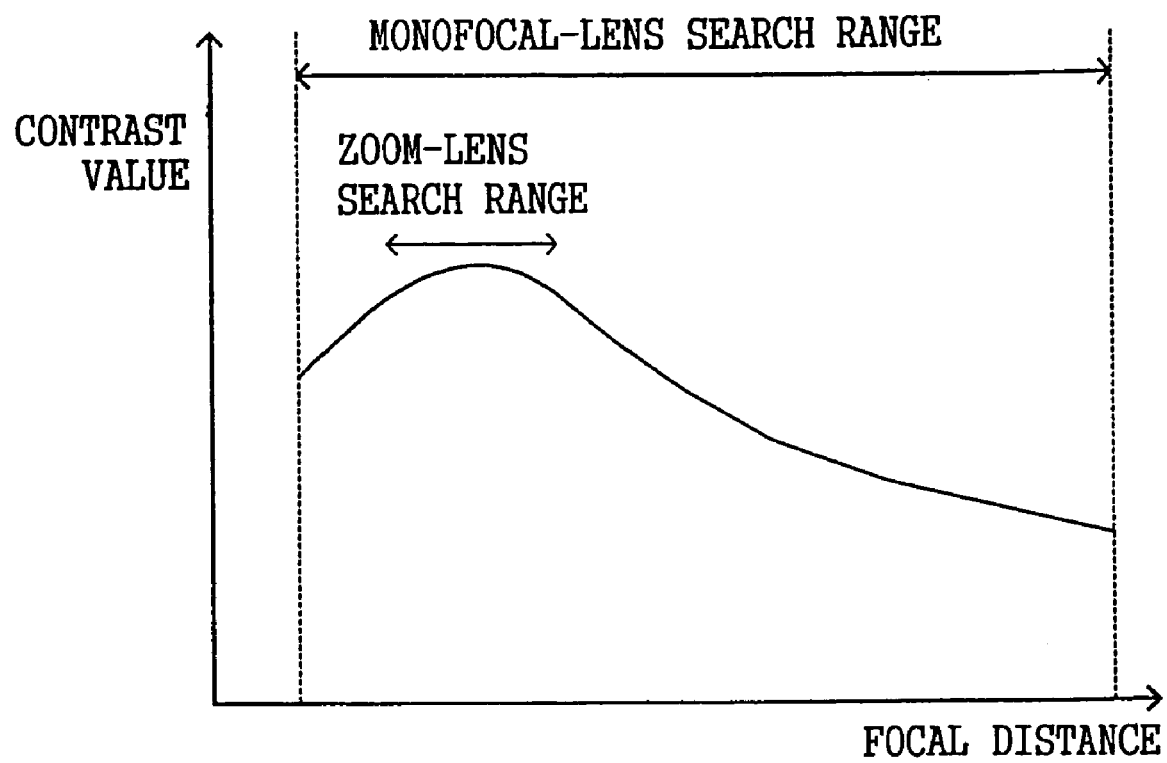
FIG. 17 is a graph showing an example of the AF control of the digital camera according to the embodiment of the invention.
Figure 18:
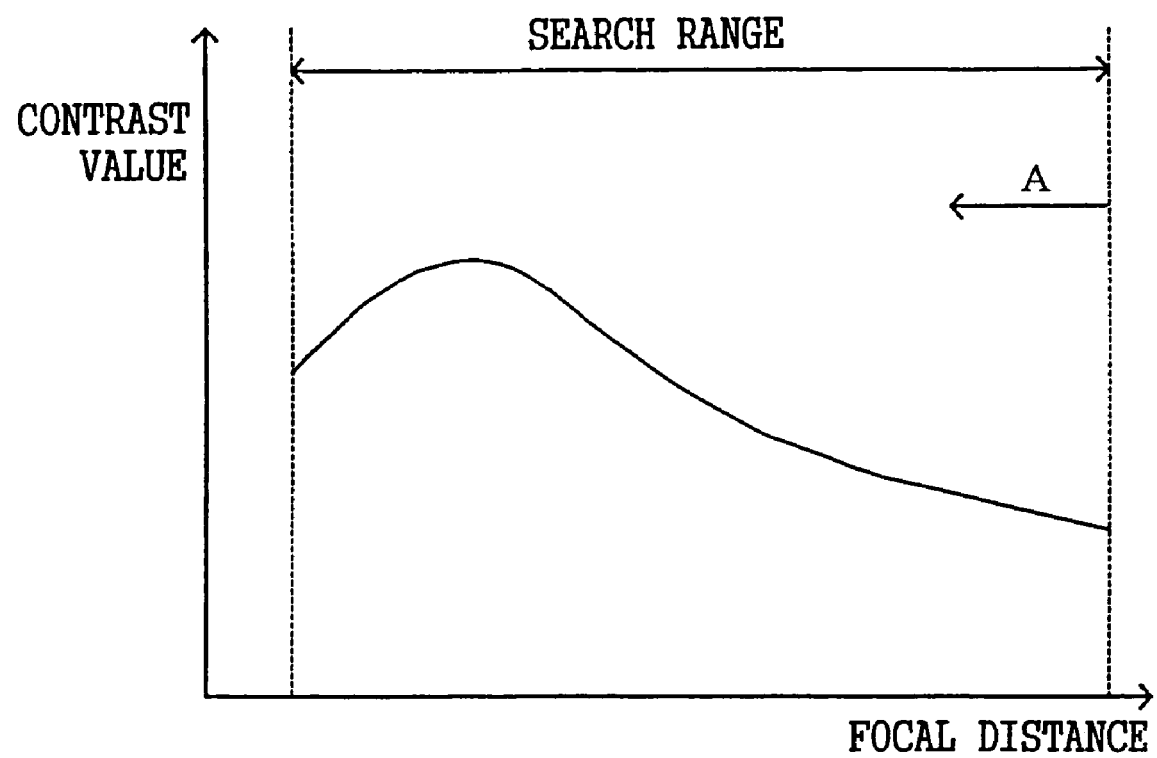
FIG. 18 is a graph showing an example of an AF control in the prior art.

By way of example, as shown in FIG. 17, the contrast values Ct of a search range (monofocal-lens search range) based on the first photographing system 212A are calculated, and a predetermined range (zoom-lens search range) including the maximum value of the calculated contrast values Ct is set as a rough focal distance, whereupon the focusing lens of the second photographing system 212B is driven to the end position of the rough focal distance or range and is controlled so as to move only within the zoom-lens search range, and the contrast values Ct at the respective positions of the zoom-lens search range are calculated so as to set the position of the maximum value of the calculated contrast values Ct as a focal position, whereby the fine focal position can be determined. Thus, the focal position can be determined without making the AF fine search based on the second photographing system 212B in which the movement distance of the focusing lens is long, so that a search time for the focal position can be shortened.

By the way, in the above embodiment, the invention is applied to the digital camera including the two photographing systems 212A, 212B whose focal depths are different from each other. However, the number of photographing systems is not restricted to two, but three or more photographing systems may well be included.

Besides, the above embodiment is so constructed that the drive circuit 252A and the motor 254A are disposed in correspondence with the first photographing system 212A, while the drive circuit 252B and the motor 254B are disposed in correspondence with the second photographing system 212B. It is also allowed, however, to employ a construction in which the drive circuits 252A, 252B and the motors 254A, 254B are replaced with ones which are shared by the first photographing system and the second photographing system. That is, the focusing lenses which are respectively included in the first focus adjustment means and second focus adjustment means of the invention may well be driven by a common drive circuit and a common motor.

Figure 16:
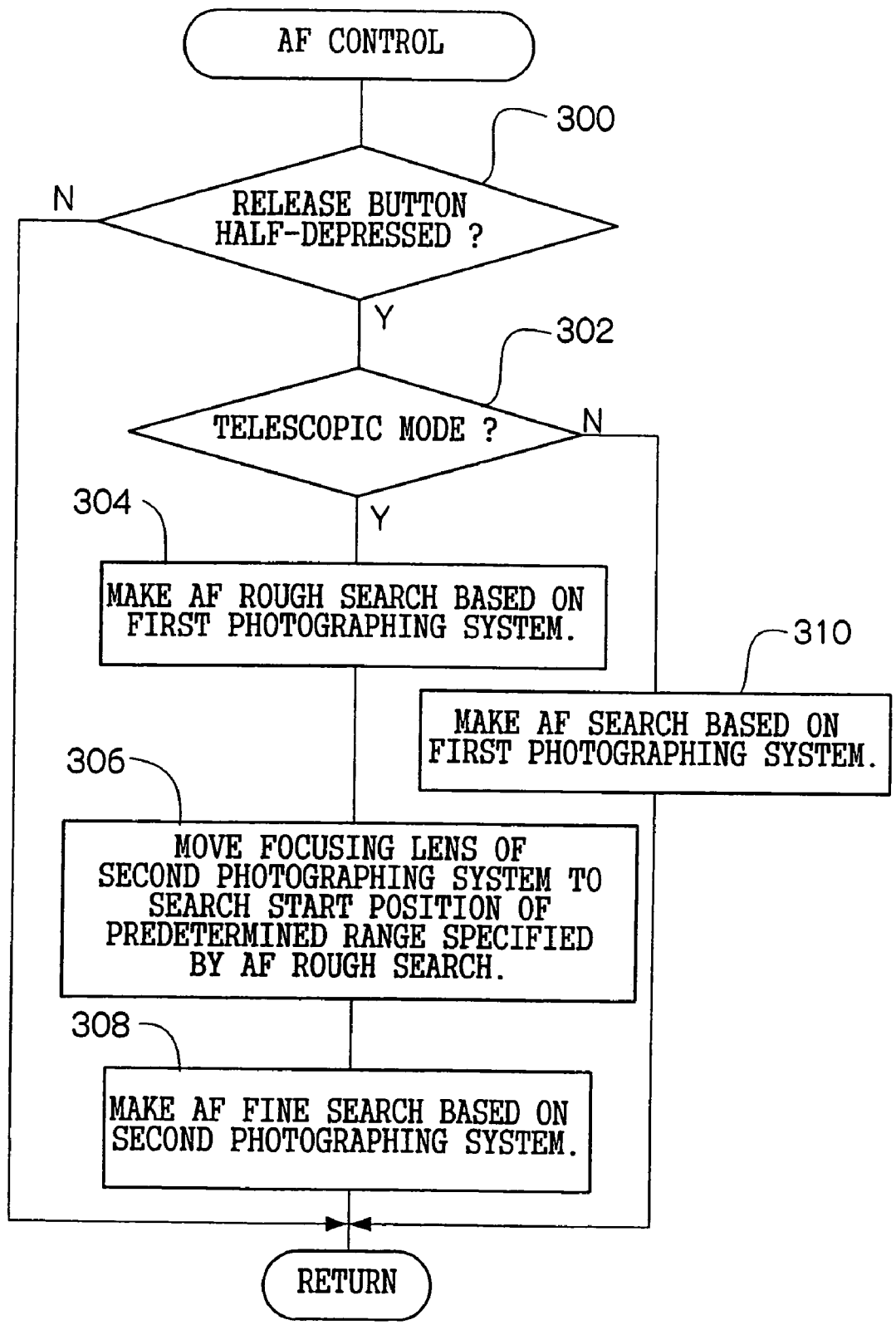
FIG. 16 is a flow chart showing the AF control of the digital camera according to the embodiment of the invention.

The steps 108-114 in the first embodiment described before (refer to FIG. 6) may well be further performed at the step 310 in the second embodiment (refer to FIG. 16), the step 108 in the first embodiment (refer to FIG. 6) may well be further performed at the step 304 (refer to FIG. 16), and the steps 102-114 in the first embodiment (refer to FIG. 6) may well be further performed at the step 308 (refer to FIG. 16). Thus, the advantages of both the first embodiment and the second embodiment are brought forth. That is, the search time for the focal position can be shortened, while at the same time, the photographing can be performed as the situation of surroundings is grasped.

Incidentally, a photographed image which has been photographed by one of the photographing systems as determined through the manipulation of the changeover switch is recorded on the memory card (corresponding to recording means).

Besides, as stated before, the photographing lens 216A is made of the monofocal lens, the photographing lens 216B is made of the zoom lens (variable focal-distance lens), and the first photographing system and the second sub photographing system are the photographing systems whose image angles are different from each other.

Third Embodiment

Next, an example of the third embodiment of the invention will be described in detail. This embodiment is such that the invention is applied to a digital camera.

Since the digital camera according to the embodiment of the invention is constructed substantially similarly to the second embodiment described before, the same portions are indicated by the same reference numerals and signs and shall be omitted from description, and different portions will be described.

Figure 19:
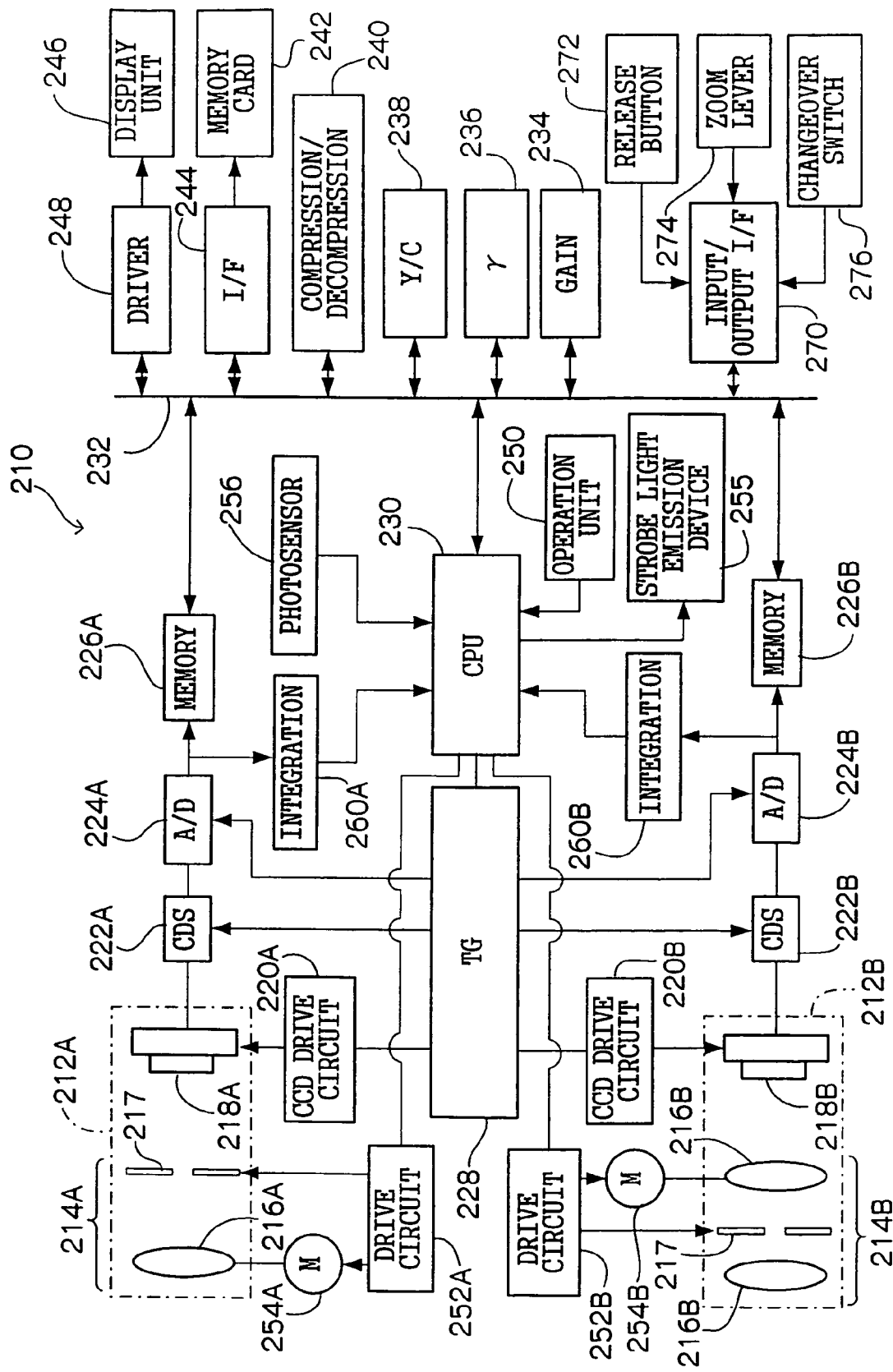
FIG. 19 is a block diagram showing the schematic construction of a digital camera according to the third embodiment of the invention.
Figure 22:
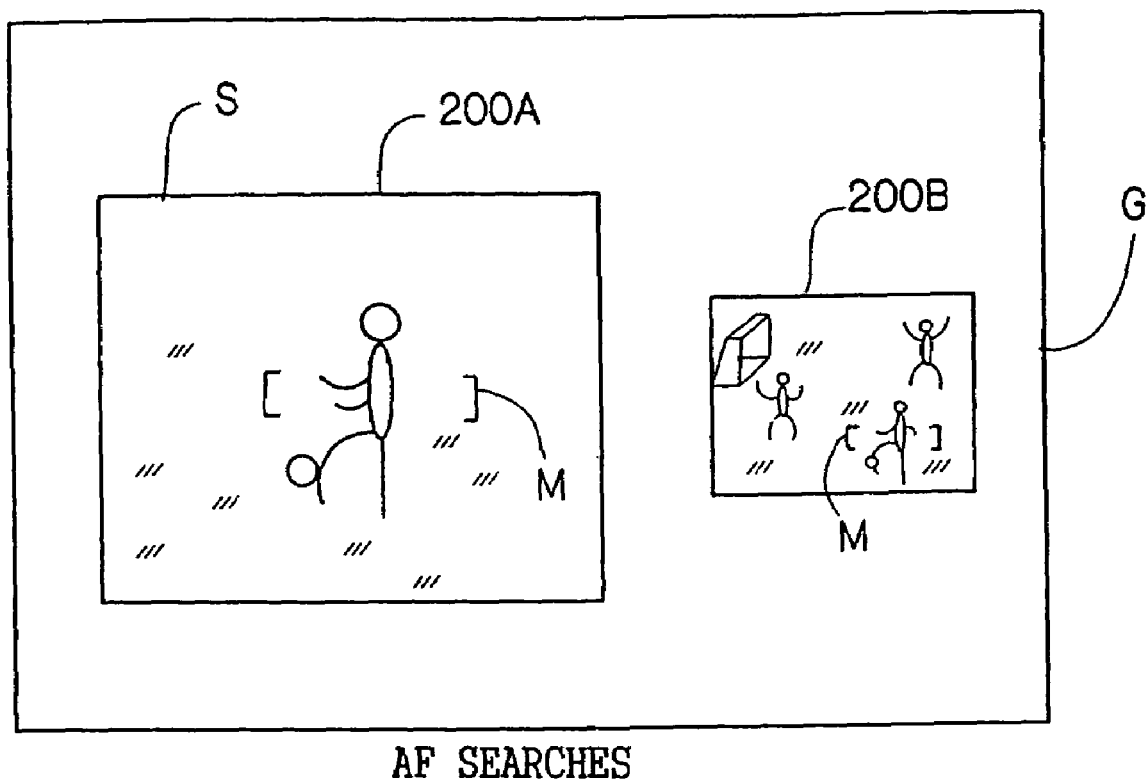
FIG. 22 is a diagram showing an example in which two display screens for displaying images formed are included, and focusing ranges are indicated in the respective screens.

By the way, in this embodiment, a single display unit 246 is included as stated before. As shown in FIGS. 19 and 22, the screen G of the display unit 246 is provided with an area 200A which displays an image (wide) in accordance with a video signal based on an image signal outputted from the CCD 218A of a first photographing system, and an area 200B which displays an image (telescopic) in accordance with a video signal based on an image signal outputted from the CCD 218B of a second photographing system.

Various input means, for example, a release button 272, a zoom lever 274, and a changeover switch 276 for selecting an ordinary mode (tele-mode) based on the first photographing system and a telescopic mode (zoom) based on the second photographing system, are connected to a CPU 230 through an input/output I/F 270. On the basis of input signals from the input means, corresponding circuit blocks are controlled, and the controls of the zooming operation of a photographing lens 216B, as well as the focus adjustment (AF) operations of photographing lenses 216A, 216B, and an automatic exposure adjustment (AE) are performed.

The input means are in any of various aspects such as switch buttons, a dial and a slide type knob, or in an aspect in which a setting menu or selection items are displayed on a touch panel or the screen of a liquid-crystal monitor display unit so as to select a desired item by a cursor. Besides, the input means may be disposed on the camera body, or they can also be constructed as a remote-control transmitter separately from the camera body.

Incidentally, the AF control itself in the digital camera 210 according to this embodiment is the same as the AF control of the second embodiment described before and shall be omitted from description.

Figure 20:
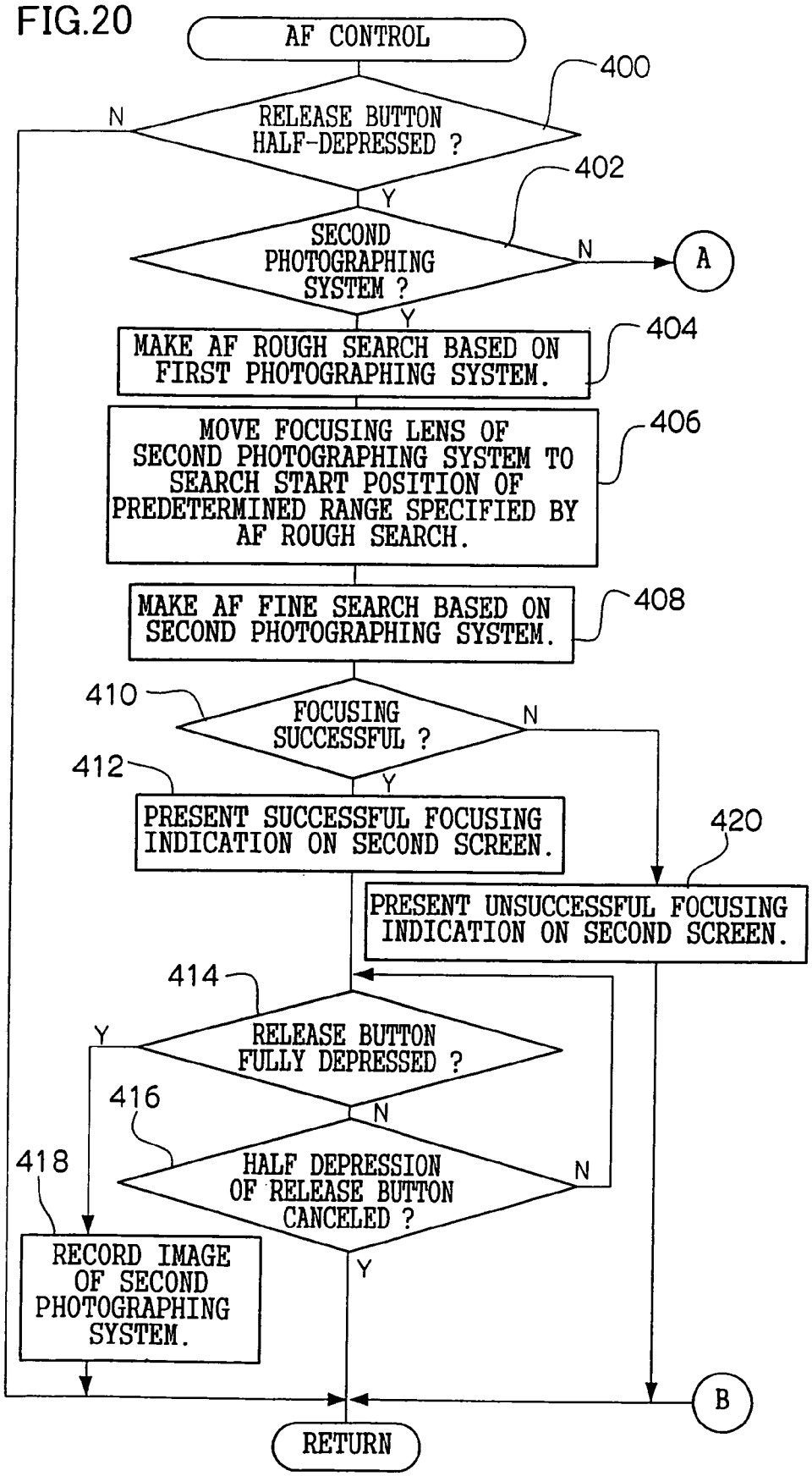
FIG. 20 is part of a flow chart showing the AF control of the digital camera according to the embodiment of the invention.

Next, a control routine in this embodiment as proceeds using the contrast values Ct calculated as explained before will be described with reference to the flow chart of FIG. 20.

At a step 400, whether or not the release button 272 has been half-depressed is decided. In a case where the decision has been negated, the routine directly returns and stands by till the affirmation of the decision. When the decision has been affirmed, the routine shifts to a step 402.

At the step 402, whether or not the second photographing system is selected is judged from the manipulational state of the changeover switch 276. In a case where the decision has been affirmed, the routine shifts to a step 404.

At the step 404, an AF rough search based on the first photographing system is made. On this occasion, as shown in FIG. 22, a range (focusing range) in which the AF rough search based on the first photographing system is proceeding is indicated in the area 200A corresponding to the first photographing system. Concretely, in this embodiment, [ ] is adopted as a focusing-range indication mark M, and the mark M is displayed with its interval or interspace broadened so as to indicate the focusing range. Incidentally, the focusing-range indication mark is not restricted to [ ], but any of ⌈ ⌋, ⌂, etc. may well be employed.

Meanwhile, the AF rough search is concretely executed as stated below. The motor 254A of the first photographing system 212A is driven stepwise to move the focusing lens (photographing lens 216A), so as to calculate the contrast values Ct at the respective positions of the focusing lens.

A focal distance which affords the maximum contrast value is specified on the basis of the calculated contrast values Ct of the respective positions of the focusing lens in the first photographing system 212A, and a predetermined range including the focal distance is specified. Incidentally, the predetermined range is a range which is searched by a subsequent fine search, and the magnitude of the predetermined range is set in accordance with the zoom lens magnification of the second photographing system 212B.

Next, at a step 406, the motor 254B of the second photographing system is driven stepwise to move the focusing lens (photographing lens 216B) thereof up to the search start position of the predetermined range specified by the AF rough search.

Subsequently, at a step 408, the AF fine search based on the second photographing system is made. More specifically, the motor 254B of the second photographing system is driven stepwise to move the focusing lens from the focusing lens position reached at the step 406, so as to calculate the contrast values Ct at the respective positions of the focusing lens as in the AF rough search. Besides, the focusing lens position at which the maximum value of the calculated contrast values Ct is afforded is set at a focal position, and the focusing lens of the second photographing system is moved to the focal position, whereby a focus adjustment is done. Incidentally, the AF fine search is made only in the focal distance range determined by the first photographing system 212A.

More specifically, with the digital camera 210 according to this embodiment, as in the second embodiment, in case of photographing by the second photographing system 212B the focal depth of which is set shorter than that of the first photographing system 212A, the AF rough search based on the first photographing system 212A is made, thereby to determine the rough focal position range, and the determined focal position range is submitted to the AF fine search on the basis of the second photographing system 212B the focal depth of which is set shorter than that of the first photographing system 212A, thereby to determine the focal position. In general, in the AF control of a zoom lens or the like whose focal depth is set short, an AF rough search is made by driving a motor at intervals of several steps, and an AF fine search is thereafter made. In the AF rough search here, the movement magnitude of the focusing lens enlarges in correspondence with the short focal depth, and a long time is required. In contrast, according to this embodiment, as described above, the AF rough search is made by the first photographing system 212A longer in the focal depth (employing the monofocal lens) than the second photographing system 212B whose focal depth is set short. Therefore, the movement magnitude of the focusing lens which is moved during the AF rough search can be decreased as compared with that in the above case. It is accordingly possible to shorten a search time for the focal position in the case of the photographing by the second photographing system 212B of the shorter focal depth.

At this step 408, as at the step 404, a range (focusing range) in which the AF fine search based on the second photographing system is proceeding is indicated in the area 200A which is the screen corresponding to the second photographing system, as shown in FIG. 22. Concretely, in this embodiment, as described above, [ ] which is a focusing-range indication mark M is displayed with its interval or interspace broadened so as to indicate the focusing range. Incidentally, as described above, the focusing-range indication mark is not restricted to [ ], but any of ⌈ ⌋, ⌂, etc. may well be employed.

Figure 23A:
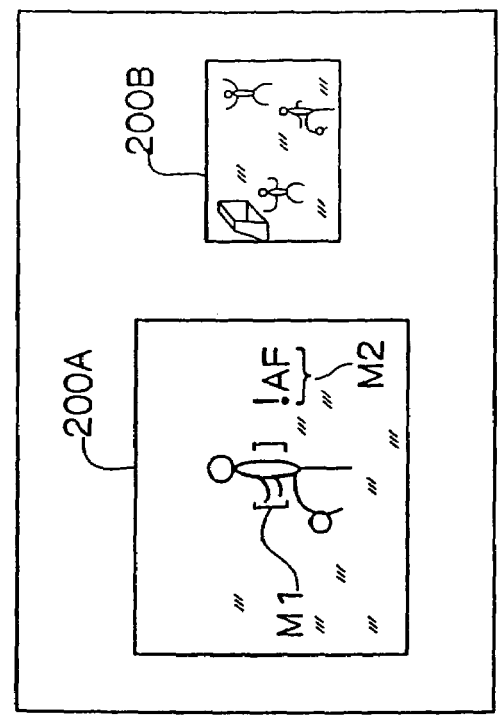
FIGS. 23A and 23B are diagrams showing a successful focusing state and an unsuccessful focusing state, respectively.

At a step 410, whether or not focusing is successful as the result of the AF fine search of the step 408 is judged. In case of the judgment that the focusing is successful, a successful focusing indication which indicates that the focus adjustment has resulted in the focusing is presented in the area 200B (refer to FIG. 22) which is the screen corresponding to the second photographing system, at a step 412. More specifically, by way of example, the mark [ ] is displayed with its interval or interspace broadened in correspondence with the focusing range during the execution of the AF rough search as described above, whereas at the step 412 of this embodiment, the successful focusing is indicated (successful focusing indication is presented) by displaying the mark [ ] whose interval or interspace is narrowed as shown in FIG. 23A. The successful focusing indication is not restricted to the display of the mark [ ] with its interval or interspace narrowed. A display "FOCUSING SUCCESSFUL", for example, may well be presented together with or instead of the display of the mark [ ] whose interval or interspace is narrowed.

At the next step 414, whether or not the release button 272 has been fully depressed is judged. In a case where the full depression of the release button 272 has not been judged, whether or not the half depression of the release button has been canceled is judged at a step 416. In a case where the cancellation of the half depression of the release button has been judged, the pertinent process is ended. That is, there are ended the AF operation which is performed with the release button half-depressed, and the processing for finding an accurate photographing EV by repeating photometric operations a plurality of times. In case of the judgment at the step 416 that the half depression of the release button is not canceled, the routine returns to the step 414.

In a case where the full depression of the release button 272 has been judged at the step 414, the routine shifts to a step 418, at which the image is recorded. More specifically, on the basis of an aperture and a shutter speed which have been finally determined by the processing performed under the half depression condition of the release button 272 as described above, an aperture stop 217 is driven so as to become the aperture finally determined, and besides, the accumulation time of charges is controlled by an electronic shutter so as to afford the determined shutter speed.

Figure 23B:
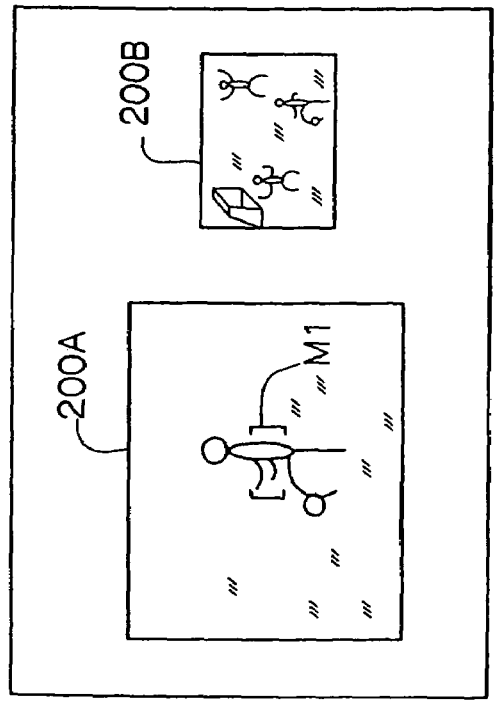

In case of the judgment at the step 410 that the focusing is unsuccessful, namely, that the focusing has failed of success, an unsuccessful focusing indication which indicates that the focus adjustment has resulted in failure is presented in the area 200A which is the screen corresponding to the second photographing system, as shown in FIG. 23B at a step 420. More specifically, by way of example, the mark [ ] has its interval or interspace narrowed, and "!AF" which is an unsuccessful focusing emphasis mark M2 is further displayed in order to emphasize the unsuccessful focusing. Incidentally, the unsuccessful focusing emphasis mark M2 is not restricted to the display "!AF". By way of example, any of "FOCUSING UNSUCCESSFUL", "FOCUSING ERROR", etc. may well be displayed.

Figure 21:
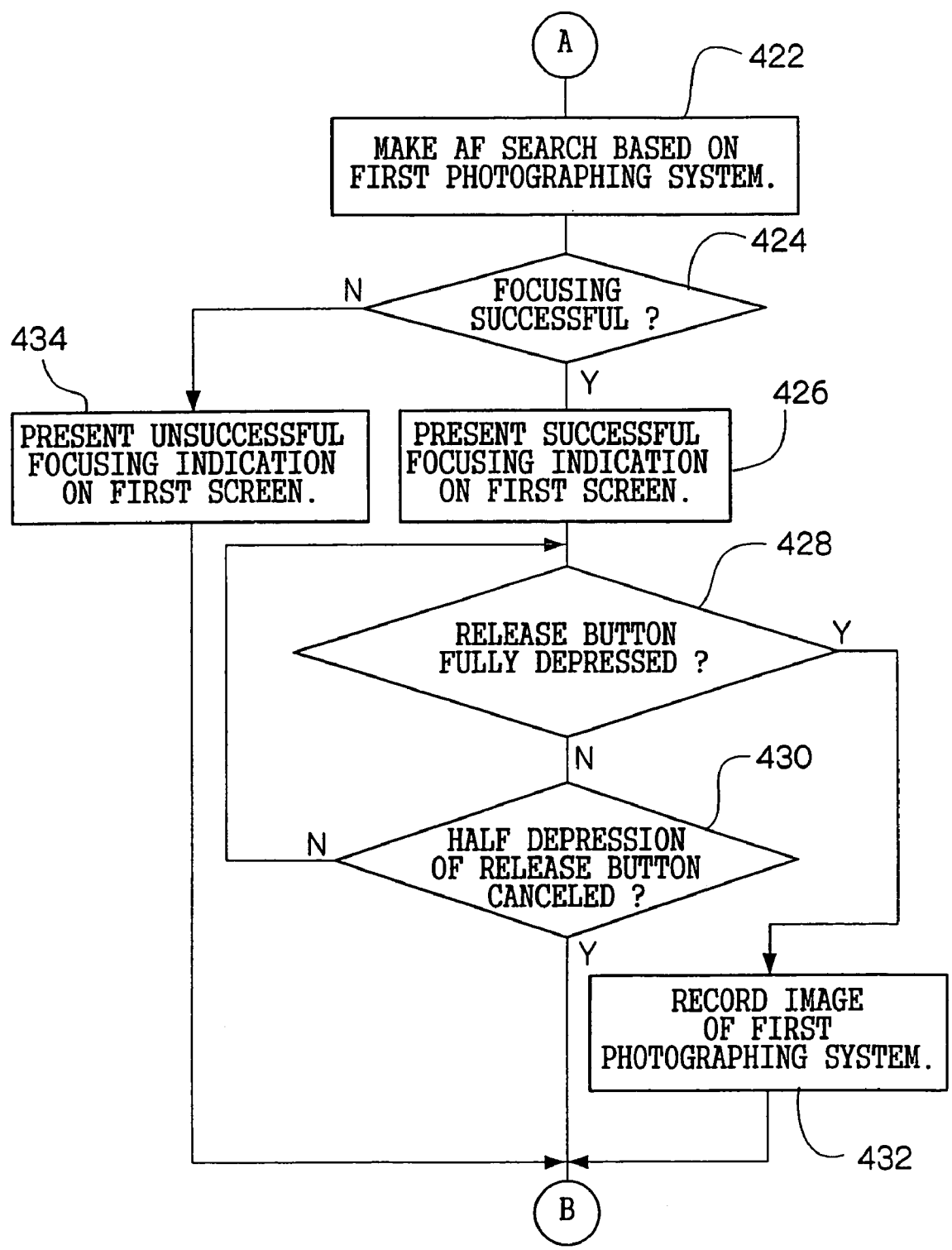
FIG. 21 is the remainder of the flow chart showing the AF control of the digital camera according to the embodiment of the invention.

Meanwhile, when it has been judged from the manipulational state of the changeover switch 276 at the step 402 that the second photographing system is not selected, namely, that the first photographing system is selected, an AF search based on the first photographing system is made at a step 422 (refer to FIG. 21). Incidentally, the AF search based on the first photographing system is similar to that at the step 404. Also in this case, in order to indicate a range (focusing range) in which the AF search based on the first photographing system is proceeding, the mark [ ] is displayed with its interval or interspace broadened in correspondence with the focusing range as in the foregoing, in the area 200A which is the screen corresponding to the first photographing system, as shown in FIG. 22. Incidentally, as described before, the focusing-range indication mark is not restricted to [ ], but any of ⌈ ⌉, ⌂, etc. may well be employed.

At a step 424, whether or not focusing is successful as the result of the AF search of the step 422 is judged. In case of the judgment that the focusing is successful, the routine shifts to a step 426. Here, as in the foregoing, a successful focusing indication which indicates that the focus adjustment has resulted in the focusing is presented in the area 200A (refer to FIG. 23A) which is the screen corresponding to the first photographing system. More specifically, by way of example, the mark [ ] is displayed with its interval or interspace narrowed as described before. By the way, also in this case, the successful focusing indication is not restricted to the display of the mark [ ] with its interval or interspace narrowed. A display "FOCUSING SUCCESSFUL", for example, may well be presented together with or instead of the display of the mark [ ] whose interval or interspace is narrowed.

At the next step 428, whether or not the release button 272 has been fully depressed is judged. In a case where the full depression of the release button 272 has not been judged, whether or not the half depression of the release button has been canceled is judged at a step 430. In a case where the cancellation of the half depression of the release button has been judged, the pertinent process is ended. That is, there are ended the AF operation which is performed with the release button half-depressed as described before, and the processing for finding an accurate photographing EV by repeating photometric operations a plurality of times. In case of the judgment at the step 430 that the half depression of the release button is not canceled, the routine returns to the step 428.

In a case where the full depression of the release button 272 has been judged at the step 428, the routine shifts to a step 432, at which the image is recorded. More specifically, on the basis of an aperture and a shutter speed which have been finally determined by the processing performed under the half depression condition of the release button 272 as described before, an aperture stop 217 is driven so as to become the aperture finally determined, and besides, the accumulation time of charges is controlled by an electronic shutter so as to afford the determined shutter speed.

In case of the judgment at the step 424 that the focusing is unsuccessful, namely, that the focusing has failed of success, an unsuccessful focusing indication which indicates that the focus adjustment has resulted in failure is presented in the area 200A which is the screen corresponding to the first photographing system, at a step 434 (refer to FIG. 23B). More specifically, by way of example, as in the foregoing, the mark [ ] has its interval or interspace narrowed, and "!AF" which is an unsuccessful focusing mark is also displayed in order to indicate the unsuccessful focusing. Incidentally, the unsuccessful focusing mark is not restricted to the display "!AF", but any of "FOCUSING UNSUCCESSFUL", "FOCUSING ERROR", etc. may well be displayed.

As thus far described, in this embodiment, the focusing range is indicated during the AF search. Therefore, a user can recognize the range in which the focusing is to be established.

Further, in this embodiment, in both the cases where the AF search has resulted in success and in failure, the successful focusing and the unsuccessful focusing are indicated in correspondence with the respective cases. Therefore, the user can recognize either the successful focusing or the unsuccessful focusing. Moreover, in a case where the user has recognized the unsuccessful focusing, he/she can photograph an image again or can attain focusing by changing the direction of the camera so as to alter a focus adjustment range.

Besides, in this embodiment, the image is displayed in the area corresponding to the first photographing system 212A, during the AF search which is made using the first photographing system 212A, and the image is displayed in the area corresponding to the second photographing system 212B, during the AF search which is made using the second photographing system 212B. Therefore, the user can confirm which of the photographing systems the image is to be photographed by, immediately before the photographing. It is accordingly possible to avoid the user's apprehension that the photographing might be continued with the photographing system erroneously selected.

Further, in this embodiment, as in the second embodiment described before, the AF control in the case of photographing the image by the second photographing system 212B the focal depth of which is set shorter than that of the first photographing system 212A is performed in such a way that the AF rough search is made using the first photographing system 212A, whereupon the AF fine search based on the second photographing system 212B is made on the basis of the AF rough search. That is, as described before, the focal distance range in which the AF search is to be made by the second photographing system 212B is determined using the first photographing system 212A in which the movement distance of the focusing lens is shorter, and the AF search is made in only the determined focal distance range by the second photographing system 212B. Thus, the time period of the AF fine search based on the second photographing system 212B can be shortened, and the speed of the AF control (the search for the focal position) can be heightened.

By the way, in the above embodiment, the invention is applied to the digital camera including the two photographing systems 212A, 212B whose focal depths are different from each other. However, the number of photographing systems is not restricted to two, but three or more photographing systems may well be included.

Besides, the above embodiment is so constructed that a drive circuit 252A and the motor 254A are disposed in correspondence with the first photographing system 212A, while a drive circuit 252B and the motor 254B are disposed in correspondence with the second photographing system 212B. It is also allowed, however, to employ a construction in which the drive circuits 252A, 252B and the motors 254A, 254B are replaced with ones which are shared by the first photographing system and the second photographing system. That is, the focusing lenses which are respectively included in the first focus adjustment means and second focus adjustment means of the invention may well be driven by a common drive circuit and a common motor.

Figure 24:
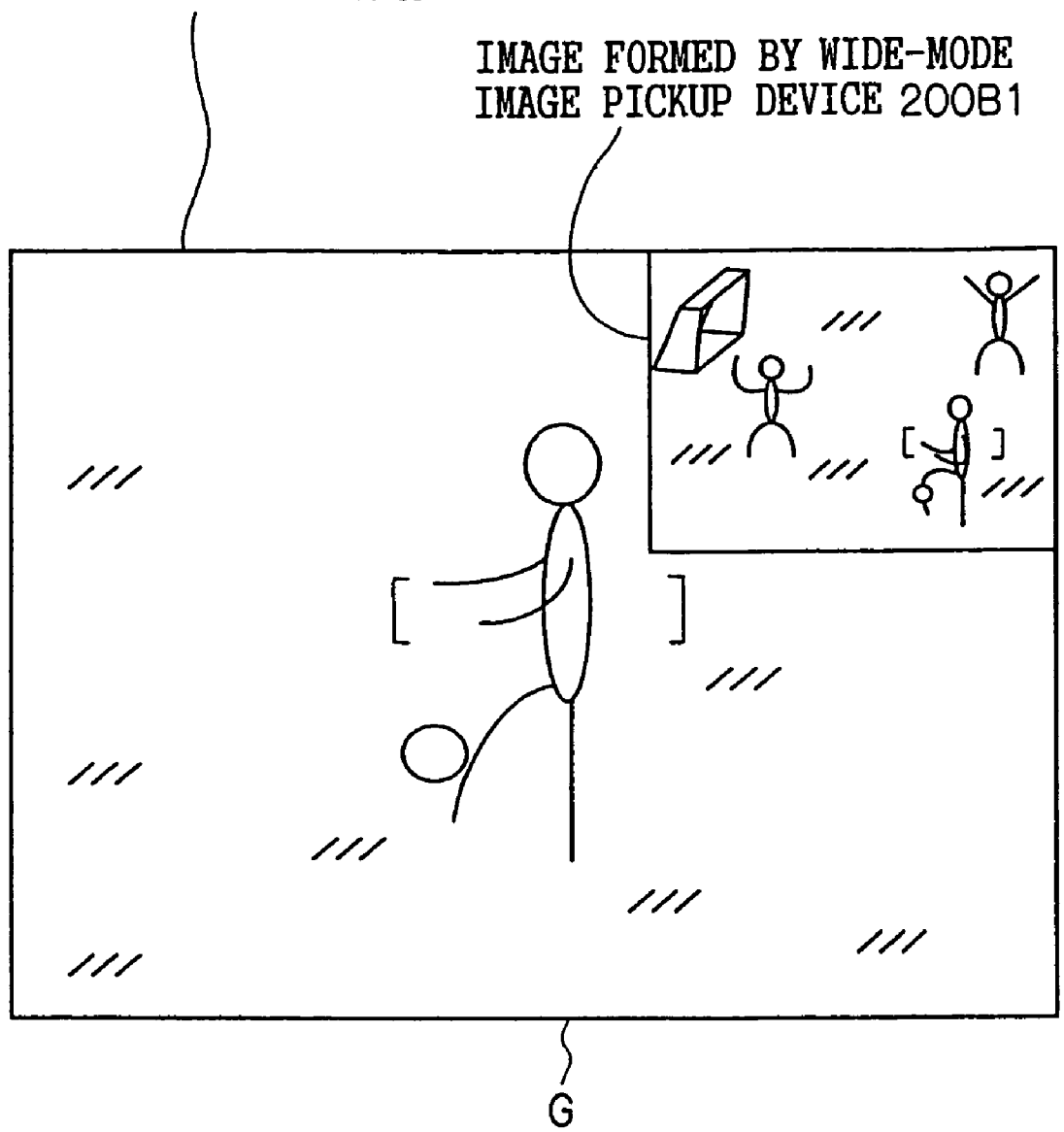
FIG. 24 is a diagram showing another display example of images formed by a plurality of photographing systems.

Further, in this embodiment, the single display unit 246 is included, and as shown in FIG. 22, the screen G of the display unit 246 is provided with the area 200A which displays an image in accordance with a video signal based on an image signal outputted from the CCD 218A of the first photographing system, and the area 200B which displays an image in accordance with a video signal based on an image signal outputted from the CCD 218B of the second photographing system. However, the invention is not restricted to this aspect, but it may well be in such an aspect that the single display unit 246 is included, and that, as shown in FIG. 24, an image (telescopic) is displayed on the whole screen G of the display unit 246 in accordance with a video signal based on an image signal outputted from the CCD 218A of the first photographing system, while the screen G is provided with an area 200B1 which displays an image (wide) in accordance with a video signal based on an image signal outputted from the CCD 218B of the second photographing system. Also in this case, a focusing range, etc. are indicated. Incidentally, it is also allowed to employ such an aspect that, contrariwise to the above, an image is displayed on the whole screen G of the display unit 246 in accordance with a video signal based on an image signal outputted from the CCD 218B of the second photographing system, while the screen G is provided with an area which displays an image in accordance with a video signal based on an image signal outputted from the CCD 218A of the first photographing system. Further, it is also allowed to dispose at least one display unit in correspondence with each of the first photographing system and the second photographing system, and to display corresponding images on the respective display units.

Incidentally, although the two photographing systems 212A, 212B whose focal depths are different from each other are included in the above embodiment, the invention is not restricted thereto, but it may well include a plurality of photographing systems which have equal focal depths, respectively. In this case, AF controls may well be performed by the respective photographing systems without making any rough search. Even in this case, a focusing range is indicated during an AF search, so that the user can recognize the range in which the focusing is to be established. Further, in this embodiment, successful focusing and unsuccessful focusing are respectively indicated in correspondence with both the cases where the AF search has resulted in success and in failure, so that the user can recognize either the successful focusing or the unsuccessful focusing. Moreover, in a case where the user has recognized the unsuccessful focusing, he/she can photograph an image again or can attain focusing by changing the direction of the camera so as to alter a focus adjustment range.

Incidentally, although the example including the plurality of photographing systems has been described in the foregoing, the invention is not restricted thereto, but it is similarly applicable to a case where only one photographing system is included.

Fourth Embodiment

Next, an example of the fourth embodiment of the invention will be described in detail. Since the construction of this embodiment is similar to that of the third embodiment described above, it shall be omitted from description.

By the way, in this embodiment, subject images formed by image pickup devices 218A, 218B are composited and displayed on the screen of a display unit 246 so as to be respectively confirmable, as shown in FIG. 3 by way of example. Incidentally, FIG. 3 shows the example in which the image formed by the first image pickup device (tele-mode image pickup device) 218A is displayed at the central part of the image formed by the second image pickup device (wide-mode image pickup device) 218B. Alternatively, as shown in FIG. 5, the image formed by the first image pickup device (tele-mode image pickup device) 218A is displayed on the whole screen of the display unit, while the image formed by the second image pickup device (wide-mode image pickup device) 218B is displayed on the image formed by the first image pickup device (tele-mode image pickup device) 218A, for example, at the upper part of the right end of the tele-mode image.

Figure 25:
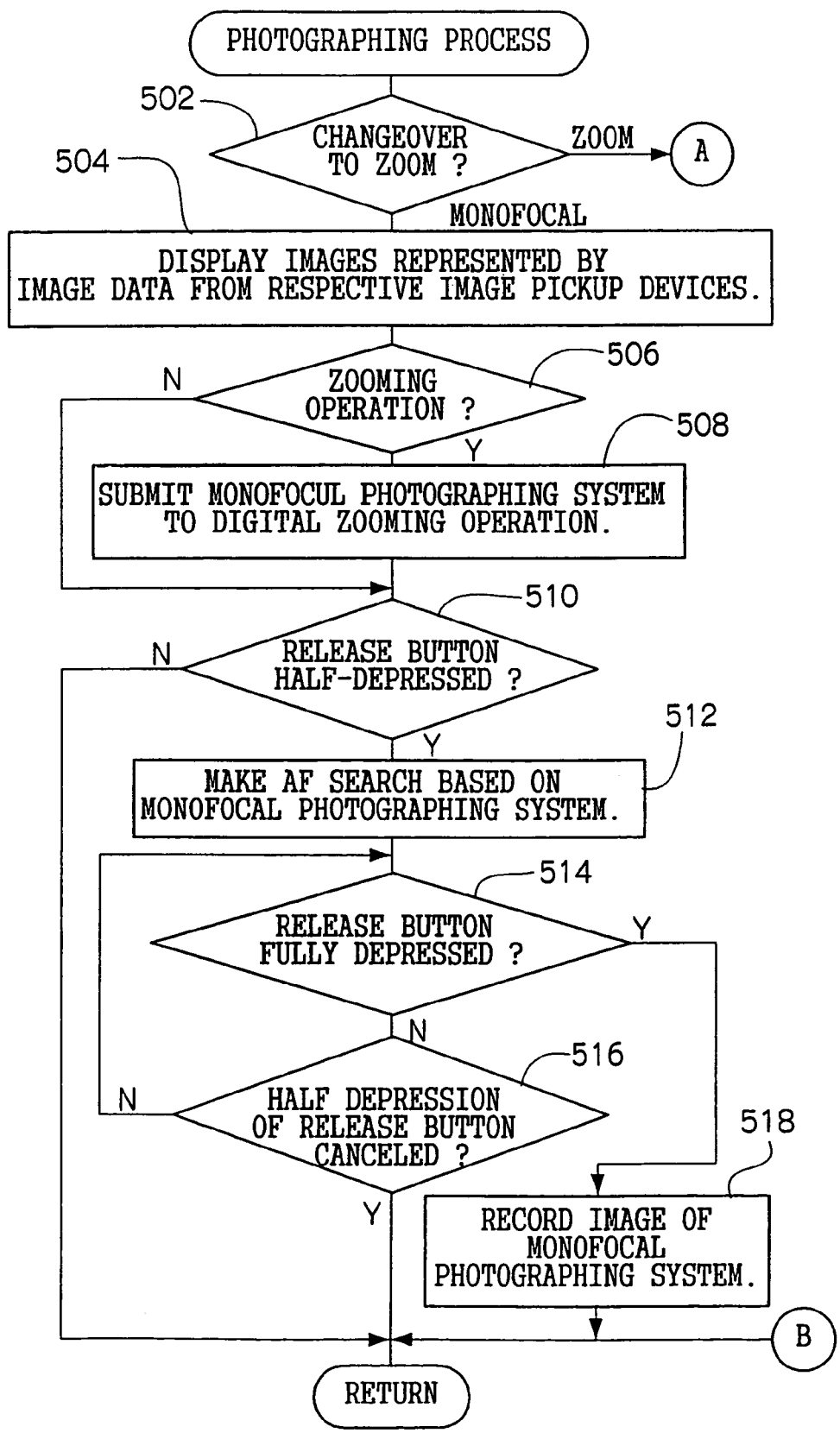
FIG. 25 is part of a flow chart showing a photographing process in a digital camera according to the fourth embodiment of the invention.
Figure 26:
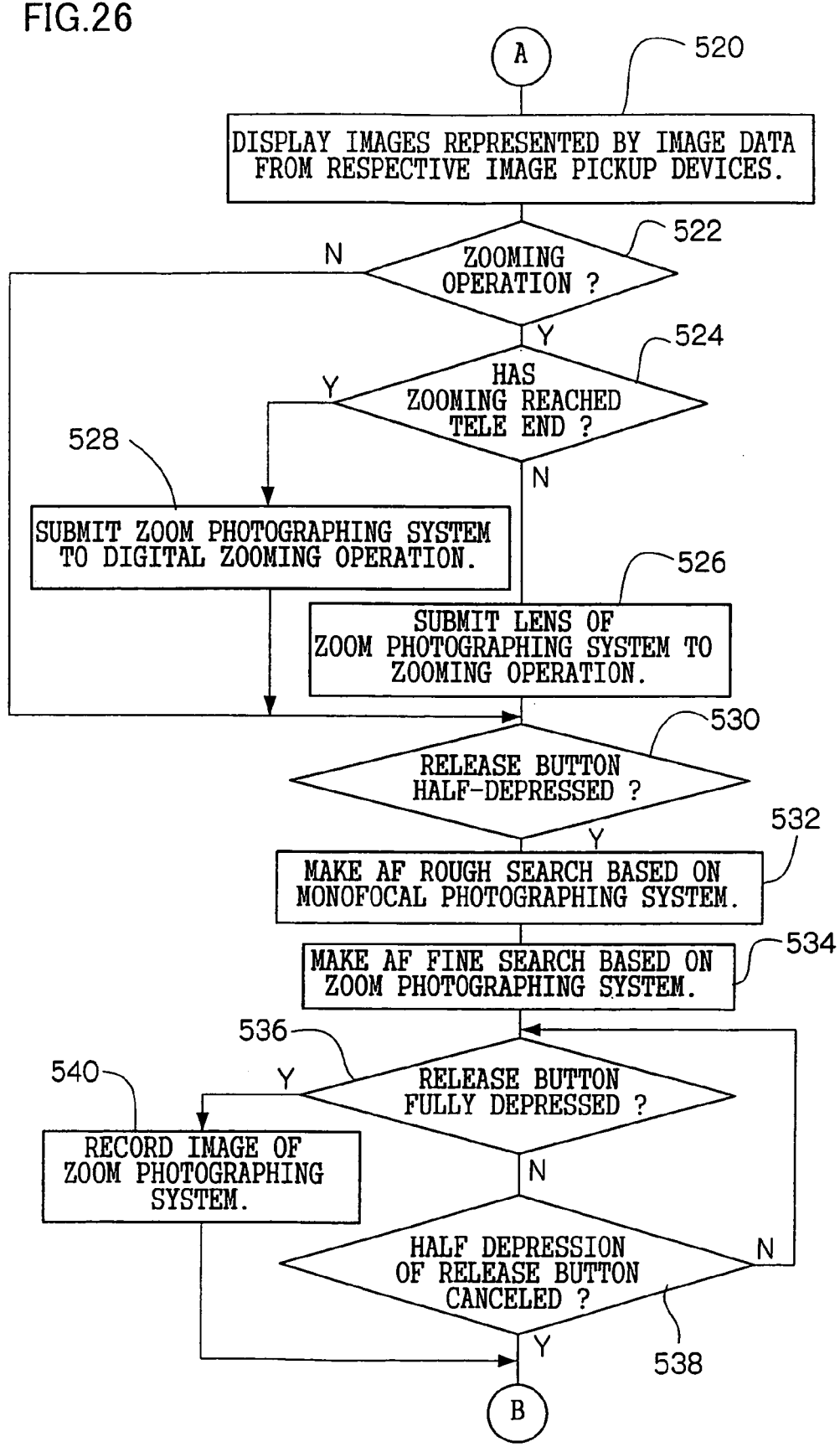
FIG. 26 is the remainder of the flow chart showing the photographing process in the digital camera according to the fourth embodiment of the invention.

Next, the operation of this embodiment will be described with reference to the flow chart of FIGS. 25 and 26 showing a photographing process routine which is iteratively executed every predetermined time period after the closure of a power source.

At a step 502, whether or not a changeover switch 276 is thrown for the selection of zoom photographing is judged from the manipulational state thereof. In a case where the judgment has been negated, images which are represented by image data from the respective image pickup devices of a first photographing system and a second photographing system are displayed a step 504. More specifically, as shown in FIG. 3, the image is displayed on the whole screen of the display unit in accordance with a video signal based on an image signal outputted from the CCD 218A of the first photographing system, while the image is displayed centrally of the image corresponding to the first photographing system in accordance with a video signal based on an image signal outputted from the CCD 218B of the second photographing system. Incidentally, the display aspect of the images of the respective photographing systems may be, not only the aspect shown in FIG. 3, but also the aspect shown in FIG. 5. Besides, the display aspect is not restricted to displaying the images which are represented by the image data from the respective image pickup devices of the first and second photographing systems, but only the image of the monofocal photographing system (first photographing system) may well be displayed on the whole screen of the display unit.

At a step 506, whether or not a zooming operation is to be performed is judged on the basis of a signal from a zoom lever 274. In case of the judgment that the zooming operation is to be performed, the image data obtained by the monofocal photographing system (first photographing system) is submitted to digital zoom processing (image processing) on the basis of a signal from the zoom lever 274 at a step 508.

At a step 510, whether or not a release button 272 is half-depressed is judged. In a case where the half depression of the release button 272 has been judged at the step 510, an AF search is made by the monofocal photographing system (first photographing system) at a step 512. Incidentally, the AF search according to this embodiment will be described later.

At the next step 514, whether or not the release button 272 has been fully depressed is judged. In a case where the full depression of the release button 272 has not been judged, whether or not the half depression of the release button has been canceled is judged at a step 516. In a case where the cancellation of the half depression of the release button has been judged, the pertinent process is ended. That is, there are ended the AF operation which is performed with the release button half-depressed as will be described later, and the processing for finding an accurate photographing EV by repeating photometric operations a plurality of times. In case of the judgment at the step 516 that the half depression of the release button is not canceled, the routine returns to the step 514.

In a case where the full depression of the release button 272 has been judged at the step 514, the routine shifts to a step 518, at which the image is recorded. More specifically, on the basis of an aperture and a shutter speed which have been finally determined by the processing performed under the half depression condition of the release button 272 as described before, an aperture stop 217 is driven so as to become the aperture finally determined, and besides, the accumulation time of charges is controlled by an electronic shutter so as to afford the determined shutter speed.

Meanwhile, when it has been judged at the step 502 that the changeover switch 276 is thrown for the selection of the zoom photographing, the routine shifts to a step 520 (refer to FIG. 26), at which the images represented by the image data from the respective image pickup devices of the first and second photographing systems are displayed in the same manner as at the step 504. At a step 522, whether or not a zooming operation is to be performed is judged on the basis of a signal from the zoom lever 274. In case of the judgment at the step 522 that the zooming operation is to be performed, whether or not the zooming operation has already been performed over, at least, the adjustable range thereof, namely, whether or not a TELE (telescopic) end has already been reached, is judged at a step 524. In case of the judgment that the TELE end has not been reached, the zooming operation is performed at a step 526. That is, as described before, a motor 254B is controlled through a drive circuit 252B, thereby to move a lens 216B. On the other hand, in case of the judgment at the step 524 that the TELE (telescopic) end has already been reached by performing the zooming operation, the digital zoom processing (image processing) is performed at a step 528.

At a step 530, whether or not the release button 272 is half-depressed is judged. In a case where the half depression of the release button 272 has been judged, an AF rough search is made by the monofocal photographing system (first photographing system) at a step 532. Incidentally, the AF rough search according to this embodiment will be described later.

At the next step 534, an AF fine search based on the zoom photographing system (second photographing system) is made.

At the next step 536, whether or not the release button 272 has been fully depressed is judged. In a case where the full depression of the release button 272 has not been judged, whether or not the half depression of the release button has been canceled is judged at a step 538. In a case where the cancellation of the half depression of the release button has been judged, the pertinent process is ended. That is, there are ended the AF operation which is performed with the release button half-depressed, and the processing for finding an accurate photographing EV by repeating photometric operations a plurality of times. In case of the judgment at the step 538 that the half depression of the release button is not canceled, the routine returns to the step 536.

In a case where the full depression of the release button 272 has been judged at the step 536, the routine shifts to a step 540, at which the image is recorded. More specifically, on the basis of an aperture and a shutter speed which have been finally determined by the processing performed under the half depression condition of the release button 272 as described before, the aperture stop 217 is driven so as to become the aperture finally determined, and besides, the accumulation time of charges is controlled by an electronic shutter so as to afford the determined shutter speed.

As thus far described, in this embodiment, the single zoom lever is included, and the instruction of changing the image angles of the first photographing system and second photographing system can be given by the zoom lever, so that the digital camera can be brought into a simple construction. Moreover, it is possible to eliminate the trouble of manipulating zoom levers in correspondence with the respective photographing systems, and to enhance the manipulativity of the digital camera. Further, since zoom levers are not disposed in correspondence with the respective photographing systems, the number of components can be decreased to render the digital camera smaller in size and lower in cost.

Incidentally, the AF control itself according to this embodiment is just as described before and shall be omitted from description.

Next, a modification to this embodiment will be described. In the foregoing embodiment, the image formed by the tele-mode imaging system and the image formed by the wide-mode imaging system are entirely displayed on the single display unit, respectively. In this modification, the image formed by the tele-mode imaging system is displayed, while only a predetermined region is displayed as to the image formed by the wide-mode imaging system. By way of example, as shown in FIG. 12, the image formed by the tele-mode imaging system is displayed on an upper region within the screen of the display unit, while only the predetermined region of the image formed by the wide-mode imaging system is extracted and displayed on a lower side within the screen of the display unit. Incidentally, such changeover of the display can be implemented by, for example, manipulating switches, and a display control can be performed by a display driver 248.

In a case, for example, where a horse race is to be photographed as shown in FIG. 12, only the predetermined belt-like region 96 may be displayed on the display unit as to the image formed by the wide-mode photographing system. Therefore, only the predetermined region 96 is designated, and the instruction of displaying the predetermined region 96 on the lower side of the screen is given, by manipulating the switches, whereby substantially the whole image formed by the wide-mode photographing system can be grasped. Moreover, necessary information can be effectively displayed in a small display area by displaying only the predetermined region 96 of the image formed by the wide-mode photographing system, in this manner.

Incidentally, although the two photographing systems are included in the above embodiment, they are not restrictive, but three or four photographing systems, for example, may well be included so as to simultaneously display formed images on the display unit. On this occasion, the display unit may well be provided with display screens in a number corresponding to that of the photographing systems.

The above embodiment includes an optical system 214A, a motor 254A, a drive circuit 252A and the CCD 218A as the first photographing system 212A, and an optical system 214B, the motor 254B, the drive circuit 252B and the CCD 218B as the second photographing system 212B. However, the invention is not restricted thereto, but it may well be so constructed that the lenses 216A and 216B are made common, and that light (a subject image) entered through a common lens is split by split means (such as semitransparent mirror) so as to guide the resulting split light beams to the CCD 218A of the first photographing system 212A and the CCD 218B of the second photographing system 212B. The lenses 216B correspond to a second variable-focus optical system in the invention.

Fifth Embodiment

Next, an example of the fifth embodiment of the invention will be described in detail. This embodiment is such that the invention is applied to a digital camera. Incidentally, since the digital camera according to this embodiment is constructed substantially similarly to the second embodiment described before, the same portions are indicated by the same reference numerals and signs and shall be omitted from detailed description, and different portions will be chiefly described.

Figure 27:
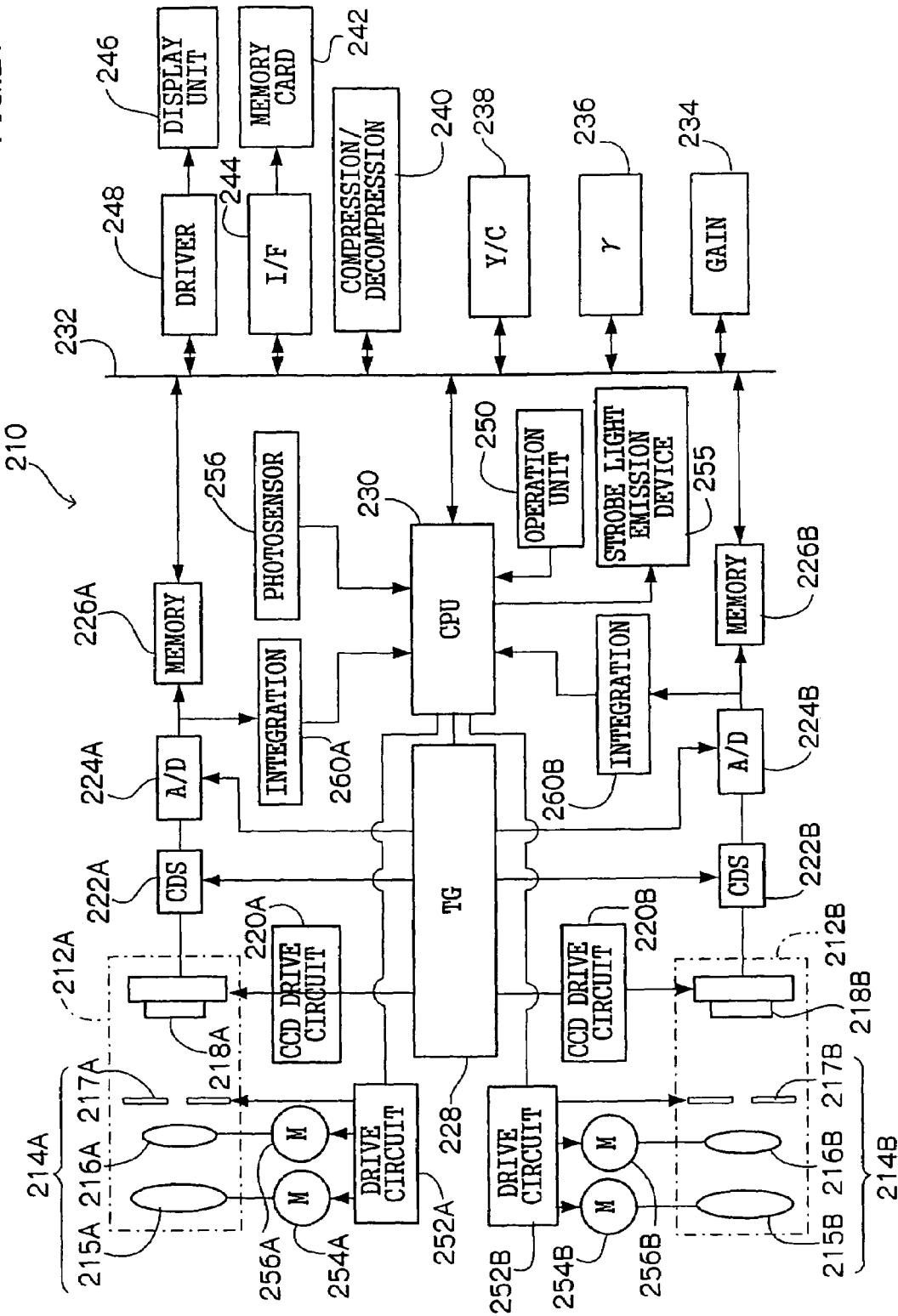
FIG. 27 is a block diagram showing the schematic construction of a digital camera according to the fifth embodiment of the invention.

Shown in FIG. 27 is a block diagram of the digital camera according to the embodiment of the invention. The digital camera 210 has two photographing systems (a first photographing system 212A and a second photographing system 212B) which are independent of each other and which are substantially identical to each other. The respective photographing systems form subject images on the photosensitive faces of CCDs 218A, 218B through photographing optical systems 214A, 214B.

The photographing optical system 214A is constructed including a photographing lens 215A, a focusing lens 216A and an aperture stop 217A, while the photographing optical system 214B is similarly constructed including a photographing lens 215B, a focusing lens 216B and an aperture stop 217B. Each of the photographing lenses 215A, 215B is made of, for example, a zoom lens (variable focal-distance lens). In this manner, the photographing lenses and the focusing lenses are explicitly shown in FIG. 27. Incidentally, each of the photographing lenses 215A, 215B may well be made of a monofocal lens.

By the way, the CCD 218A corresponds to a first image pickup device in the invention, the CCD 218B corresponds to a second image pickup device in the invention, the focusing lens 216A corresponds to a first lens in the invention, and the focusing lens 216B corresponds to a second lens in the invention.

It is allowed to employ each of the first photographing system 212A and the second photographing system 212B for photographing and for a focus adjustment to be explained later, and it is also allowed to employ one of them for the photographing and the focus adjustment and the other for only the focus adjustment.

On the basis of input signals from an operation unit 250, a CPU 230 controls corresponding circuit blocks, and it performs the controls of the zooming operations of the photographing lenses 215A, 215B, as well as automatic focus adjustment (AF) operations based on the photographing lenses 216A, 216B, and an automatic exposure adjustment (AE).

The CPU 230 executes various calculations such as focus evaluation calculations and AE calculations, on the basis of image signals outputted from the CCDs 218A, 218B, and it controls drive circuits 252A, 252B for the photographing lenses 215A, 215B, focusing lenses 216A, 216B and aperture stops 217A, 217B on the basis of the calculations. More specifically, motors 254A, 254B are driven, thereby to zoom the photographing lenses 215A, 215B and to alter the photographing magnifications thereof. By the way, in case of a construction in which the photographing lenses are manually zoomed, the motors 254A, 254B can be omitted.

Besides, motors 256A, 256B are driven, thereby to move the focusing lenses 216A, 216B to focusing positions and to set the aperture stops 217A, 217B at appropriate aperture values, respectively. The motors 256A, 256B are stepping motors, and the focusing lens positions are controlled by controlling the numbers of steps of these motors. Incidentally, the motors 256A, 256B are not restricted to the stepping motors, but they can also be, for example, DC motors. By the way, stepping motors, DC motors or the likes can be similarly employed for the motors 254A, 254B.

The remaining construction and the AE control as well as the basic AF control are similar to those of the second embodiment, and they shall be omitted from detailed description because the photographing lenses 216A, 216B and the focusing lenses in the second embodiment may be respectively reread as the photographing lenses 215A, 215B and the focusing lenses 216A, 216B in this embodiment.

Incidentally, the CPU 230, drive circuits 252A, 252B and motors 256A, 256B correspond to focus adjustment means in the invention.

Next, there will be described the AF control in the digital camera 210 according to this embodiment.

As stated before, the contrast AF scheme is adopted for the AF control. When a release button is in the state of "half depression", the motors 256A, 256B are respectively driven through the drive circuits 252A, 252B, thereby to move the focusing lenses 216A, 216B until they are located at the positions of maximum contrasts.

The calculation of the contrast value Ct being the AF evaluation value is the same as in the second embodiment, and shall be omitted from description.

Next, the AF control which is performed using the calculated contrast value Ct will be described with reference to the flow chart of FIG. 28.

At a step 600, whether or not the release button has been half-depressed is judged. In a case where the release button is not in the state of the half depression, the judgment at the step 600 is negated, and the routine stands by until the release button is half-depressed. On the other hand, when the release button has been half-depressed, the judgment at the step 600 is affirmed, and the routine shifts to a step 602.

At the step 602, the drive circuit 252A is commanded to drive the motor 256A, in order to move the focusing lens 216A of the first photographing system 212A to a first predetermined position A (refer to FIG. 29) at which a subject located at the infinite distance is focused, while the drive circuit 252B is commanded to drive the motor 256B, in order to move the focusing lens 216B of the second photographing system 212B to a second predetermined position B (refer to FIG. 29) at which a subject located at the closest distance is focused.

At the next step 604, a contrast value CtA (first evaluation value) and a contrast value CtB (second evaluation value) are respectively calculated as the AF evaluation values of the first photographing system 212A and second photographing system 212B, and the calculated values are respectively stored in memories 226A and 226B together with lens positions on those occasions.

Figure 29:
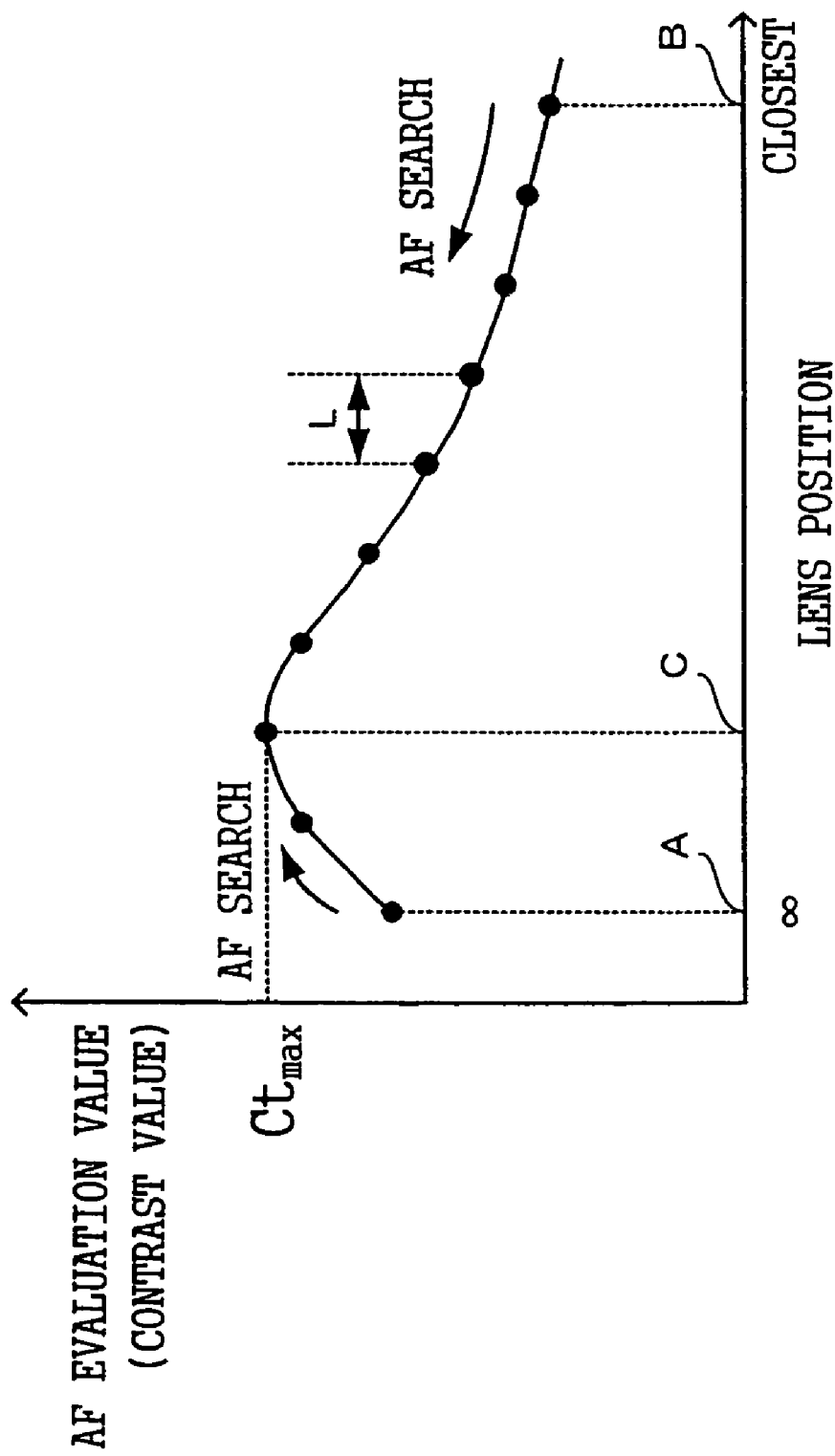
FIG. 29 is a graph showing the relationship between the lens positions and contrast values of focusing lenses according to the fifth embodiment of the invention.

At the next step 606, whether or not the peak value (maximum value) of the contrast values CtA, CtB have been detected is judged. Concretely, a contrast value CtA calculated at the last time as stored in the memory 226A is compared with the contrast value CtA calculated at the current time, while a contrast value CtB calculated at the last time as stored in the memory 226B is compared with the contrast value CtB calculated at the current time. Subsequently, in a case where the contrast value CtA calculated at the current time is smaller than the contrast value CtA calculated at the last time, or where the contrast value CtB calculated at the current time is smaller than the contrast value CtB calculated at the last time, the contrast value CtA or CtB calculated at the last time is set as the maximum value Ctmax. This is because, as shown in FIG. 29, the contrast value Ct is maximized basically at only one focusing position, and it usually enlarges toward the focusing position.

Besides, in a case where the maximum value Ctmax of the contrast values Ct has been detected, the judgment at the step 606 is affirmed, and the routine shifts to a step 608.

At the step 608, the focusing lenses 216A, 216B are respectively moved to the lens position C (focusing position) corresponding to the maximum value Ctmax, whereupon the pertinent routine is ended.

On the other hand, in a case where the maximum value Ctmax is not detected, the judgment at the step 606 is negated, and the routine shifts to a step 610.

At the step 610, whether or not the lens positions of the focusing lenses 216A, 216B are identical is judged. Here, in a case where the lens positions of the focusing lenses 216A, 216B are not identical, the judgment at the step 610 is negated, and the routine shifts to a step 612.

At the step 612, each of the lens positions of the focusing lenses 216A, 216B is driven one step, whereupon the routine returns to the step 604. That is, the focusing lens 216A is moved a predetermined step width L toward the second predetermined position B indicated in FIG. 29, while the focusing lens 216B is moved the predetermined step width L toward the first predetermined position A indicated in FIG. 29. This processing of driving each of the lens positions of the focusing lenses 216A, 216B one step is iterated until the maximum value Ctmax is detected or until the lens positions of the focusing lenses 216A, 216B become the identical position.

Incidentally, the step width L is set at a length which is equal to or less than the focal depth of each focusing lens by way of example. Thus, the focusing lenses 216A, 216B can be prevented from moving in excess of the range of the focal depth including the focusing position, and the subject can be reliably focused.

Figure 30:
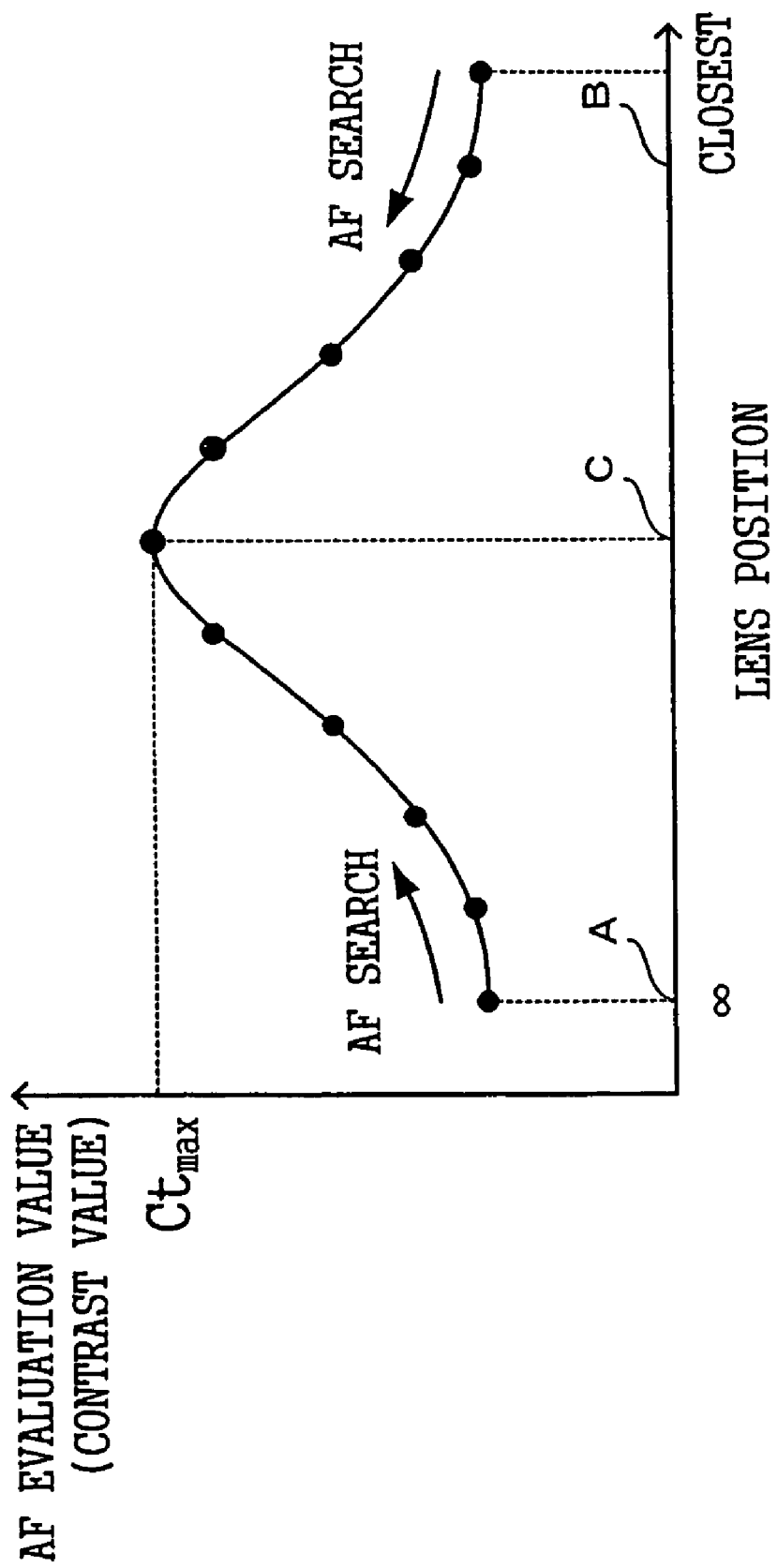
FIG. 30 is a graph showing the relationship between the lens positions and contrast values of the focusing lenses according to the fifth embodiment of the invention.

Meanwhile, the judgment at the step 610 concerning whether or not the lens positions of the focusing lenses 216A, 216B are identical is the same as a judgment concerning whether or not the focusing lenses 216A, 216B have moved to the middle point between the first predetermined position A and the second predetermined position B without the detection of the maximum value Ctmax. Cases where the maximum value Ctmax is not detected in this manner, include a case where the peaks of the AF evaluation values exist at the middle point between the first predetermined position A and the second predetermined position B as shown in FIG. 30, and a case where the AF evaluation values exhibit a flat characteristic having no peak, as in case of imaging the blue sky by way of example.

In case of judging whether or not the peaks of the AF evaluation values exist at the middle point between the first predetermined position A and the second predetermined position B, it is allowed to judge whether or not both the AF evaluation values of the respective photographing systems tend to increase.

Therefore, in a case where the judgment at the step 610 has been affirmed, whether or not both the AF evaluation values of the respective photographing systems have the tendency to increase is judged at a step 614. Here, in a case where both the AF evaluation values of the respective photographing systems have the tendency to increase, the middle point is judged to be the focusing position C, and the pertinent routine is ended.

On the other hand, in a case where both the AF evaluation values of the respective photographing systems do not have the tendency to increase, it is judged that no peak exists, and the focusing lenses 216A, 216B are respectively moved to predetermined pan positions at the next step 616, whereupon the pertinent routine is ended. Incidentally, the pan positions may be predetermined fixed positions. Alternatively, a predetermined corresponding relationship between the zooming positions and pan positions of the lenses may well be stored as a lookup table, so as to obtain the pan positions corresponding to the zooming positions from the lookup table.

As thus far described, in this embodiment, the two photographing systems are included, and the focus adjustment is performed in such a way that the focusing lens of one photographing system is driven stepwise so as to move from the first predetermined position at which the focusing position becomes the infinite distance, toward the second predetermined position at which the focusing position becomes the closest position, while the focusing lens of the other photographing system is driven stepwise so as to move from the second predetermined position toward the first predetermined position. Therefore, a time period for detecting the focusing position can be sharply shortened.

Incidentally, this embodiment has been described by taking as an example the case where the initial position of the focusing lens 216A is set at the first predetermined position A, while the initial position of the focusing lens 216B is set at the second predetermined position B, and where the focus adjustment is done after the focusing lenses are first moved to the respective initial positions, but the initial positions of the focusing lenses may well be set at the current positions thereof. In this case, even when the focusing position lies at the central position as shown in FIG. 30, the detection of the focusing position can be quickened at some current positions of the focusing lenses.

Sixth Embodiment

Next, the sixth embodiment of the invention will be described in detail. Incidentally, the same portions as in the fifth embodiment are indicated by the same reference numerals and shall be omitted from detailed description.

Since the construction of a digital camera in this embodiment is the same as in the fifth embodiment, it shall be omitted from description.

Next, an AF control according to this embodiment will be described with reference to flow charts shown in FIGS. 31 and 32. By the way, in FIG. 31, the same reference numerals are respectively assigned to steps which perform the same processing as in the flow chart shown in FIG. 28.

Figure 28:
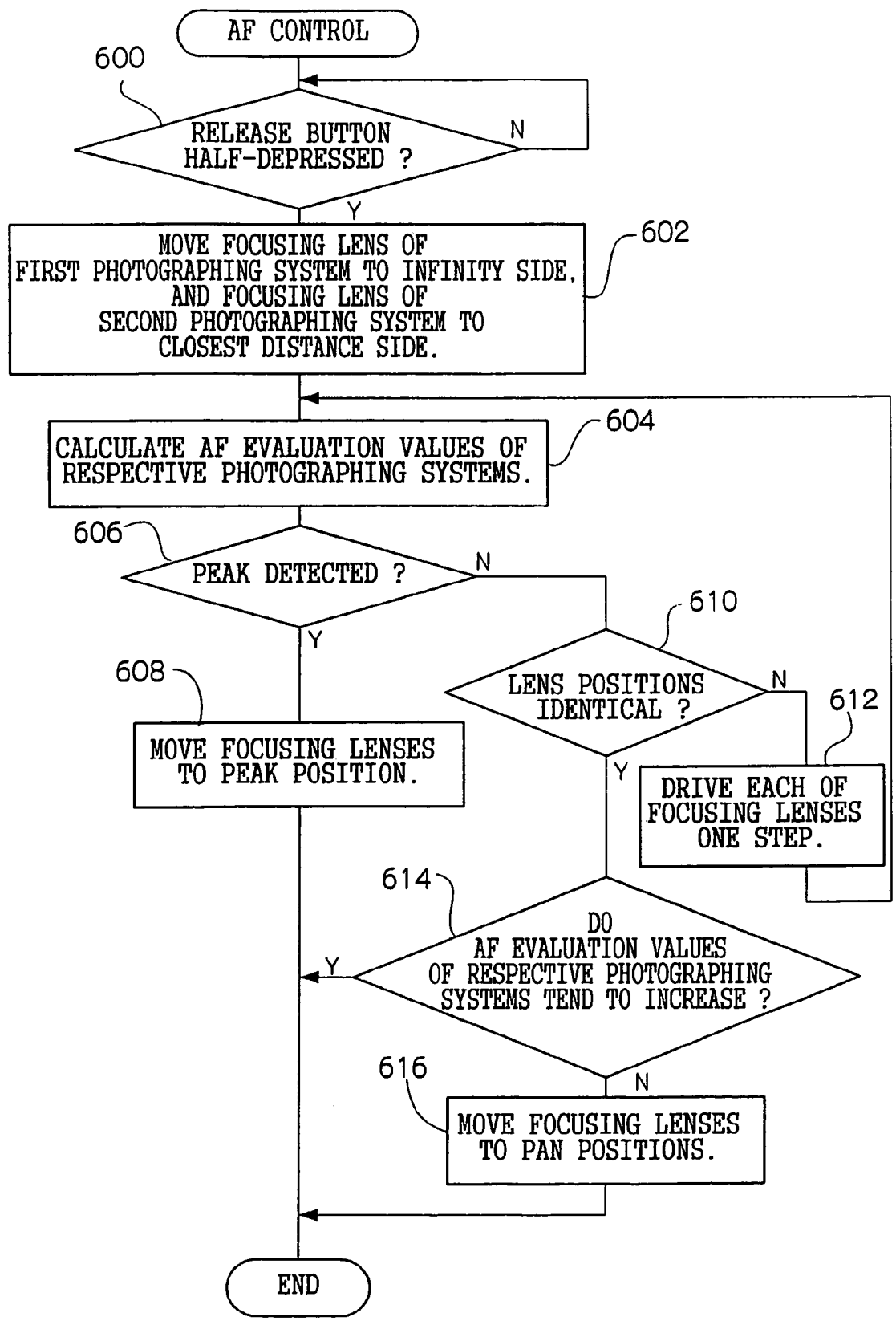
FIG. 28 is a flow chart showing the flow of an AF control in the fifth embodiment of the invention.
Figure 31:
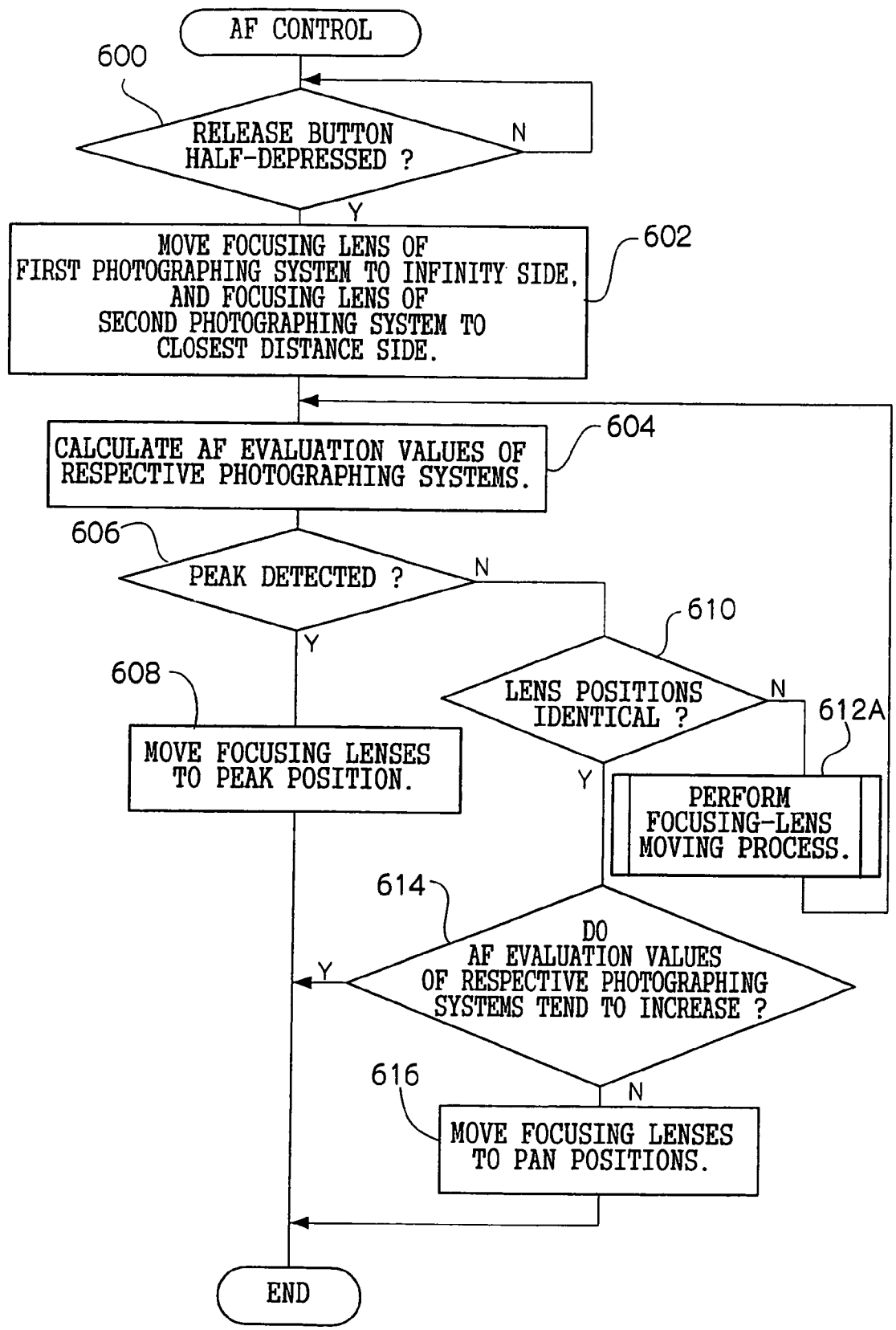
FIG. 31 is a flow chart showing the flow of an AF control in the sixth embodiment of the invention.

As shown in FIG. 31, the AF control differs from that of the flow chart shown in FIG. 28, only in the focusing-lens moving process of a step 612A. Therefore, the different process will be described with reference to the flow chart shown in FIG. 32, and the others shall be omitted from description.

Figure 32:
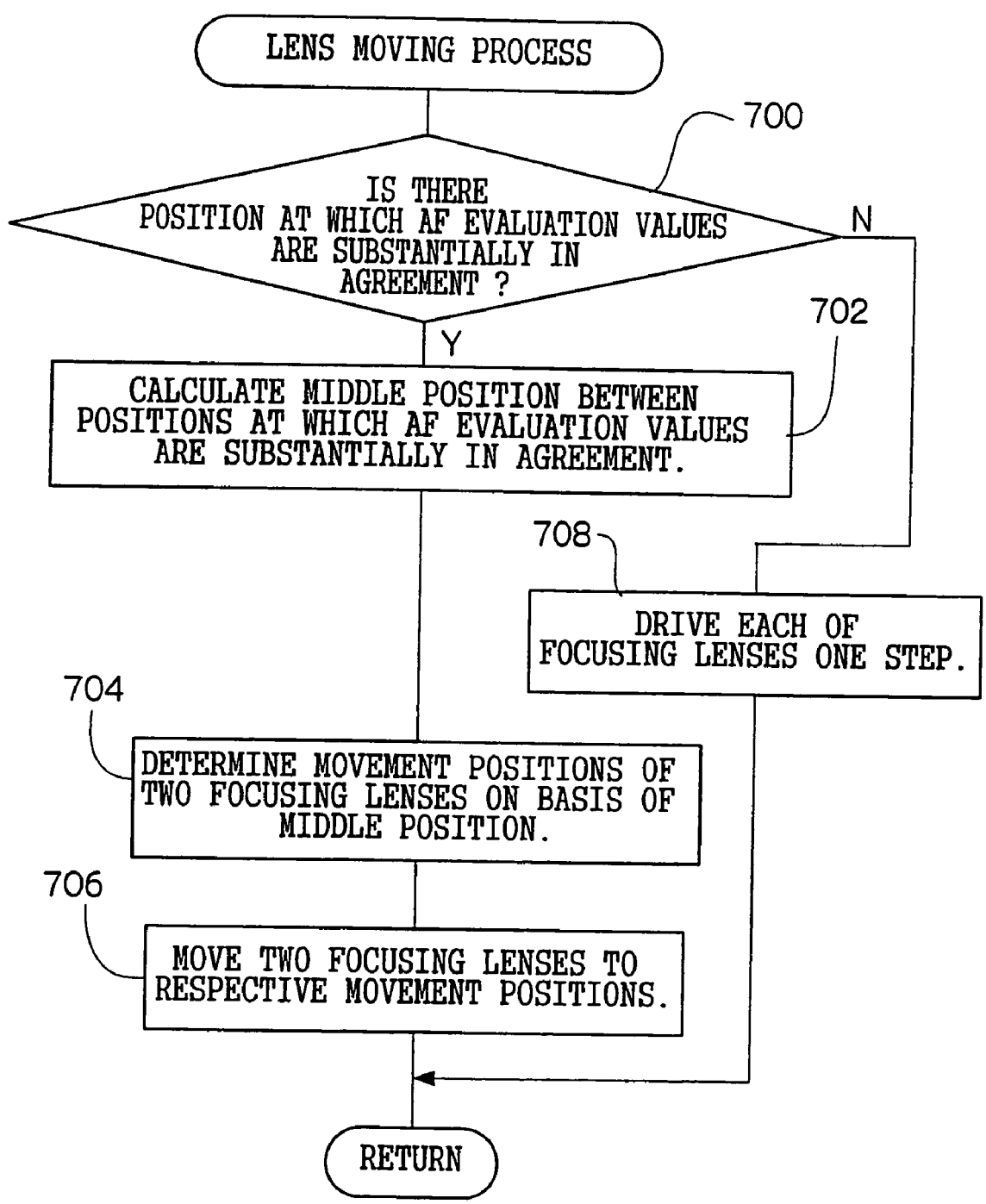
FIG. 32 is a flow chart showing the flow of a focusing-lens moving process in the sixth embodiment of the invention.

As shown in FIG. 32, whether or not lens positions at which the contrast values CtA, CtB are substantially in agreement exist is judged at a step 700. Concretely, comparisons are made between all the contrast values CtA stored in the memory 226A and all the contrast values CtB stored in the memory 226B, so as to judge whether or not the lens positions at which the contrast values CtA and CtB are substantially in agreement exist.

Besides, in the nonexistence of the lens positions at which the contrast values CtA and CtB are substantially in agreement, the routine shifts to a step 708. At the step 708, the lens position of each of the focusing lenses 216A, 216B is moved one step as at the step 612 in FIG. 28. That is, the focusing lens 216A is moved the predetermined step width L toward the second predetermined position B, while the focusing lens 216B is moved the predetermined step width L toward the first predetermined position A.

On the other hand, in the existence of the lens positions at which the contrast values CtA and CtB are substantially in agreement, the judgment at the step 700 is affirmed, and the routine shifts to a step 702.

Figure 33:
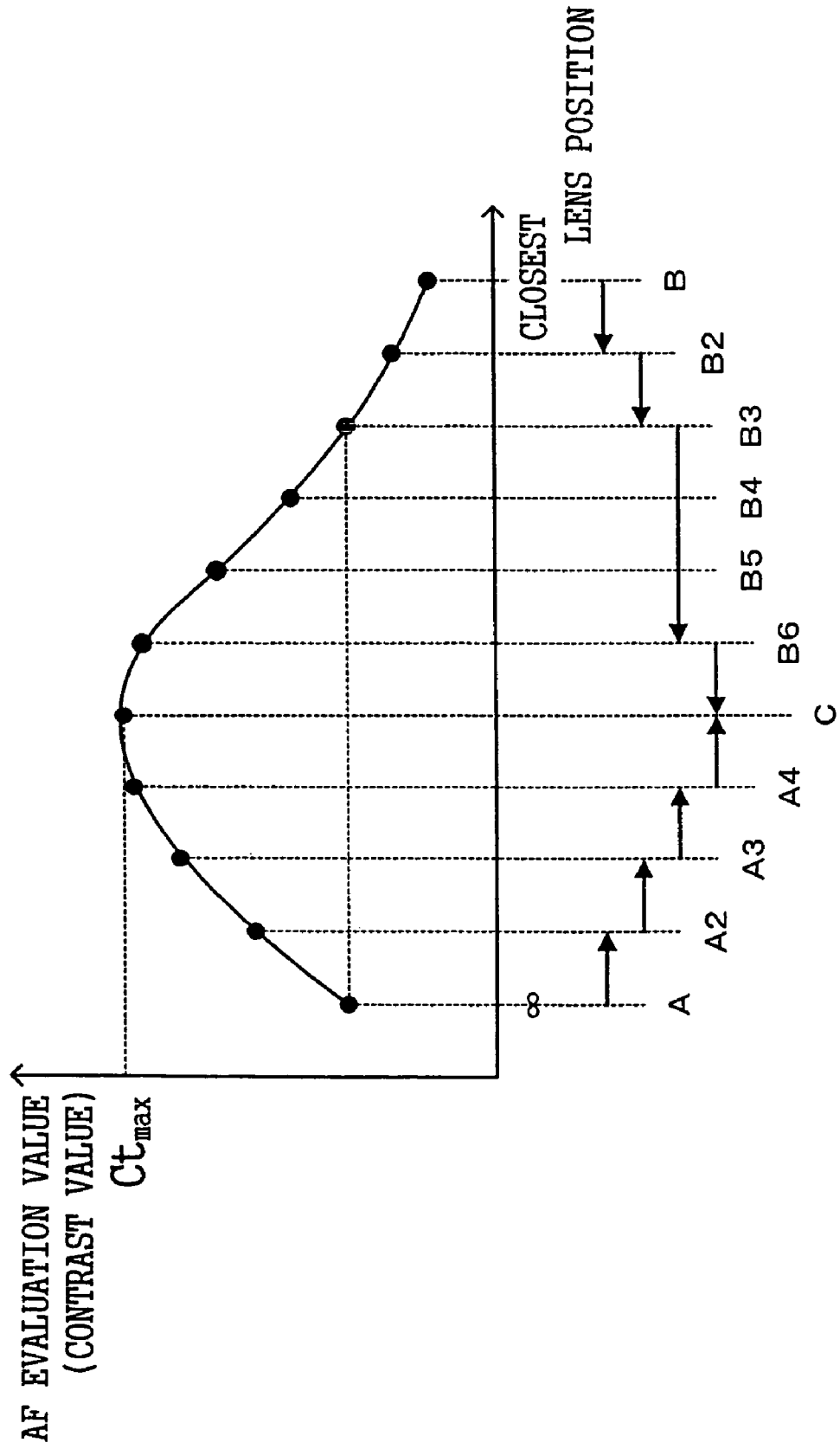
FIG. 33 is a graph showing the relationship between the lens positions and contrast values of the focusing lenses according to the sixth embodiment of the invention.

In, for example, a case where the relationship between the lens positions and the contrast values is as shown in FIG. 33. In this case, when the focusing lens 216B is driven a position B3, the contrast value CtB at this position agrees with the contrast value CtA at the position A, and the judgment at the step 700 is affirmed.

At the step 702, the middle position between the lens positions at which the contrast values CtA and CtB are substantially in agreement is calculated. In the case of FIG. 33 by way of example, the middle position C between the position A and the position B3 is calculated.

At the next step 704, movement positions to which the focusing lenses 216A, 216B are to be moved are respectively determined on the basis of the calculated middle position C. Concretely, a predetermined range including the middle position C is set, and the end of the predetermined range on the infinity side is determined as the movement position of the focusing lens 216A, while the end of the predetermined range on the closest distance side is determined as the movement position of the focusing lens 216B. The predetermined range is set around the middle position C, and it is set to be, for example, a range of several steps with the middle position C centered. In the case of FIG. 33 by way of example, a range of one step on each of both the sides of the middle position C, namely, a range of positions A4-B6 is set as the predetermined range.

The reason why, in this manner, the predetermined range including the middle position of the lens positions at which the AF evaluation values are substantially in agreement is found, and both the ends of the predetermined range are determined as the movement positions of the respective focusing lenses, is that the relationship between the lens positions and the AF evaluation values usually present substantially the shape of a normal distribution centering round a position at which the contrast value Ct becomes the maximum, as shown in FIG. 33.

Besides, at the next step 706, the focusing lenses 216A, 216B are respectively moved to the movement positions determined at the step 704, whereupon the routine is returned. In the case of FIG. 33 by way of example, the focusing lens 216A is moved to the position A4, and the focusing lens 216B to the position B6. Further, the above processing is iterated until the maximum value of the contrast value is detected or until the positions of the respective focusing lenses become identical.

As thus far described, the predetermined range including the middle position of the lens positions at which the AF evaluation values are substantially in agreement is found, and the respective focusing lenses are moved to both the ends of the predetermined range, so that a time period for detecting the focusing position can be shortened still further. In the case of FIG. 33 by way of example, the focusing lens 216B is driven to the position B3 and is thereafter driven to the position B6 by skipping positions B4 and B5, so that a time period can be shortened to the corresponding extent.

Incidentally, the width of the stepping width may well be fined after the focusing lenses 216A, 216B have been moved near the middle position C. Thus, a more accurate focus adjustment can be performed.

Figure 34:
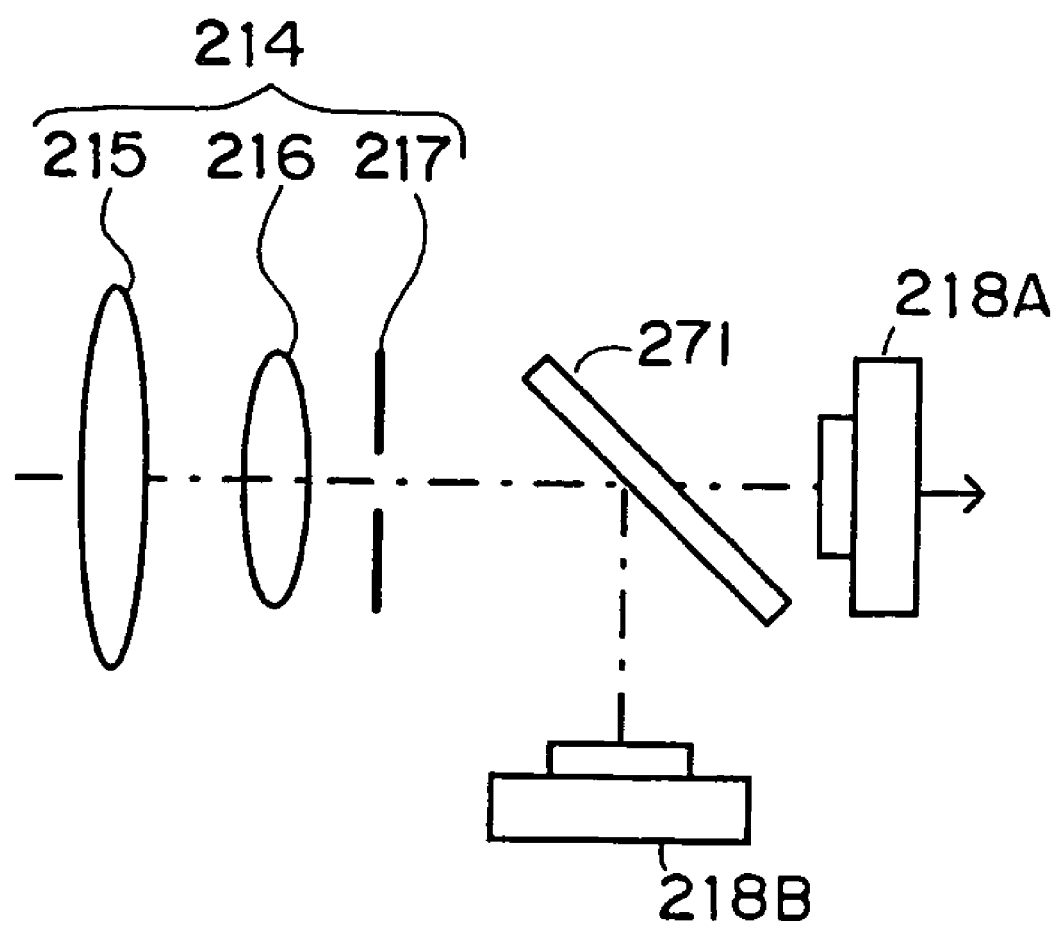
FIG. 34 is a schematic constructional diagram showing another example of a photographing system.
Figure 35:
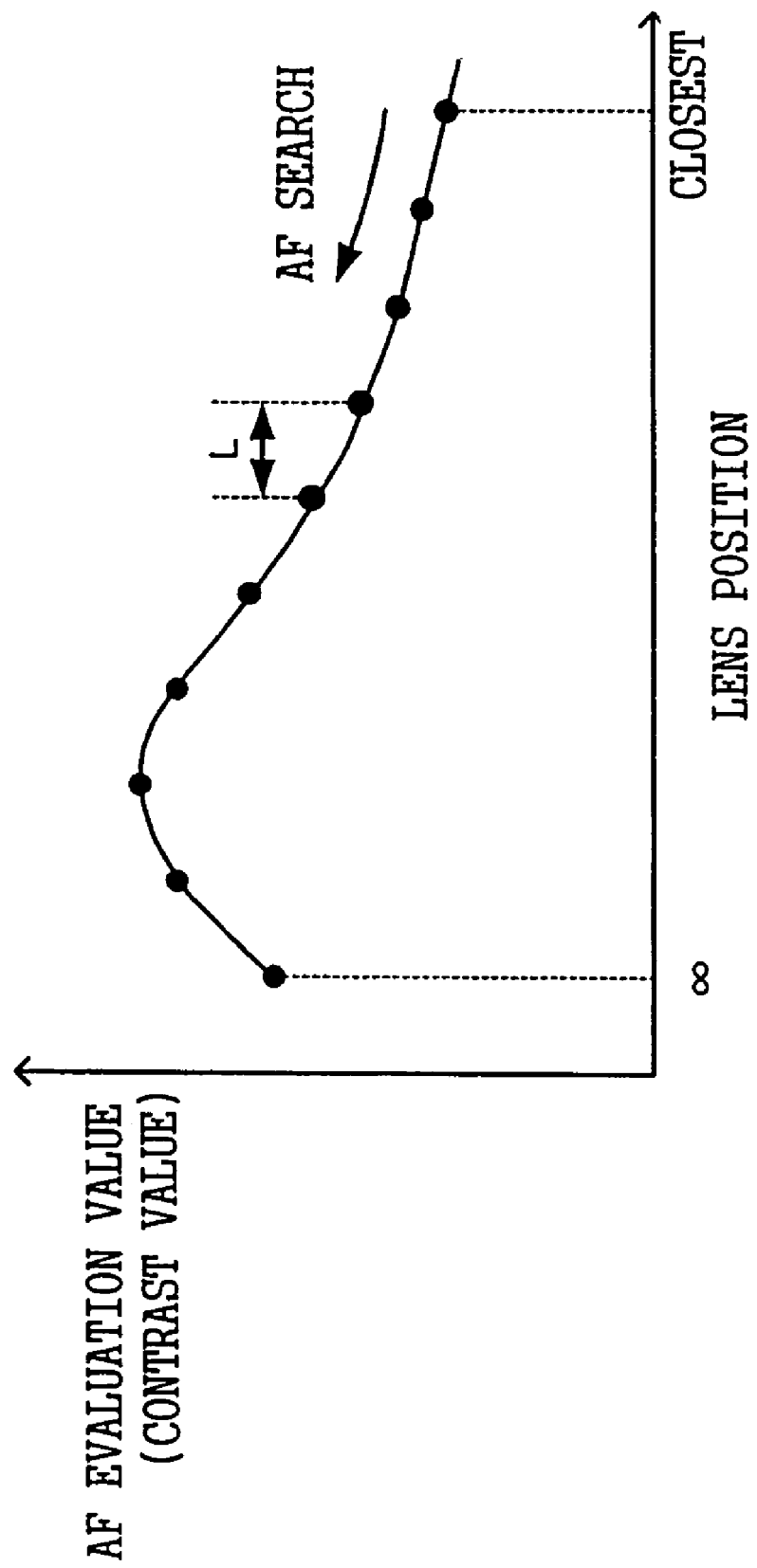
FIG. 35 is a graph showing the relationship between the lens positions and the contrast values of the focusing lenses according to the related art.

Besides, the embodiment has been described concerning the case of the construction which includes the two photographing optical systems independent of each other, but the invention is not restricted thereto. As shown in FIG. 34 by way of example, the invention may well have a construction in which light entered from a single photographing optical system 214 is branched into two directions by a semitransparent mirror 271, and the branched light beams are respectively entered into CCDs 218A, 218B. In this case, a focus adjustment is performed by moving the CCDs 218A, 218B. Thus, two AF evaluation values are calculated from an identical image, so that the focus adjustment becomes more accurate.

Seventh Embodiment

Next, the seventh embodiment of the invention will be described. Incidentally, since the construction of a digital camera according to this embodiment is substantially similar to the construction of the fifth embodiment, it shall be omitted from detailed description, and different portions will be chiefly described.

As shown in FIG. 27, the digital camera 210 according to this embodiment has two photographing systems (a first photographing system 212A and a second photographing system 212B) which are independent of each other. This digital camera differs from the digital camera according to the fifth embodiment in that, at least, either the image pickup devices or the photographing optical systems of the two independent photographing systems are different. The remaining construction, and an AE control, an AF control, etc. are similar to those of the fifth embodiment, and shall be omitted from description.

Next, there will be described the AF control which is performed using the calculated contrast value Ct as explained before. Incidentally, since the basic flow of the AF control is the same as in the flow chart shown in FIG. 28, reference will be had to FIG. 28. Besides, a case exemplified here is such that the photographing optical system 214A is the same as the photographing optical system 214B, and that the CCD 218A is larger in the number of pixels than the CCD 218B.

At a step 600, whether or not a release button has been half-depressed is judged. In a case where the release button is not in the state of the half depression, the judgment at the step 600 is negated, and the routine stands by until the release button is half-depressed. On the other hand, when the release button has been half-depressed, the judgment at the step 600 is affirmed, and the routine shifts to a step 602.

At the step 602, a drive circuit 252A is commanded to drive a motor 256A, in order to move the focusing lens 216A of the first photographing system 212A to a first predetermined position A (refer to FIG. 36) at which a subject located at the infinite distance is focused, while a drive circuit 252B is commanded to drive a motor 256B, in order to move the focusing lens 216B of the second photographing system 212B to a second predetermined position B (refer to FIG. 36) at which a subject located at the closest distance is focused.

At the next step 604, a contrast value CtA (first evaluation value) and a contrast value CtB (second evaluation value) are respectively calculated as the AF evaluation values of the first photographing system 212A and second photographing system 212B, and the calculated values are respectively stored in memories 226A and 226B together with lens positions on those occasions.

At the next step 606, whether or not the peak value (maximum value) of the contrast values CtA, CtB have been detected is judged. Concretely, a contrast value CtA calculated at the last time as stored in the memory 226A is compared with the contrast value CtA calculated at the current time, while a contrast value CtB calculated at the last time as stored in the memory 226B is compared with the contrast value CtB calculated at the current time. Subsequently, in a case where the contrast value CtA calculated at the current time is smaller than the contrast value CtA calculated at the last time, or where the contrast value CtB calculated at the current time is smaller than the contrast value CtB calculated at the last time, the contrast value CtA or CtB calculated at the last time is set as the maximum value Ctmax. This is because, as shown in FIG. 36, the contrast value Ct is maximized basically at only one focusing position, and it usually enlarges toward the focusing position.

Figure 36:
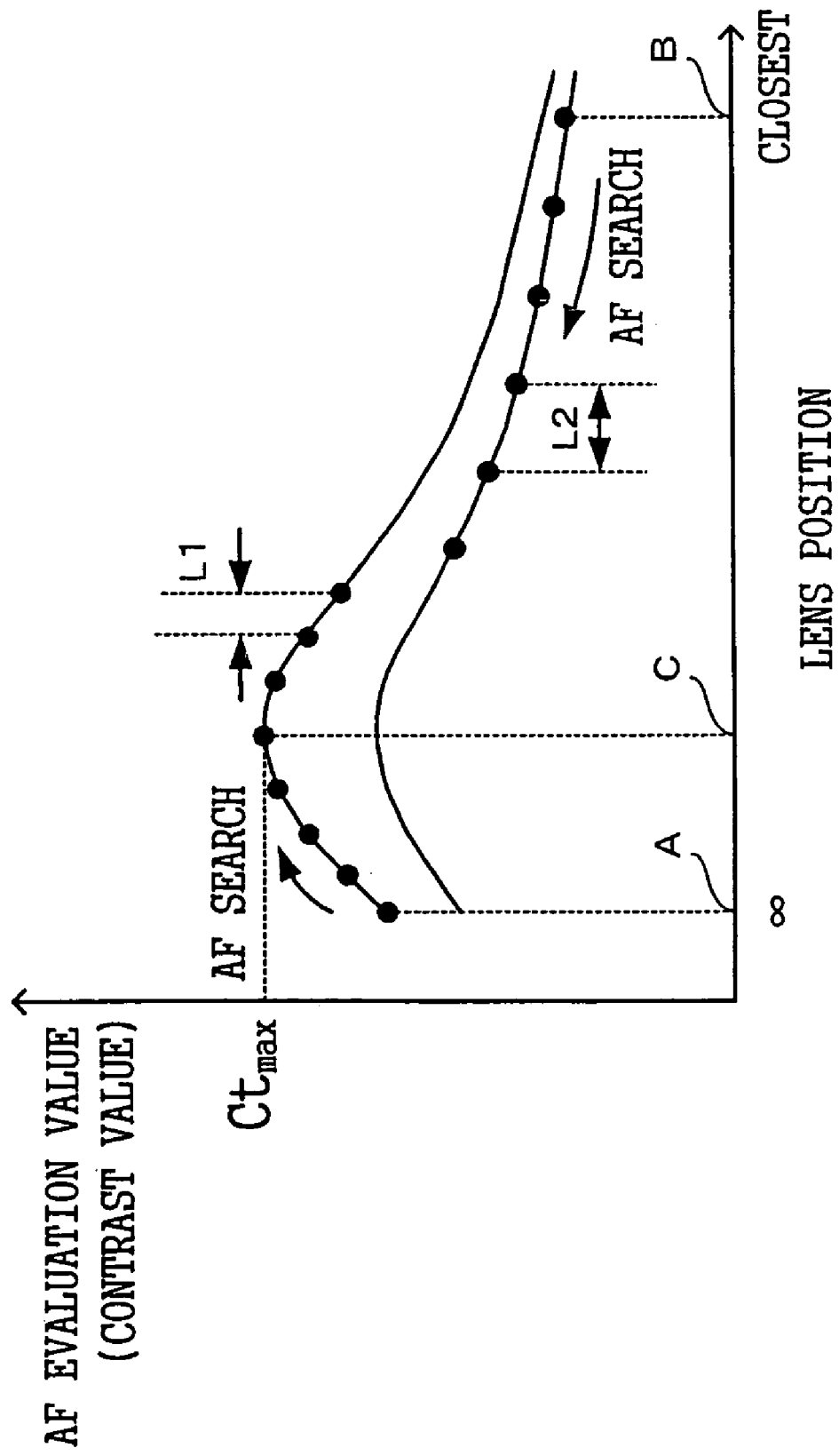
FIG. 36 is a graph showing the relationship between the lens positions and the contrast values of focusing lenses according to the seventh embodiment of the invention.

Incidentally, since the numbers of pixels of the CCDs 218A and 218B are different, the calculated contrast values differ in the respective photographing systems as shown in FIG. 36. Since, however, an identical subject is photographed, peak positions become substantially identical.

Besides, in a case where the maximum value Ctmax of the contrast values Ct has been detected, the judgment at the step 606 is affirmed, and the routine shifts to a step 608.

At the step 608, the focusing lenses 216A, 216B are respectively moved to the lens position C (focusing position) corresponding to the maximum value Ctmax, whereupon the pertinent routine is ended. On the other hand, in a case where the maximum value Ctmax is not detected, the judgment at the step 606 is negated, and the routine shifts to a step 610.

At the step 610, whether or not the lens positions of the focusing lenses 216A, 216B are identical is judged. Here, in a case where the lens positions of the focusing lenses 216A, 216B are not identical, the judgment at the step 610 is negated, and the routine shifts to a step 612.

At the step 612, each of the lens positions of the focusing lenses 216A, 216B is driven one step, whereupon the routine returns to the step 604. That is, the focusing lens 216A is moved a predetermined step width L1 toward the second predetermined position B indicated in FIG. 36, while the focusing lens 216B is moved a predetermined step width L2 toward the first predetermined position A indicated in FIG. 36. This processing of driving each of the lens positions of the focusing lenses 216A, 216B one step is iterated until the maximum value Ctmax is detected or until the lens positions of the focusing lenses 216A, 216B become the identical position.

Incidentally, the step widths L1, L2 are set at lengths which are equal to or less than the focal depths of the respective focusing lenses by way of example. Thus, the focusing lenses 216A, 216B can be prevented from moving in excess of the ranges of the focal depths including the focusing position, and the subject can be reliably focused. Besides, the step width L2 can be set larger than the step width L1 as shown in FIG. 36. The reason therefor is that, since the second photographing system 212B which employs the CCD 218B having the smaller number of pixels becomes larger in the allowable circle of confusion, it is permitted to make the AF search at a larger step.

Meanwhile, the judgment at the step 610 concerning whether or not the lens positions of the focusing lenses 216A, 216B are identical is the same as a judgment concerning whether or not the focusing lenses 216A, 216B have moved to the identical position without the detection of the maximum value Ctmax. Cases where the maximum value Ctmax is not detected in this manner, include a case where the peaks of the AF evaluation values exist at positions to which the respective focusing lenses have been driven by the identical number of steps, and a case where the AF evaluation values exhibit a flat characteristic having no peak, as in case of imaging the blue sky by way of example.

In case of judging whether or not the peaks of the AF evaluation values exist at the positions to which the respective focusing lenses have been driven by the identical number of steps, it is allowed to judge whether or not both the AF evaluation values of the respective photographing systems tend to increase.

Therefore, in a case where the judgment at the step 610 has been affirmed, whether or not both the AF evaluation values of the respective photographing systems have the tendency to increase is judged at a step 614. Here, in a case where both the AF evaluation values of the respective photographing systems have the tendency to increase, the lens positions of the respective focusing lenses on those occasions are judged to correspond to the focusing position C, and the pertinent routine is ended.

On the other hand, in a case where both the AF evaluation values of the respective photographing systems do not have the tendency to increase, it is judged that no peak exists, and the focusing lenses 216A, 216B are respectively moved to predetermined pan positions at the next step 616, whereupon the pertinent routine is ended. Incidentally, the pan positions may be predetermined fixed positions. Alternatively, a predetermined corresponding relationship between the zooming positions and pan positions of the lenses may well be stored as a lookup table, so as to obtain the pan positions corresponding to the zooming positions from the lookup table.

As thus far described, in this embodiment, the two photographing systems are included, and the focus adjustment is performed in such a way that the focusing lens of one photographing system is driven stepwise so as to move from the first predetermined position at which the focusing position becomes the infinite distance, toward the second predetermined position at which the focusing position becomes the closest position, while the focusing lens of the other photographing system is driven stepwise so as to move from the second predetermined position toward the first predetermined position. Therefore, a time period for detecting the focusing position can be sharply shortened.

Figure 37:
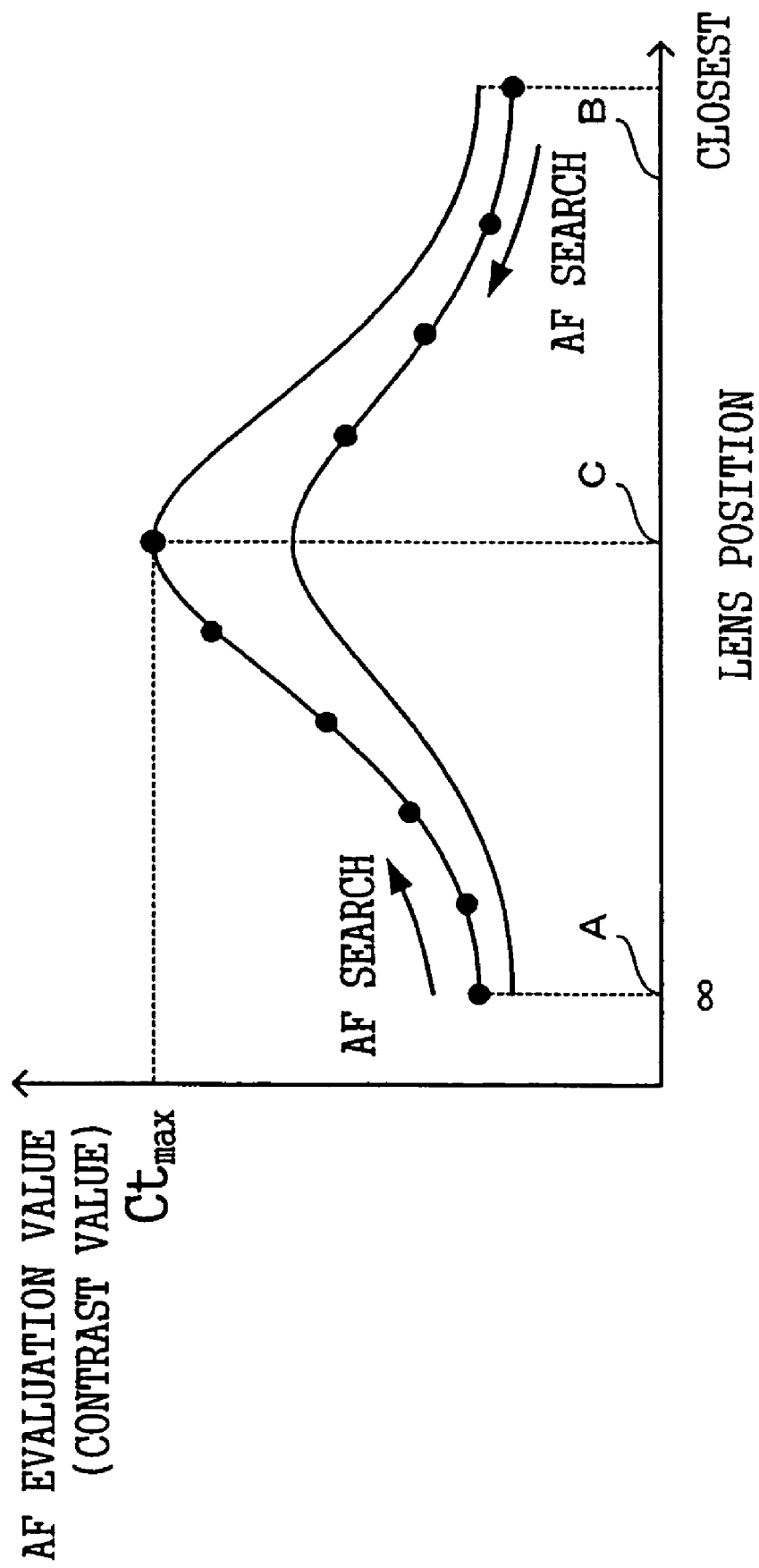
FIG. 37 is a graph showing the relationship between the lens positions and the contrast values of the focusing lenses according to the seventh embodiment of the invention.

Incidentally, this embodiment has been described by taking as an example the case where the initial position of the focusing lens 216A is set at the first predetermined position A, while the initial position of the focusing lens 216B is set at the second predetermined position B, and where the focus adjustment is done after the focusing lenses are first moved to the respective initial positions, but the initial positions of the focusing lenses may well be set at the current positions thereof. In this case, even when the focusing position lies at the central position as shown in FIG. 37 by way of example, the detection of the focusing position can be quickened at some current positions of the focusing lenses.

Besides, although the two focusing lenses are moved to the focusing position in this embodiment, only the focusing lens for photographing use may well be moved to the focusing position. Further, in a case where, when the first photographing system 212A is for the photographing use, the peak position of the AF evaluation values of the second photographing system 212B has been detected earlier, it is also allowed to move the focusing lens 216A near the detected peak position and to perform a focus adjustment again.

Besides, although this embodiment has been described concerning the case where the numbers of pixels of the CCDs 218A and 218B are different, a focusing position can be detected as in the foregoing even in a case where the sizes of the CCDs 218A and 218B are different. In this case, the photographing image angles of the CCDs 218A and 218B differ on account of the different sizes thereof, but the AF areas (areas for the focus adjustment) of the CCDs 218A and 218B for calculating the AF evaluation values may be set so as to afford equal image angles and to calculate the AF evaluation values from image data within the respective AF areas. Thus, the peak positions of the AF evaluation values of the respective focusing lenses can be rendered substantially identical.

Also, in a case where the CCDs 218A and 218B are identical to each other and where the photographing optical systems are different from each other, a time period for detecting a focusing position can be shortened.

Figure 38A:
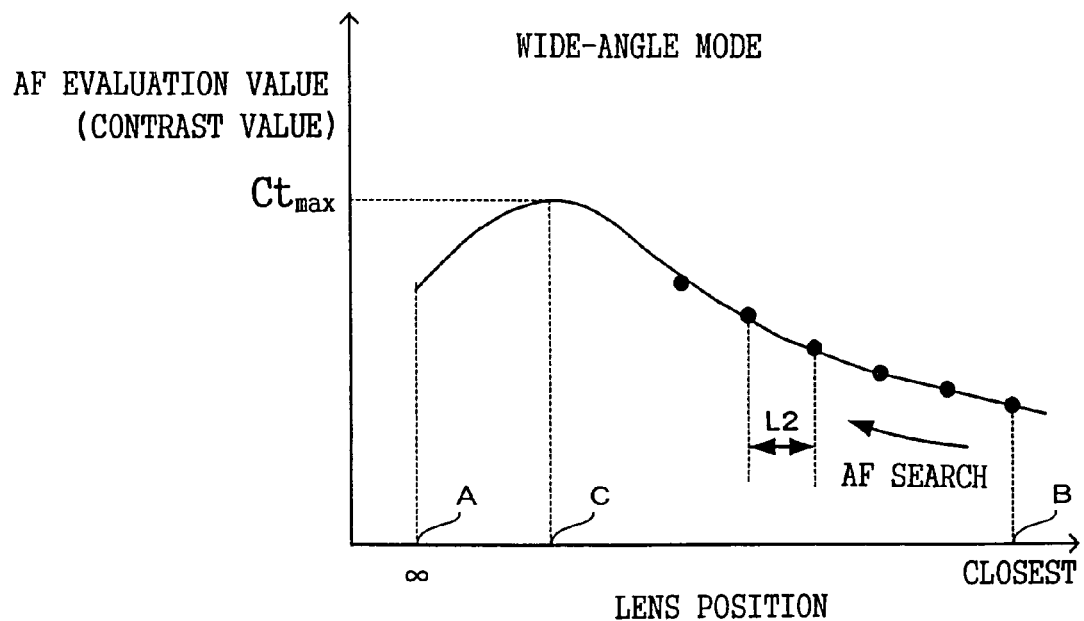
Figure 38B:
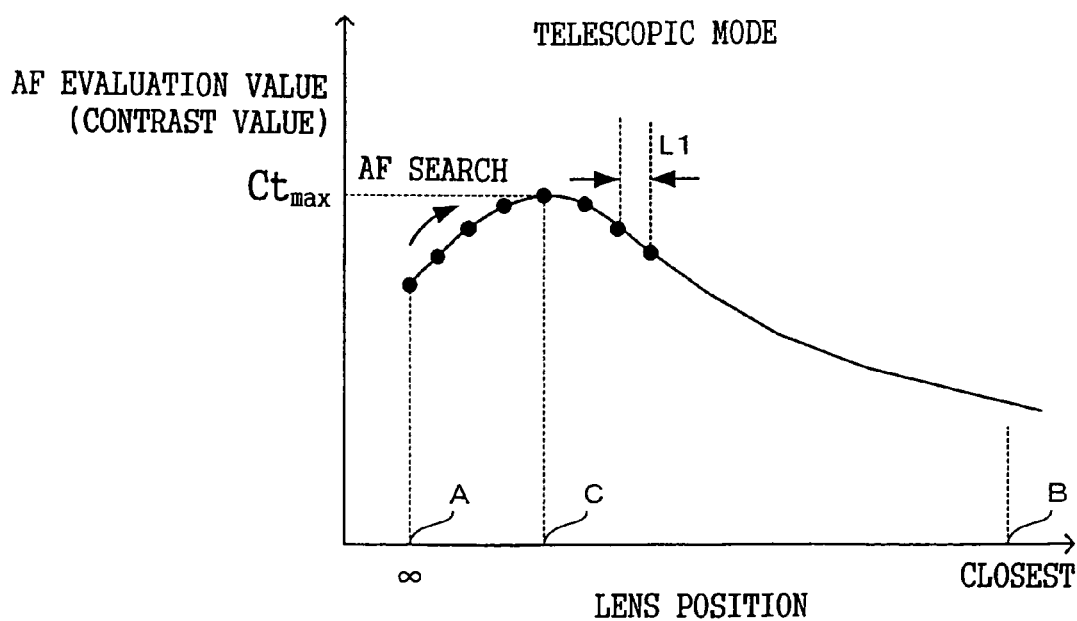
FIG. 38B is a graph showing the relationship between the lens position and contrast value of the focusing lens of a photographing system of telescopic mode.

By way of example, in a case where the photographing optical systems 214A and 214B are an optical system of wide-angle mode and an optical system of telescopic mode, respectively, peak positions are detected as in the foregoing in such a way that, as shown in FIG. 38A, the focusing lens 216A is moved every step at a step width L2 from a second predetermined position B at which a subject located at the closest position is focused, toward a first predetermined position A at which a subject located at the infinite distance is focused, while as shown in FIG. 38B, the focusing lens 216B is moved every step at a step width L1 from the first predetermined position A toward the second predetermined position B. In this case, when the subject exists near the closest distance, the peak position is easily detected on the side of the photographing optical system 214A, and when the subject exists near the infinite distance, the peak position is easily detected on the side of the photographing optical system 214B.

Besides, the step width L2 can be set larger than the step width L1 as shown in FIGS. 38A and 38B. The reason therefor is that the optical system of wide-angle mode becomes larger in the depth of field than the optical system of telescopic mode. Thus, the first photographing system 212A employing the CCD 218A of wide-angle mode is permitted to make the AF search at the larger step as compared with the second photographing system 212B, so that the rate at which the peak position of the focusing lens 216A of the first photographing system 212A is detected earlier becomes higher.

Subsequently, in a case where the peak position of the AF evaluation values has been detected in either of the photographing systems, the corresponding one of the focusing lenses 216A, 216B is moved to the detected peak position. By way of example, in a case where the peak position of the AF evaluation values has been detected in the first photographing system of wide-angle mode 212A, the focusing lens 216A is moved to the detected peak position. Besides, the focusing position of the focusing lens 216B corresponding to that of the focusing lens 216A is obtained by, for example, referring to a lookup table prepared beforehand as shown in FIG. 39, the lookup table representing the corresponding relationship between the focusing positions A1-Ai (where i denotes an integer) of the focusing lens 216A of the first photographing system 212A and the focusing positions B1-Bi of the focusing lens 216B of the second photographing system 212B as respectively correspond to the focusing positions A1-Ai. Further, the focusing lens 216B is moved to the focusing position obtained. The focusing position of the focusing lens 216B can be readily obtained from the focusing position of the focusing lens 216A by preparing the lookup table beforehand in this manner.

Incidentally, only the focusing lens of the photographing system for photographing use may well be moved to the focusing position. Besides, in a case where focusing is to be effected more accurately, a focus adjustment similar to the above may well be performed from the focusing position again after the focusing lens has been moved to this focusing position. By way of example, in a case where the second photographing system of telescopic mode 212B is for the photographing use and where the peak position of the AF evaluation values of the first photographing system 212A has been detected earlier, the focusing lens 216B is moved to that focusing position of the focusing lens 216B which corresponds to the detected focusing position of the focusing lens 216A and which is obtained from the above lookup table, and the focus adjustment is performed from the focusing position of the focusing lens 216B again. Thus, the focusing can be effected more accurately.

Besides, the embodiment has been described concerning the case of the construction which includes the two photographing optical systems independent of each other, but the invention is not restricted thereto. As shown in FIG. 34 by way of example, the invention may well have a construction in which light entered from a single photographing optical system 214 is branched into two directions by a semitransparent mirror 271, and the branched light beams are respectively entered into CCDs 218A, 218B which are different in at least either of the size and the number of pixels. In this case, a focus adjustment is performed by moving the CCDs 218A, 218B. The calculation of AF evaluation values, the detection of peak positions and the movement of focusing lenses can be implemented by processing as in the foregoing. A more accurate focus adjustment can be effected by sharing the photographing optical system in this manner.

What is claimed is:

1. A digital camera comprising:
   a first photographing system that includes a first image pickup device which picks up an image of a subject, a first optical system which forms the subject image on the first image pickup device;
   a second photographing system that includes a second image pickup device which picks up an image of a subject, a second optical system which forms the image of the subject on the second image pickup device and which has a focal depth set shorter than that of the first optical system, and
   a focus adjustment control unit which performs a focus adjustment that is to determine a focal distance of the first and/or second optical system when photographing the subject by at least one of the first photographing system and the second photographing system, wherein when the subject is to be photographed by the second photographing system, the adjustment control unit performs the focus adjustment by determining a first focal distance of the first optical system and thereafter determining a second focal distance of the second optical system controls, on the basis of the determined first focus distance.

2. A digital camera according to claim 1, wherein the focus adjustment control unit comprises a first focus adjustment unit that adjusts a focus distance of the first optical system, and a second focus adjustment unit that adjusts a focus distance of the second optical system.

3. A digital camera having a plurality of photographing systems as defined in claim 2, wherein said second optical system includes a zoom lens.

4. A digital camera according to claim 2, wherein said first optical system includes a monofocal lens.

5. A digital camera according to claim 2, further comprising:
    a changeover switch which changeovers a photographing system for photographing the subject, to one of said first photographing system or said second photographing system; and
    a display device which displays images;
    wherein said focus adjustment control unit controls said display device so as to display the image formed by one photographing system determined by said changeover switch, and to display image information indicative of the image formed by the other photographing system.

6. A digital camera according to claim 5, further comprising a recording unit which records the image photographed by said one photographing system determined by said changeover switch.

7. A digital camera according to claim 2, wherein said first photographing system and said second photographing system are photographing systems whose image angles are different from each other.

8. A digital camera comprising:
    a first photographing system that includes a first image pickup device which picks up an image of a subject, a first optical system which forms the subject image on the first image pickup device;
    a second photographing system that includes a second image pickup device which picks up an image of a subject, a second optical system which forms the image of the subject on the second image pickup device and which has a focal depth set shorter than that of the first optical system, and
    a focus adjustment control unit which performs a focus adjustment that is to determine a focal distance of the first and/or second optical system when photographing the subject by at least one of the first photographing system and the second photographing system,
    wherein when the subject is to be photographed by the second photographing system, the adjustment control unit performs the focus adjustment by determining a first focal distance of the first optical system and thereafter determining a second focal distance of the second optical system controls, on the basis of the determined first focus distance.

* * * * *